United States Patent
Nishiyama et al.

(10) Patent No.: US 12,433,857 B2
(45) Date of Patent: Oct. 7, 2025

(54) CONJUGATE AND CANCER THERAPEUTIC AGENT

(71) Applicants: Tokyo Institute of Technology, Tokyo (JP); SBI Pharmaceuticals Co., Ltd., Tokyo (JP)

(72) Inventors: Nobuhiro Nishiyama, Tokyo (JP); Takahiro Nomoto, Tokyo (JP); Kana Kohmoto, Tokyo (JP); Hiroyasu Takemoto, Tokyo (JP); Makoto Matsui, Tokyo (JP)

(73) Assignees: TOKYO INSTITUTE OF TECHNOLOGY, Tokyo (JP); SBI PHARMACEUTICALS CO., LTD., Tokyo (JP)

( * ) Notice: Subject to any disclaimer, the term of this patent is extended or adjusted under 35 U.S.C. 154(b) by 903 days.

(21) Appl. No.: 17/605,027

(22) PCT Filed: Apr. 23, 2020

(86) PCT No.: PCT/JP2020/017421
§ 371 (c)(1),
(2) Date: Oct. 20, 2021

(87) PCT Pub. No.: WO2020/218390
PCT Pub. Date: Oct. 29, 2020

(65) Prior Publication Data
US 2022/0211646 A1    Jul. 7, 2022

(30) Foreign Application Priority Data
Apr. 24, 2019 (JP) ................. 2019-083250

(51) Int. Cl.
*A61K 31/16* (2006.01)
*A61K 47/64* (2017.01)
*A61P 35/00* (2006.01)

(52) U.S. Cl.
CPC .............. *A61K 31/16* (2013.01); *A61K 47/64* (2017.08); *A61P 35/00* (2018.01); *A61K 47/645* (2017.08)

(58) Field of Classification Search
CPC ........ A61K 47/64; A61K 47/645; A61P 35/00
See application file for complete search history.

(56) References Cited

U.S. PATENT DOCUMENTS

| | | | | |
|---|---|---|---|---|
| 4,863,964 A | * | 9/1989 | Hedlund | A61K 47/62 514/59 |
| 5,412,072 A | * | 5/1995 | Sakurai | A61P 35/00 530/322 |
| 2010/0204443 A1 | * | 8/2010 | Gazit | C23C 16/042 204/192.15 |

FOREIGN PATENT DOCUMENTS

| | | |
|---|---|---|
| EP | 2204398 A1 | 7/2010 |
| EP | 2077293 B1 | 4/2011 |

(Continued)

OTHER PUBLICATIONS

Silva, et al, "Chemical Modifications on Proteins Using Glutaraldehyde", Food Technol. Biotechnol. 42 (1) 51-56 (2004) (Year: 2004).*

(Continued)

*Primary Examiner* — Kregg T Brooks
*Assistant Examiner* — David R. Foss
(74) *Attorney, Agent, or Firm* — Panitch Schwarze Belisario & Nadel LLP

(57) ABSTRACT

A conjugate is provided in which a deferoxamine-type compound, which is at least one compound selected from the group consisting of deferoxamine or an ion or salt thereof, and a derivative thereof, and a biocompatible polymer are conjugated, where the biocompatible polymer contains a first biocompatible polymer chain and a second biocompatible polymer chain that is different from the first biocompatible polymer chain.

3 Claims, 29 Drawing Sheets

(56) References Cited

FOREIGN PATENT DOCUMENTS

| JP | 2011-162569 A | 8/2011 |
|---|---|---|
| WO | 2017/170845 A1 | 10/2017 |

OTHER PUBLICATIONS

Machine translation of WO-2017170845-A1 obtained from WIPO patentscope (Year: 2017).*
Elafy, et al, "Role of vitamin C as an adjuvant therapy . . . ", European Journal of Haematology, May 2015, p. 1-9. (Year: 2015).*
Rossi et al., "In vitro chelating, cytotoxicity, and blood compatibility of degradable poly (ethylene glycol)-based macromolecular iron chelators," Biomaterials, vol. 30, No. 4, pp. 638-648 (2009).
Rossi et al., "RAFT Synthesis of Acrylic Copolymers Containing Poly(ethylene glycol) and Dioxolane Functional Groups: Toward Well-Defined Aldehyde Containing Copolymers for Bioconjugation," Macromolecules, vol. 41, No. 14, pp. 5272-5282 (2008).
Starmans et al., "89 Zr- and Fe-Labeled Polymeric Micelles for Dual Modality PET and T1 Weighted MR Imaging," Advanced Healthcare Materials, vol. 4, No. 14, pp. 2137-2145 (2015).
Huang et al., "From small deferiprone to macromolecular micelles: Self-assembly enhances iron chelation," Journal of Colloid and Interface Science, vol. 533, pp. 375-384 (2018).
Mi et al., "Block copolymer-boron cluster conjugate for effective boron neutron capture therapy of solid tumors," Journal of Controlled Release, vol. 254, pp. 1-9 (2017).
Extended European Search Report issued Apr. 24, 2023 in EP Application No. 20795331.6.
Int'l Search Report issued Jun. 23, 2020 in Int'l Application No. PCT/JP2020/017421 (with English translation).
Bajbouj et al, "High-Dose Deferoxamine Treatment Disrupts Intracellular Iron Homeostasis, Reduces Growth, and Induces Apoptosis in Metastatic and Nonmetastatic Breast Cancer Cell Lines," Technology in Cancer Research & Treatment, vol. 17, pp. 1-11 (2018).
Becton et al, "Deferoxamine Inhibition of Human Neuroblastoma Viability and Proliferation," Cancer Research, vol. 48, pp. 7189-7192 (1988).
Blatt et al., "Failure to alter the course of acute myelogenous leukemia in the rat with subcutaneous deferoxamine," Leukemia Research, vol. 15, pp. 391-394 (1991).
Chen et al, "Ascorbate in pharmacologic concentrations selectively generates ascorbate radical and hydrogen peroxide in extracellular fluid in vivo," Proceedings of the National Academy of Sciences of the United States of America, vol. 104, pp. 8749-8754 (2007).
Chen et al, "Pharmacologic ascorbic acid concentrations selectively kill cancer cells: action as a pro-drug to deliver hydrogen peroxide to tissues," Proceedings of the National Academy of Sciences of the United States of America., vol. 102, pp. 13604-13609 (2005).
Chen et al, "Pharmacologic doses of ascorbate act as a prooxidant and decrease growth of aggressive tumor kenografts in mice," Proceedings of the National Academy of Sciences of the United States of America, vol. 105, pp. 11105-11109 (2008).
Donfrancesco et al, "Effects of a Single Course of Deferoxamine in Neuroblastoma Patients," Cancer Research, vol. 50, pp. 4929-4930 (1990).
Hallaway et al, "Modulation of deferoxamine toxicity and clearance by covalent attachment to biocompatible polymers," Proceedings of the National Academy of Sciences of the United States of America, vol. 86, pp. 10108-10112 (1989).
Hamilton et al, "Iron Binding and Iron Removal Efficiency of Desferrioxamine Based Polymeric Iron Chelators: Influence of Molecular Size and Chelator Density," Macromolecular Bioscience, vol. 17, p. 1600244 (2017).
Hamilton et al, "Polymeric nanocarriers for the treatment of systemic iron overload," Molecular and Cellular Therapies, vol. 3, No. 3, pp. 1-15 (2015).
Mojic et al, "Extracellular iron diminishes anticancer effects of vitamin C:an in vitro study", Scientific Reports, vol. 4, p. 5955 (2014).
Wang et al, "Enhancement of 5-aminolevulinic acid-based fluorescence detection of side population-defined glioma stem cells by iron chelation," Scientific Reports, vol. 7, p. 42070 (2017).
Wilks et al., "Imaging PEG-like Nanoprobes in Tumor, Transient Ischemia and Inflammatory Disease Models," Bioconjugate Chemistry, vol. 26, No. 6, pp. 1061-1069 (2015).
Yamasaki et al, "Deferoxamine for Advanced Hepatocellular Carcinoma," The New England Journal of Medicine, vol. 365, No. 6, pp. 576-578 (2011).
Yang et al, "Effects of Deferoxamine on Leukemia In Vitro and Its Related Mechanism," Medical Science Monitor, vol. 24, pp. 6735-6741 (2018).
Yokoyama et al., "Research summaries of Yokoyama "polymer nanomedical" project, Briefing session materials of the project ended fiscal year 2008," pp. 16-59 (Feb. 26, 2009).

* cited by examiner

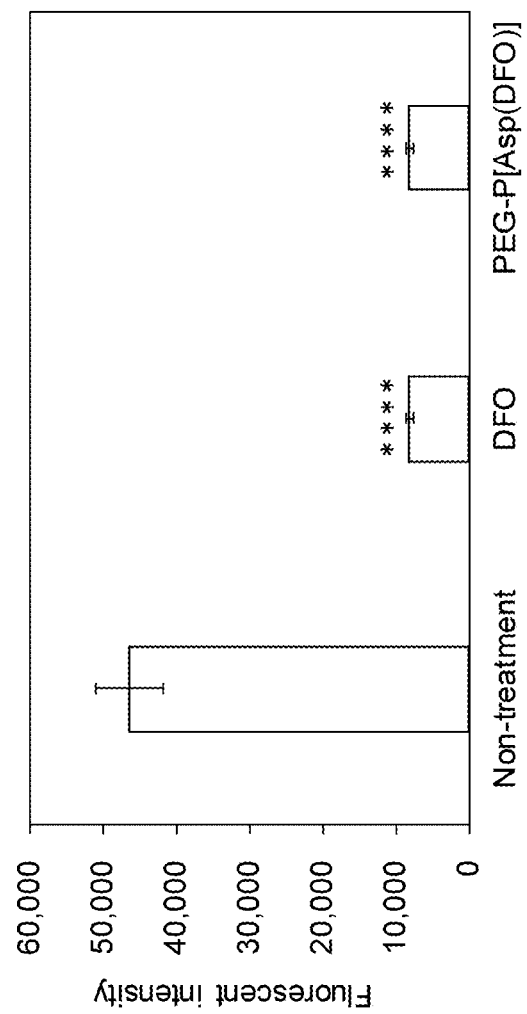

CONJUGATE AND CANCER THERAPEUTIC AGENT

CROSS-REFERENCE TO RELATED APPLICATIONS

This application is a Section 371 of International Application No. PCT/JP2020/017421, filed Apr. 23, 2020, which was published in the Japanese language on Oct. 29, 2020 under International Publication No. WO 2020/218390 A1, which claims priority under 35 U.S.C. § 119(b) to Japanese Application No. 2019-083250, filed on Apr. 24, 2019, the disclosures of which are incorporated herein by reference in their entireties.

TECHNICAL FIELD

The present invention relates to a conjugate with a deferoxamine-type compound, and the present invention relates to a cancer therapeutic agent.

BACKGROUND ART

Cancer cells have a high demand for iron, which is essential for their proliferation, and iron chelation therapy, which applies an iron chelating agent to a cancer therapeutic agent, is attracting attention as a novel approach to cancer treatment. Among a large number of iron chelating agents, deferoxamine (DFO), which exhibits a specific chelating action on iron (III) ions, has been widely used as a therapeutic agent for iron overload and thus has been studied most actively so far. It has been reported that deferoxamine exhibits a cell proliferation suppressive effect through cell cycle arrest on various cancer cell lines (Non-Patent Documents 1 to 3). In addition, clinical research has also been underway, and a certain antitumor effect has been shown (Non-Patent Documents 4 and 5).

CITATION LIST

Non-Patent Documents

[Non-Patent Document 1]
Becton D L., Bryles P. Deferoxamine Inhibition of Human Neuroblastoma Viability and Proliferation. Cancer Research 48, 7189-7192, (1988).
[Non-Patent Document 2]
Yang Y., Xu Y., Su A., Yang D., Zhang X. Effects of Deferoxamine on Leukemia In Vitro and Its Related Mechanism. Med Sci Monit. 24, 6735-6741, (2018).
[Non-Patent Document 3]
Bajbouj K., Shafarin J., Hamad M. High-Dose Deferoxamine Treatment Disrupts Intracellular Iron Homeostasis, Reduces Growth, and Induces Apoptosis in Metastatic and Nonmetastatic Breast Cancer Cell Lines. Technol Cancer Res Treat 17, 1-11, (2018).
[Non-Patent Document 4]
Yamasaki T., Terai S., Sakaida I. Deferoxamine for Advanced Hepatocellular Carcinoma. The New England Journal of Medicine 365, 576-578, (2011).
[Non-Patent Document 5]
Donfrancesco A., Deb G., Dominici C., Pileggi D., Castello M A., Helson L. Effects of a Single Course of Deferoxamine in Neuroblastoma Patients. Cancer Research 50, 4929-4930, (1990).
[Non-Patent Document 6]
Hamilton J L., Kizhakkedathu J N. Polymeric nanocarriers for the treatment of systemic iron overload. Mol. Cell. Ther. 3, 3, (2015).
[Non-Patent Document 7]
Hallaway P E., Eaton J W., Panter S S., Hedlund B E. Modulation of deferoxamine toxicity and clearance by covalent attachment to biocompatible polymers. Proc Natl Acad Sci USA 86, 10108-10112, (1989).
[Non-Patent Document 8]
Blatt J., Boegel F., Hedlund B E., Arena V C., Shadduck R K. Failure to alter the course of acute myelogenous leukemia in the rat with subcutaneous deferoxamine. Leukemia Research 15, 391-394, (1991).
[Non-Patent Document 9]
Wang W., Tabu K., Hagiya Y., Sugiyama Y., Kokubu Y., Murota Y., Ogura S., Taga T. Enhancement of 5-aminolevulinic acid-based fluorescence detection of side population-defined glioma stem cells by iron chelation. Scientific Reports 7:42070, (2017).

SUMMARY OF INVENTION

Technical Problem

However, the half-life of the in-blood concentration of DFO is as short as 20 minutes or less, and in order to obtain a sufficient therapeutic effect, it is necessary to administer DFO by infusion for a long period of time (8 hours or more) (Non-Patent Documents 4 to 6). In addition, since DFO shows no selective tumor accumulation, side effects on the whole body are also a concern.

The former problem of early disappearance was improved by conjugation to a polymer such as dextran or hydroxyethyl starch (HES) (Non-Patent Document 7), and it has been reported that in a leukemic rat to which DFO (HES-DFO) conjugated to HES is administered, the survival period is prolonged (Non-Patent Document 8). However, the tumor accumulation of HES-DFO has not been examined, and no examples have yet been reported in which a polymer-modified DFO exhibited an antitumor effect on solid cancers.

The present invention has been made to solve the above-described problems, and an object of the present invention is to provide a conjugate and a cancer therapeutic agent which have excellent blood retention and, further, have tumor accumulation and exhibit an excellent antitumor effect.

Solution to Problem

That is, the present invention has the following aspects.
<1> A conjugate in which a deferoxamine-type compound, which is at least one compound selected from the group consisting of deferoxamine or an ion or salt thereof, and a derivative thereof, and a biocompatible polymer are conjugated, in which the biocompatible polymer contains a first biocompatible polymer chain and a second biocompatible polymer chain that is different from the first biocompatible polymer chain.
<2> The conjugate according to <1>, in which the deferoxamine-type compound is conjugated to the second biocompatible polymer chain.
<3> The conjugate according to <1> or <2>, in which the second biocompatible polymer chain is a polyamino acid.
<4> The conjugate according to any one of <1> to <3>, in which the first biocompatible polymer chain is polyethylene glycol.

<5> The conjugate according to any one of <1> to <4>, in which the conjugate includes a structure represented by General Formula (1) or (1-1):

(in Formulae (1) and (1-1), A represents the first biocompatible polymer chain; L represents a linker part; and B represents the second biocompatible polymer chain and includes a repeating structure represented by the following (b2), or a repeating structure represented by (b1) and a repeating structure represented by (b2)),

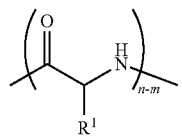

(b1)

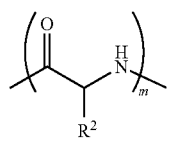

(b2)

(in Formulae (b1) and (b2), $R^1$ represents an amino acid side chain, $R^2$ is a group obtained by conjugating an amino acid side chain to the deferoxamine-type compound, n represents the total number of (b1) and (b2), n is an integer of 1 to 1,000, m is an integer of 1 to 1,000 (here, m≤n), in a case where n−m is 2 or more, a plurality of $R^1$'s may be the same as or different from each other, and in a case where m is 2 or more, a plurality of $R^2$'s may be the same as or different from each other).

<6> The conjugate according to <5>, in which the conjugate includes a structure represented by General Formula (1-2):

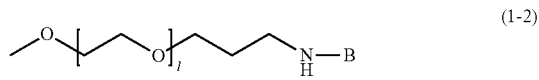

(in Formula (1-2), B represents the second biocompatible polymer chain and includes a repeating structure represented by the following (b2-1), or a repeating structure represented by (b1-1) and a repeating structure represented by (b2-1)),

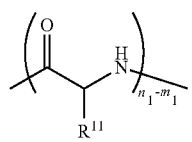

(b1-1)

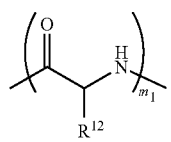

(b2-1)

(in Formulae (b1-1) and (b2-1), $R^{11}$ represents an amino acid side chain; $R^{12}$ is a group obtained by conjugating a carboxyl group in an aspartic acid side chain represented by —$CH_2$—COOH or a carboxyl group in a glutamic acid side chain represented by —$CH_2$—$CH_2$—COOH to the deferoxamine-type compound; and $n_1$ represents the total number of (b1-1) and (b2-1), $n_1$ is an integer of 1 to 1,000, $m_1$ is an integer of 1 to 1,000 (here, $m_1 \leq n_1$), in a case where $n_1-m_1$ is 2 or more, a plurality of $R^{11}$'s may be the same as or different from each other, and in a case where $m_1$ is 2 or more, a plurality of $R^{12}$'s may be the same as or different from each other).

<7> The conjugate according to any one of <1> to <6>, in which the conjugate has a number average molecular weight of 2,000 to 200,000.

<8> A cancer therapeutic agent including the conjugate according to any one of <1> to <7> as an active ingredient.

Advantageous Effects of Invention

According to the present invention, it is possible to provide a conjugate and a cancer therapeutic agent which have excellent blood retention and, further, have tumor accumulation and exhibit an excellent antitumor effect.

BRIEF DESCRIPTION OF DRAWINGS

FIG. 27B is a graph showing results of analysis of the free iron amount in the cytoplasm of DLD-1 cells after the addition of DFO or PEG-P[Asp(DFO)$_{10}$]$_{35}$ and the subsequent incubation.

DESCRIPTION OF EMBODIMENTS

Figure 1:
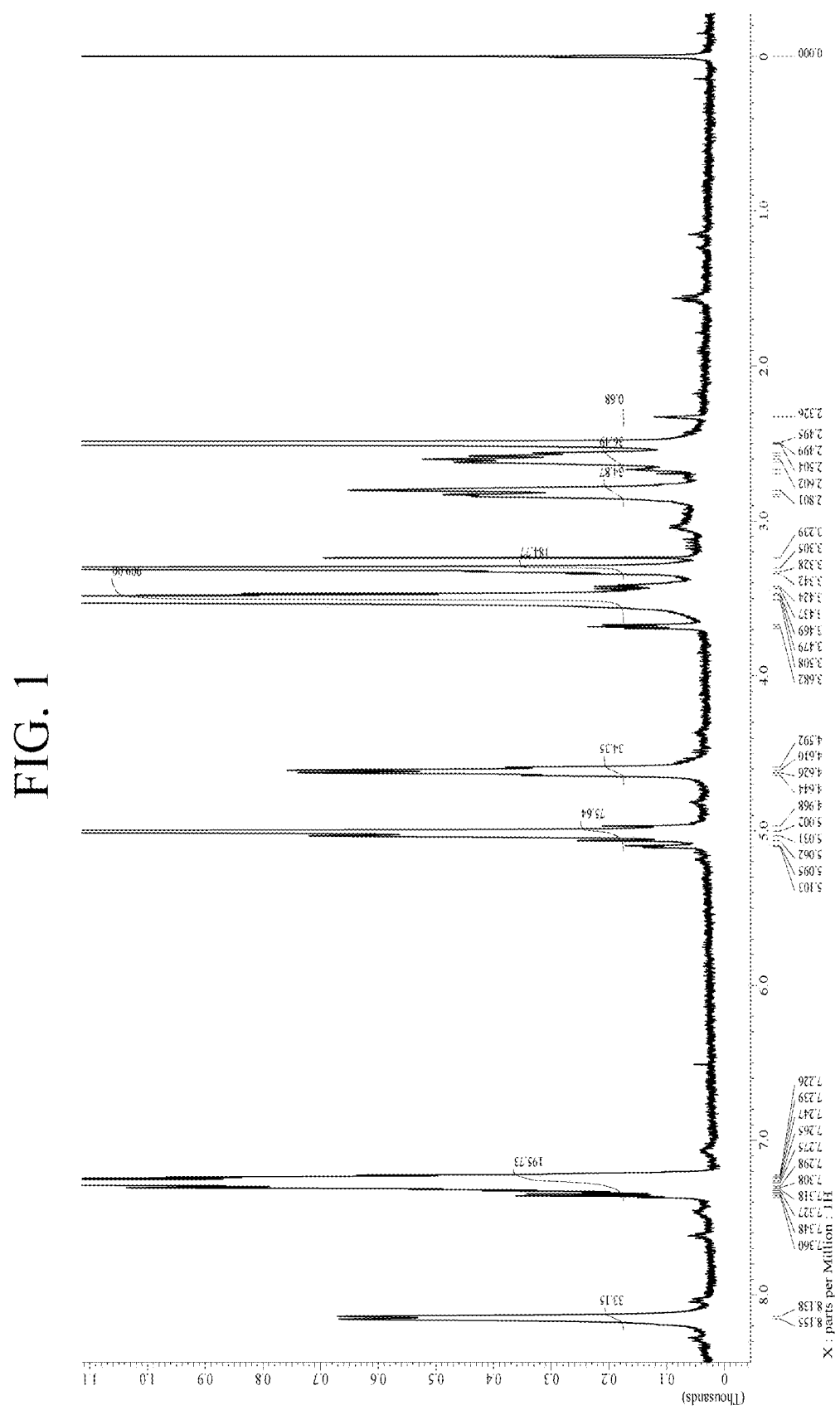
FIG. 1 is a $^1$H NMR spectrum of PEG-PBLA$_{35}$ prepared in Example.

Hereinafter, a conjugate and a cancer therapeutic agent in one embodiment of the present invention will be described.

<<Conjugate>>

The conjugate of the embodiment is a conjugate in which a deferoxamine-type compound and a biocompatible polymer are conjugated, where the biocompatible polymer contains a first biocompatible polymer chain and a second biocompatible polymer chain that is different from the first biocompatible polymer chain.

The conjugate of the embodiment has an iron chelating action derived from the deferoxamine-type compound and preferably has a specific chelating action on iron (III) ions.

The conjugate of the embodiment may be a conjugate in which a deferoxamine-type compound and a polymer are conjugated, where the polymer contains a first polymer chain and a second polymer chain that is different from the first polymer chain, and the polymer may be a biocompatible polymer.

<Deferoxamine-Type Compound>

In the present specification. "deferoxamine-type compound" means at least one compound selected from the group consisting of deferoxamine or an ion or salt thereof, and a derivative thereof.

Deferoxamine is known as a compound represented by Formula (I) (hereinafter, referred to as a "compound (I)"). Among a large number of iron chelating agents, deferoxamine exhibits a specific chelating action on iron (III) ions and has been widely used as a therapeutic agent for iron overload.

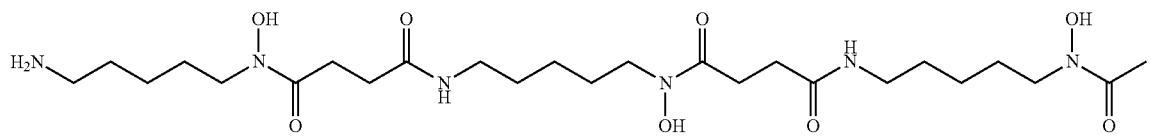

(I)

Deferoxamine can be provided in the form of an ion or a salt. The deferoxamine ion of the compound (I) may be an ion obtained by making the compound (I) into a cation, or an ion obtained by making the compound (I) into an anion.

Examples of the ion obtained by making the compound (I) into a cation include an ion obtained by adding a proton to a group represented by "—NH$_2$" to form a cation moiety represented by "—NH$_3^+$" in the compound (I).

Examples of the compound (I) ion include a compound represented by Formula (I-1).

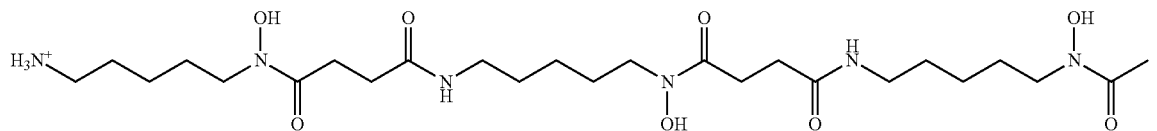

(I-1)

Examples of the salt of deferoxamine include a pharmacologically acceptable salt, and deferoxamine mesylate represented by Formula (I-2) is preferable.

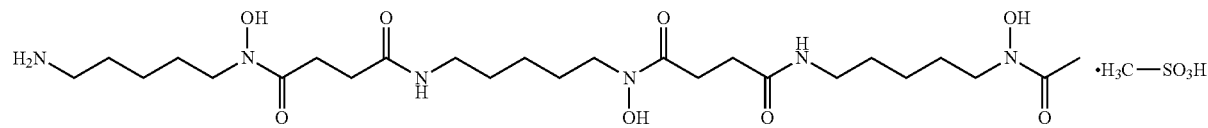

(I-2)

Examples of the pharmacologically acceptable salt include a pharmacologically acceptable acid addition salt, a metal salt, an ammonium salt, and an organic amine addition salt. Examples of the acid addition salt include inorganic acid salts such as hydrochloride, hydrobromide, hydroiodide, phosphate, nitrate, and sulfate; and organic acid addition salts such as formate, acetate, propionate, toluenesulfonate, succinate, oxalate, lactate, tartrate, glycolate, methanesulfonate, butyrate, valerate, citrate, fumarate, maleate, and malate. Examples of the metal salt include alkali metal salts such as a lithium salt, a sodium salt, and a potassium salt; alkali earth metal salts such as a magnesium and a calcium salt; and metal salts such as an aluminum and a zinc salt. Examples of the ammonium salt include alkylammonium salts such as an ammonium salt and a tetramethylammonium salt. Examples of the organic amine salt include salts such as a triethylamine salt, a piperidine salt, a morpholine salt, and a toluidine salt. These salts can also be used as a solution at the time of use.

The derivative of deferoxamine is not particularly limited as long as it has the above-described iron chelating action. Examples of the derivative of deferoxamine include a derivative obtained by substituting one or more hydrogen atoms or groups in deferoxamine or an ion or salt thereof with another group (a substituent). Further, it may be a derivative obtained by adding or removing a hydrogen atom in deferoxamine or an ion or salt thereof. Here, examples of the substituent include a hydroxyl group, an amino group, a monovalent chain-like saturated hydrocarbon group having 1 to 4 carbon atoms, and a halogen atom. Examples of the monovalent chain-like saturated hydrocarbon group having 1 to 4 carbon atoms include a methyl group, an ethyl group, a propyl group, a butyl group, and a pentyl group. Examples of the halogen atom include a fluorine atom and a chlorine atom.

The iron chelating action of deferoxamine is said to be exhibited by three hydroxamic acid structural moieties represented in Formula (I-3). For this reason, due to the difficulty of affecting the iron chelating action, it is preferable that, for example, one or more hydrogen atoms constituting a group represented by the terminal "—$NH_2$" in the above compound (I) (a group represented by the terminal "—$NH_3^+$" in the above compound (I-1)) be substituted with another group (the above substituent).

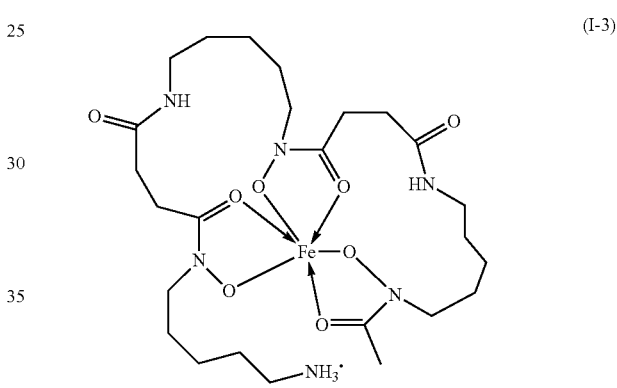

(I-3)

<Biocompatible Polymer>

In the conjugate of the present embodiment, the biocompatible polymer means a polymer that does not exhibit or hardly exhibits a remarkable deleterious action or adverse effect such as a strong inflammatory reaction or damage in a case of being administered to a living body.

The biocompatible polymer is not particularly limited as long as the effects of the present invention can be obtained, and examples thereof include polyethylene glycol (PEG), an acrylic resin (a resin including a constitutional unit derived from a (meth)acrylic acid ester), a polyamino acid, a polynucleotide, a polyacrylamide, a polyether, a polyester, a polyurethane, polysaccharides, and copolymers thereof. In a part of the biocompatible polymer, any group introduced in the process of the synthesis thereof may be contained. Examples of such a group include a part of a polymerization initiator or the like.

The biocompatible polymer according to the present embodiment contains a first biocompatible polymer chain and a second biocompatible polymer chain. Here, the first biocompatible polymer chain is different from the second biocompatible polymer chain, and the biocompatible polymer of the present embodiment can be provided as a block copolymer containing a first biocompatible polymer chain block and a second biocompatible polymer chain block. In addition, the biocompatible polymer according to the present embodiment can further contain another polymer chain in addition to the first biocompatible polymer chain and the second biocompatible polymer chain.

In the present embodiment, the "block copolymer" is a polymer to which a plurality of kinds of blocks (partial constitutional components in which the same kind of constitutional units are repeatedly bonded) are bonded. The blocks constituting the block copolymer may be two kinds or may be three kinds or more.

The number average molecular weight (Mn) of the biocompatible polymer can be appropriately determined depending on the molecular weight of the conjugate of the present embodiment.

The number average molecular weight of the first biocompatible polymer chain, calculated by $^1$H NMR, is preferably 700 to 100,000, more preferably 2,000 to 50,000, and still more preferably 7,000 to 30,000.

The number average molecular weight of the second biocompatible polymer chain, calculated by $^1$H NMR, is preferably 700 to 100,000, more preferably 2,000 to 50,000, and still more preferably 7,000 to 30,000.

The number average molecular weight ratio of the first biocompatible polymer chain to the second biocompatible polymer chain (the first biocompatible polymer chain:the second biocompatible polymer chain) may be, for example, 10:1 to 1:10 and may be 10:3 to 3:10.

The dispersity (Mw/Mn) of the biocompatible polymer is preferably 1.0 or more and less than 2.0, more preferably 1.0 to 1.5, still more preferably 1.0 to 1.3, and particularly preferably 1.0 to 1.2. From the viewpoint that the conjugate of the embodiment is capable of more effectively exhibiting excellent tumor accumulation, it is preferable that the dispersity of the biocompatible polymer be within the above range.

In the present specification, as the number average molecular weight of the polymer, a value calculated from the ratio between the peak integral values based on the $^1$H NMR spectrum can be adopted. Regarding the calculation method, the number average molecular weight can be calculated, for example, as described in Examples described later, by calculating the degree of polymerization of the monomer from the ratio of a peak integral value of a structure, which is derived from an initiator present at the terminal of the polymer chain, to a peak integral value of a structure, which is derived from the monomer of the calculation target moiety, and adding the total molecular weight of the structures derived from the polymerized monomer to the molecular weight of the structure derived from the initiator.

As the number average molecular weight of the conjugate as well, which will be described later, a value calculated from the ratio between the peak integral values based on the $^1$H NMR spectrum can be partially adopted. Regarding the calculation method, the number average molecular weight thereof can be calculated, for example, as described in Examples described later, by calculating the number of conjugations of DFO from the ratio of a peak integral value of a structure, which is derived from an initiator present at the terminal of the polymer chain, to a peak integral value of a structure, which is derived from the DFO of the calculation target moiety, and adding the total molecular weight of the structures derived from the conjugated DFO to the number average molecular weight of the polymer chain.

The first biocompatible polymer chain or the second biocompatible polymer chain is preferably polyethylene glycol from the viewpoints of excellent biocompatibility and general-purpose properties.

The first biocompatible polymer chain or the second biocompatible polymer chain is preferably a polyamino acid from the viewpoints of excellent biocompatibility and the balance between biostability and biodegradability.

The combination of the first biocompatible polymer chain and the second biocompatible polymer chain which are contained in the biocompatible polymer is preferably, for example, a combination in which the first biocompatible polymer chain is polyethylene glycol (PEG) and the second biocompatible polymer chain is a polyamino acid.

In the conjugate of the present embodiment, the biocompatible polymer is preferably biodegradable.

The biodegradability means a property of being absorbed or degraded in a living body. The biodegradable biocompatible polymer is not particularly limited as long as the effects of the present invention can be obtained, and examples thereof include a polyamino acid, a polyester, a polynucleotide, and polysaccharides.

In the present specification, the description that a biocompatible polymer is biodegradable means that at least a part of the biocompatible polymer is biodegradable. As a result, a block copolymer of a polyamino acid, a polyester, a polynucleotide, polysaccharides, or the like with PEG, an acrylic resin (a resin including a constitutional unit derived from a (meth)acrylic acid ester), a polyacrylamide, a polyether, a polyurethane or the like also corresponds to the biodegradable biocompatible polymer.

In a case where a biodegradable polymer is used, it is possible to suppress the accumulation of the conjugate in the living body and to reduce side effects.

In the present specification, the biostability means a property of being present in a living body without being immediately absorbed or immediately degraded. In a case where a biocompatible polymer has biodegradability and biostability, it means that the biocompatible polymer is capable of being present in a living body until it is absorbed or degraded in the living body.

In the present specification, the description that a biocompatible polymer is biostable means that at least a part of the biocompatible polymer is biostable. Therefore, a block copolymer of a polyamino acid, a polyester, a polynucleotide, polysaccharides, or the like with PEG, an acrylic resin (a resin including a constitutional unit derived from a (meth)acrylic acid ester), a polyacrylamide, a polyether, a polyurethane or the like also corresponds to the biostable biocompatible polymer.

A method of producing a biocompatible polymer containing the first biocompatible polymer chain and the second biocompatible polymer chain is not particularly limited. For example, it can be produced by a method in which the first biocompatible polymer chain is synthesized by a known polymerization reaction, and then a monomer of the second biocompatible polymer chain is polymerized to the first biocompatible polymer chain. The polymer chains obtained by the polymerization reaction may be each in a state of precursors (for example, those having a protective group), or precursors obtained by the polymerization reaction may be subjected to an ordinary treatment selected by those skilled in the art to produce the first biocompatible polymer chain and the second biocompatible polymer chain.

Alternatively, the first biocompatible polymer chain or a precursor thereof, provided as a polymer in advance, and the second biocompatible polymer chain or precursor thereof can be bonded by a known reaction. At that time, both the chains may be bonded by utilizing the bonding between reactive functional groups. In a case where precursors are used, the precursors are subjected to the same treatment as above, whereby the first biocompatible polymer chain and the second biocompatible polymer chain can be produced.

<Conjugate>

The conjugate of the present embodiment is a conjugate obtained by conjugating a deferoxamine-type compound to a biocompatible polymer.

The conjugation of a biocompatible polymer to a deferoxamine-type compound may be a direct conjugation of a biocompatible polymer to a deferoxamine-type compound or may be a conjugation through any linker, and the conjugation mode thereof is not particularly limited as long as the effects of the present invention can be obtained.

The biocompatible polymer and the deferoxamine-type compound are preferably conjugated with each other by a covalent bond in order to maintain the stability of the conjugation in a body.

For example, the biocompatible polymer and the deferoxamine-type compound may be conjugated by utilizing the bonding between respective reactive functional groups of the biocompatible polymer and the deferoxamine-type compound. The reactive functional groups may be originally contained in the biocompatible polymer and/or the deferoxamine-type compound, or may be modified or introduced ones.

In the conjugation of the biocompatible polymer to the deferoxamine-type compound, the deferoxamine-type compound and the biocompatible polymer each may undergo a structural change necessary for the conjugation thereof as long as the effects of the present invention are obtained.

In the conjugate of the embodiment, only one deferoxamine-type compound may be conjugated, or two or more thereof may be conjugated to the biocompatible polymer.

The number of the deferoxamine-type compound in the conjugate of the present embodiment may be an integer of 1 or more, may be an integer of 1 to 1,000, may be an integer of 3 to 100, and may be an integer of 5 to 50.

In a case where the above number is equal to or more than the above lower limit value, the iron chelating action of the deferoxamine-type compound is well exhibited, and in a case where the above number is equal to or less than the upper limit value, the hydrophilicity of the conjugate is appropriately improved, which is preferable.

In the conjugate of the present embodiment, the deferoxamine-type compound is capable of being conjugated to any one of the biocompatible polymers. The deferoxamine-type compound may be conjugated to the first biocompatible polymer chain and/or the second biocompatible polymer chain.

For example, the deferoxamine-type compound may be conjugated to a functional group of the first biocompatible polymer chain and/or the second biocompatible polymer chain.

The conjugation mode is not particularly limited; however, for example, in a case of the conjugation to a group (an amino group) represented by "—$NH_2$" in deferoxamine of the compound (I), the iron chelating action of deferoxamine is hardly affected, and it is not necessary to modify or derivatize deferoxamine. From this viewpoint, for example, in the case of the deferoxamine-type compound, an amino group of the deferoxamine-type compound may be bonded to a "group capable of bonding to an amino group" of the first biocompatible polymer chain and/or the second biocompatible polymer chain.

Examples of the group capable of bonding to an amino group include a carboxyl group, a hydroxyl group, an aldehyde group, and a carbonyl group. These groups may be those included in the side chains of the polymer chain.

Among them, a carboxyl group is preferable as the group capable of bonding to an amino group from the viewpoints of the stability of bonding to an amino group and the ease of synthesis. The first biocompatible polymer chain and/or the second biocompatible polymer chain may have a carboxyl group. An amide bond is formed between a carboxyl group of the first biocompatible polymer chain and/or the second biocompatible polymer chain and an amino group of the deferoxamine-type compound, whereby the first biocompatible polymer chain and/or the second biocompatible polymer chain can be conjugated to the deferoxamine-type compound.

Examples of the biocompatible polymer chain having a carboxyl group in the molecule include a polyamino acid, a polyacrylic acid, a polymethacrylic acid, carboxymethyl cellulose, and hyaluronic acid.

The carboxyl group may be a carboxyl group protected by a protective group.

In a case of a biocompatible polymer chain not having a carboxyl group or a carboxyl group protected by a protective group, a carboxyl group can be introduced by a known method using chloroacetic acid, succinic anhydride, chloroformic acid-p-nitrophenyl, or the like.

For example, in a case where the biocompatible polymer is a polyacrylamide, it is possible to produce a biocompatible polymer having a carboxyl group or a carboxyl group protected by a protective group by a known production method such as free radical polymerization or living radical polymerization using acrylic acid or benzyl acrylate as a raw material.

Examples of the method of forming an amide bond between a carboxyl group and an amino group include subjecting a biocompatible polymer chain having a carboxyl group and the deferoxamine-type compound having an amino group to a condensation reaction in the presence of a condensing agent such as N,N'-dicyclohexylcarbodiimide. In addition, in a case of a biocompatible polymer chain having a carboxyl group protected by a protective group, the protective group can be deprotected by a known reaction to obtain a biocompatible polymer chain having a carboxyl group, which subsequently can be subjected to the same condensation reaction.

In addition, the deferoxamine-type compound may be conjugated to any one of the first biocompatible polymer chain or the second biocompatible polymer chain. For example, the deferoxamine-type compound can be conjugated to the second biocompatible polymer chain. For example, the second biocompatible polymer chain has a side chain, and the deferoxamine-type compound may be conjugated to a side chain of the second biocompatible polymer chain.

An example of the conjugate of the present embodiment includes a structure represented by General Formula (1) or (1-1).

A-L-B      (1)

A-B      (1-1)

(In Formulae (1) and (1-1), A represents the first biocompatible polymer chain. L represents a linker part, and B represents the second biocompatible polymer chain conjugated to the deferoxamine-type compound.)

The linker part is preferably an alkylene group having 1 to 20 carbon atoms, more preferably a linear alkylene group having 1 to 20 carbon atoms, and still more preferably a linear alkylene group having 1 to 5 carbon atoms. One or more of —$CH_2$— in the alkylene group may be each independently substituted with —CH=CH—, —O—, —CO—, —S—, —NH—, or —CONH—. Examples of the alkylene group include a methylene group, an ethylene group, a trimethylene group, a tetramethylene group, and a pentamethylene group.

In the conjugate of the present embodiment, the second biocompatible polymer chain to which the deferoxamine-type compound is conjugated is preferably a polyamino acid.

In a case where the second biocompatible polymer chain is a polyamino acid, the B in General Formula (1) or (1-1) is preferably as follows.

B represents the second biocompatible polymer chain conjugated to the deferoxamine-type compound, and the second biocompatible polymer chain preferably includes a repeating structure represented by the following (b2), or a repeating structure represented by (b1) and a repeating structure represented by (b2).

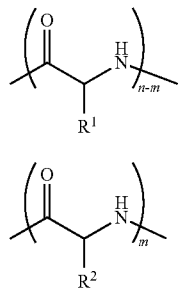

(In Formulae (b1) and (b2), $R^1$ represents an amino acid side chain, $R^2$ is a group obtained by conjugating an amino acid side chain to the deferoxamine-type compound, n represents the total number of (b1) and (b2), n is an integer of 1 to 1,000, m is an integer of 1 to 1,000 (here, m≤5 n), in a case where n–m is 2 or more, a plurality of $R^1$'s may be the same as or different from each other, and in a case where m is 2 or more, a plurality of $R^2$'s may be the same as or different from each other.)

The amino acid side chain is used in the usual sense in the related art and refers to a structure other than the amino group and the carboxy group involved in the amide bond of the polypeptide, and for example, is a hydrogen atom in a case of glycine, is a methyl group in a case of alanine, and is an isopropyl group in a case of valine.

In a case where the second biocompatible polymer chain includes a repeating structure represented by (b1) and a repeating structure represented by (b2), (b1) and (b2) may be randomly sequenced. m represents the total number of (b2) in the second biocompatible polymer chain, and n–m represents the total number of (b1) in the second biocompatible polymer chain. n–m may be 0 (that is, among (b1) and (b2), the second biocompatible polymer chain may have only (b2) conjugated to the deferoxamine-type compound).

The second biocompatible polymer chain may be composed of a repeating structure represented by the above (b2), or a repeating structure represented by (b1) and a repeating structure represented by (b2).

Further, an amino acid side chain of $R^1$ and an amino acid side chain of $R^2$ may be the same as or different from each other.

In the Formulae (b1) and (b2), n is an integer of 1 to 1,000, may be an integer of 10 to 500, and may be an integer of 20 to 100. In a case where the value of n is within the above range, the value of the molecular weight of the second biocompatible polymer chain becomes a suitable value, which is preferable.

In the Formulae (b1) and (b2), m is an integer of 1 to 1,000, may be an integer of 3 to 100, and may be an integer of 5 to 50. In a case where the above value of m is equal to or more than the above lower limit value, the iron chelating action of the deferoxamine-type compound is well exhibited, and in a case where the above value of m is equal to or less than the upper limit value, the hydrophilicity of the conjugate is improved, which is preferable.

Here, the numerical range of a case where n is larger than m is also exemplified; however, n and m may be the same number.

The conjugation mode between a polyamino acid and the deferoxamine-type compound is not particularly limited; however, the conjugation of an amino acid side chain of a polyamino acid to the deferoxamine-type compound is preferable. Examples of the method of conjugating the deferoxamine-type compound to an amino acid side chain of a polyamino acid include a method of forming an amide bond to an amino group in the side chain of lysine and a method of forming a disulfide bond to a thiol group in the side chain of cysteine. As described above, since the iron chelating action of deferoxamine is hardly affected and it is not necessary to derivatize deferoxamine, for example, in a case of the conjugation to a group (an amino group) represented by "—$NH_2$" in deferoxamine of the compound (I), a method of forming an amide bond between a carboxyl group of the aspartic acid side chain or the glutamic acid side chain and an amino group of the deferoxamine-type compound is preferable.

In a case where the second biocompatible polymer chain is a polyamino acid and contains aspartic acid and/or glutamic acid as a constitutional unit, B in General Formula (1) or (1-1) is preferably as follows.

B represents the second biocompatible polymer chain conjugated to the deferoxamine-type compound, and the second biocompatible polymer chain preferably includes a repeating structure represented by the following (b2-1), or a repeating structure represented by (b1-1) and a repeating structure represented by (b2-1).

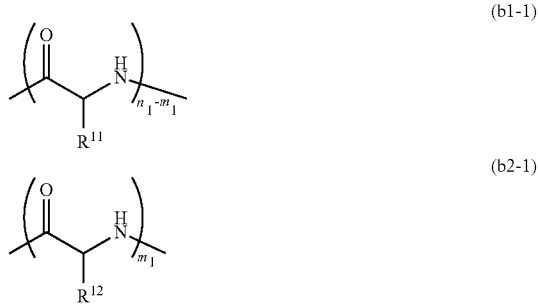

(In Formulae (b1-1) and (b2-1), $R^{11}$ represents an amino acid side chain; $R^{12}$ is a group obtained by conjugating a carboxyl group in an aspartic acid side chain represented by —$CH_2$—COOH or a carboxyl group in a glutamic acid side chain represented by —$CH_2$—$CH_2$—COOH to the deferoxamine-type compound; and $n_1$ represents the total number of (b1-1) and (b2-1), $n_1$ is an integer of 1 to 1,000, $m_1$ is an integer of 1 to 1,000 (here, $m_1 \leq n_1$), in a case where $n_1-m_1$ is 2 or more, a plurality of $R^{11}$'s may be the same as or different from each other, and in a case where $m_1$ is 2 or more, a plurality of $R^{12}$'s may be the same as or different from each other.)

In a case where the second biocompatible polymer chain includes a repeating structure represented by (b1-1) and a repeating structure represented by (b2-1), (b1-1) and (b2-1) may be randomly sequenced. $n_1$ and $m_1$ have the same relationship as n and m above, and the numerical values and the like described as n and m can be applied to $n_1$ and $m_1$.

The second biocompatible polymer chain may be composed of a repeating structure represented by the above (b2-1), or a repeating structure represented by (b1-1) and a repeating structure represented by (b2-1).

Further, an amino acid side chain of $R^{11}$ and an amino acid side chain of $R^{12}$ may be the same as or different from each other.

The first biocompatible polymer chain is preferably polyethylene glycol.

In a case where the first biocompatible polymer chain is polyethylene glycol and the second biocompatible polymer chain is a polyamino acid and contains aspartic acid and/or glutamic acid as a constitutional unit, the structure represented by General Formula (1) is preferably a structure represented by General Formula (1-2).

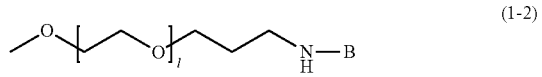

(1-2)

(In Formula (1-2), l is an integer of 1 to 1,500; B represents the second biocompatible polymer chain conjugated to the deferoxamine-type compound; and the second biocompatible polymer chain includes a repeating structure represented by the following (b2-1), or a repeating structure represented by (b1-1) and a repeating structure represented by (b2-1).)

In Formula (1-2), l is an integer of 1 to 1,500, may be an integer of 10 to 1,000, and may be an integer of 100 to 500.

(b1-1)

(b2-1)

(In Formulae (b1-1) and (b2-1), $R^{11}$, $R^{12}$, $n_1$, and $m_1$ have the same meanings as described above.)

The conjugate of the present embodiment preferably has a number average molecular weight (Mn) of 2,000 to 200,000 and, for example, may be 5,000 to 100,000, may be 10,000 to 50,000, may be 17,000 to 45,000, and may be 20,000 to 40,000.

In a case where the number average molecular weight of the conjugate is in the above range, it is possible to suitably improve the blood retention of the conjugate and the accumulation of the conjugate in the tumor tissue and to prevent the accumulation of the conjugate in normal tissues such as the liver. As a result, the deferoxamine-type compound can be efficiently delivered to the tumor tissue.

Tumor accumulation of the conjugate is conceived to be exhibited by selective accumulation in a tumor, which utilizes enhanced vascular leakiness of a tumor, that is, an enhanced permeability and retention effect (an EPR effect), and a further excellent antitumor effect is achieved by selective iron removal in the tumor.

Further, the conjugate may form a polymer micelle or may have a form of a polymer vesicle.

The conjugate of the present embodiment has excellent blood retention and, further, has tumor accumulation and exhibits an excellent antitumor effect.

Conventional DFO has been necessary to be continuously administered by drip infusion due to poor blood retention thereof. On the other hand, the conjugate of the present embodiment has excellent blood retention, and thus it can be administered in an administration form with a longer interval and can be easily prescribed.

The conjugate of the present embodiment has excellent tumor accumulation, and thus it is possible to improve only the accumulation of a drug in the tumor tissue without inducing the accumulation of the drug in the normal tissue. As a result, according to the conjugate of the present embodiment, high drug efficacy and low side effects can be achieved.

In the related art, the conjugation of DFO to a polymer such as dextran or hydroxyethyl starch (HES) has been carried out; however, no examples have yet been reported in which a polymer-modified DFO exhibited an antitumor effect on solid cancers.

It is conceived that the fact that the conjugate of the present embodiment has excellent blood retention and tumor accumulation results from the fact that the biocompatible polymer contains a first biocompatible polymer chain and a second biocompatible polymer chain that is different from the first biocompatible polymer chain. It is conceived that since the conjugate contains different kinds of polymer chains, the chains are bonded to other molecules in a living body so that the different kinds of chains are not mixed to be present with each other, whereby the conjugate is stabilized in a case of being administered in the living body. The conjugate of the embodiment is conceived to exhibit further excellent tumor accumulation and antitumor effect due to, for example, the affinity between the conjugate of the present embodiment and serum albumin, which is a cancer-accumulating protein.

<<Cancer Therapeutic Agent>>

As one embodiment of the present invention, a pharmaceutical composition is provided containing the conjugate of the embodiment as an active ingredient.

As one embodiment of the present invention, a cancer therapeutic agent is provided containing the conjugate of the embodiment as an active ingredient.

Since the conjugate of the above embodiment has an iron chelating action, it is expected to have a therapeutic effect on various diseases by utilizing the iron chelating action.

Examples of the target disease in which a therapeutic effect is expected include iron overload and iron-requiring cancers such as solid cancers. Examples of the human solid cancer include brain cancer, head and neck cancer, esophageal cancer, thyroid cancer, small cell cancer, non-small cell cancer, breast cancer, gastric cancer, gallbladder/bile duct cancer, lung cancer, liver cancer, hepatocellular carcinoma, pancreatic cancer, colon cancer, rectal cancer, ovarian cancer, chorionic epithelial cancer, uterine cancer, cervical cancer, renal/ureter cancer, bladder cancer, prostate cancer, penile cancer, testicular cancer, fetal cancer, Wilms cancer, skin cancer, malignant melanoma, neuroblastoma, osteosarcoma, Ewing tumor, and soft tissue sarcoma.

The pharmaceutical composition or cancer therapeutic agent containing the conjugate of the embodiment as an active ingredient may further contain other anticancer agents and the like. With such a configuration, a synergistic effect on the cancer treatment can be expected.

The pharmaceutical composition or cancer therapeutic agent containing the conjugate of the embodiment as an active ingredient can be used for the photodynamic diagnosis and/or the treatment using 5-aminolevulinic acid or a derivative thereof, salt, or ester thereof (hereinafter, also simply referred to as "ALA's", and details of ALA's will be described later). Hereinafter, the principle of the photodynamic diagnosis and/or the treatment using 5-aminolevulinic acid will be described.

Figure 26:
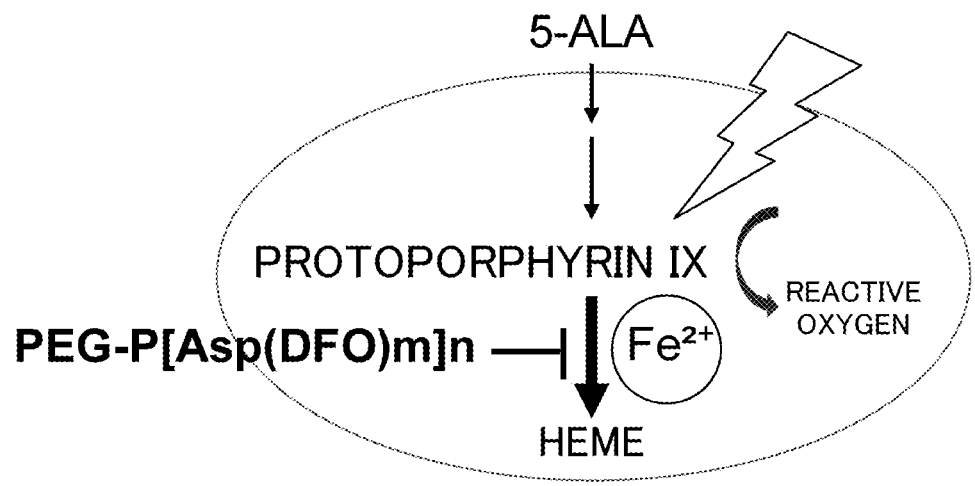
FIG. 26 is a schematic diagram showing the principle of the photodynamic diagnosis and/or the treatment using 5-aminolevulinic acid.

As shown in FIG. 26, 5-aminolevulinic acid (5-ALA) is taken up by a cell and then used in the heme biosynthetic pathway. Protoporphyrin IX, which is a metabolic intermediate of 5-aminolevulinic acid, is known to be selectively accumulated in cancer cells. Due to being a photosensitive substance, protoporphyrin IX can kill or damage cancer cells by generating damage-inducible reactive oxygen in the cancer cells in a case of being irradiated with light of a specific wavelength (photodynamic therapy). In addition, in a case where protoporphyrin IX is irradiated with light of a specific wavelength (for example, 400 to 410 nm), red fluorescence is emitted, and cancer cells can be effectively visualized (photodynamic diagnosis).

By the way, for example, cancer stem cells, which are deeply involved in cancer recurrence, have a particularly high iron uptake, and thus the metabolism of protoporphyrin IX is enhanced. Since protoporphyrin IX is not accumulated in cancer stem cells, there is a concern that the therapeutic effect may be reduced.

However, as described in Non-Patent Document 9, in a case where iron ions in cancer cells are chelated using the cancer therapeutic agent of the embodiment, it is conceived that the protoporphyrin IX accumulativeness can be selectively enhanced in cancer cells, and the effect of photodynamic diagnosis and/or treatment can be improved.

The pharmaceutical composition or cancer therapeutic agent containing the conjugate of the embodiment as an active ingredient may be provided alone as one that is used for photodynamic diagnosis and/or treatment or may be provided as a dosage form, for example, a mixed drug or combination preparation with the ALA's.

As one embodiment, a method is provided including administering the ALA's and the conjugate of the embodiment to a subject in need of treatment.

As one embodiment, a cancer treatment method is provided including administering the ALA's and the conjugate of the embodiment to a subject in need of treatment.

As one embodiment, a pharmaceutical composition or cancer therapeutic agent is provided containing the conjugate of the embodiment as an active ingredient for administration to a subject to which the ALA's are administered.

As one embodiment, a pharmaceutical composition or cancer therapeutic agent is provided containing the ALA's as an active ingredient, for administration to a subject to which the conjugate of the embodiment is administered.

As one embodiment, the conjugate of the embodiment for photodynamic diagnosis and/or treatment for cancer is provided.

As one embodiment, the ALA's and the conjugate of the embodiment for photodynamic diagnosis and/or treatment for cancer are provided.

As one embodiment, the use of the conjugate of the embodiment for photodynamic diagnosis and/or treatment for cancer is provided.

As one embodiment, the use of the ALA's and the conjugate of the embodiment for photodynamic diagnosis and/or treatment for cancer is provided.

As one embodiment, a pharmaceutical composition or cancer therapeutic agent is provided containing the conjugate of the embodiment as an active ingredient, for use in photodynamic diagnosis and/or treatment for cancer.

As one embodiment, a pharmaceutical composition or cancer therapeutic agent is provided containing the ALA's and the conjugate of the embodiment as active ingredients, for use in photodynamic diagnosis and/or treatment for cancer.

As one embodiment, a kit is provided including a pharmaceutical composition or cancer therapeutic agent containing the conjugate of the embodiment as an active ingredient, and a pharmaceutical composition or cancer therapeutic agent containing the ALA's as an active ingredient, for use in photodynamic diagnosis and/or treatment for cancer.

As one embodiment, the use of the conjugate of the embodiment in the production of a medicament for use in photodynamic diagnosis and/or treatment for cancer is provided.

As one embodiment, the use of the ALA's and the conjugate of the embodiment in the production of a medicament for use in photodynamic diagnosis and/or treatment for cancer is provided.

Examples of the above-described subject include a cancer patient.

The above photodynamic diagnosis and/or treatment for cancer includes irradiating cells included in a subject to which the ALA's and/or the conjugate of the embodiment have been administered with a light beam. A tumor is included in the concept of the cells. The wavelength of the light beam is known and may be any wavelength in which reactive oxygen is capable of being generated in cancer cells.

In the present specification, ALA means 5-aminolevulinic acid. ALA is also called δ-aminolevulinic acid and is one kind of amino acid.

Examples of the derivative of ALA include a compound represented by Formula (II). In Formula (II), $R^{21}$ represents a hydrogen atom or an acyl group, and $R^{22}$ represents a hydrogen atom, a linear or branched alkyl group, a cycloalkyl group, an aryl group, or an aralkyl group. ALA corresponds to a case where $R^{21}$ and $R^{22}$ are hydrogen atoms in Formula (II).

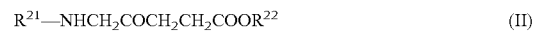

$$R^{21}-NHCH_2COCH_2CH_2COOR^{22} \qquad (II)$$

ALA's may act as an active ingredient in a state of being ALA of Formula (II) or a derivative thereof in a living body and can also be administered as a prodrug (a precursor) that is degraded by an enzyme in the living body.

Examples of the acyl group as $R^{21}$ of Formula (II) include linear or branched alkanoyl groups having 1 to 8 carbon atoms, such as a formyl group, an acetyl group, a propionyl group, a butyryl group, an isobutyryl group, a valeryl group, an isovaleryl group, a pivaloyl group, a hexanoyl group, an octanoyl group, and a benzylcarbonyl group; and aloyl groups having 7 to 14 carbon atoms, such as a benzoyl group, a 1-naphthoyl group, and a 2-naphthoyl group.

Examples of the alkyl group as $R^{22}$ of Formula (II) include linear or branched alkyl groups having 1 to 8 carbon atoms, such as a methyl group, an ethyl group, a propyl group, an isopropyl group, a butyl group, an isobutyl group, a sec-butyl group, a tert-butyl group, a pentyl group, an isopentyl group, a neopentyl group, a hexyl group, a heptyl group, and an octyl group.

The cycloalkyl group as $R^2$ of Formula (II) includes a cycloalkyl group having 3 to 8 carbon atoms, which may be saturated or partially unsaturated, such as a cyclopropyl group, a cyclobutyl group, a cyclopentyl group, a cyclohexyl group, a cycloheptyl group, a cyclooctyl group, a cyclododecyl group, and a 1-cyclohexenyl group.

Examples of the aryl group as $R^{22}$ of Formula (II) include aryl groups having 6 to 14 carbon atoms, such as a phenyl group, a naphthyl group, an anthryl group, and a phenanthryl group.

In the aralkyl group as $R^{22}$ of Formula (II), examples of the aryl group moiety include the same groups as those exemplified as the aryl group, examples of the alkyl moiety include the same groups as those exemplified as the alkyl group, and specific examples of the aralkyl group include aralkyl groups having 7 to 15 carbon atoms, such as a benzyl group, a phenethyl group, a phenylpropyl group, a phenylbutyl group, a benzhydryl group, a trityl group, a naphthylmethyl group, and a naphthylethyl group.

Examples of the preferred ALA derivative include a compound in which $R^{21}$ is a formyl group, an acetyl group, a propionyl group, a butyryl group, or the like. In addition, examples of the preferred ALA derivative include a compound in which the above $R^{22}$ is a methyl group, an ethyl group, a propyl group, a butyl group, a pentyl group, or the like. Further, examples of the preferred ALA derivative include a compound in which the combination of the $R^{21}$ and the $R^{22}$ is each of the combinations of (formyl and methyl), (acetyl and methyl), (propionyl and methyl), (butyryl and methyl), (formyl and ethyl), (acetyl and ethyl), (propionyl and ethyl), and (butyryl and ethyl).

Among ALA's, examples of the salt of ALA or derivative thereof include a pharmacologically acceptable acid addition salt, a metal salt, an ammonium salt, and an organic amine addition salt. Examples of the acid addition salt include inorganic acid salts such as hydrochloride, hydrobromide, hydroiodide, phosphate, nitrate, and sulfate; and organic acid addition salts such as formate, acetate, propionate, toluenesulfonate, succinate, oxalate, lactate, tartrate, glycolate, methanesulfonate, butyrate, valerate, citrate, fumarate, maleate, and malate. Examples of the metal salt include alkali metal salts such as a lithium salt, a sodium salt, and a potassium salt; alkali earth metal salts such as a magnesium and a calcium salt; and metal salts such as an aluminum and a zinc salt. Examples of the ammonium salt include alkylammonium salts such as an ammonium salt and a tetramethylanunonium salt. Examples of the organic amine salt include salts such as a triethylamine salt, a piperidine salt, a morpholine salt, and a toluidine salt. These salts can also be used as a solution at the time of use.

Examples of the ester of ALA's include, but are not limited to, a methyl ester, an ethyl ester, a propyl ester, a butyl ester, and a pentyl ester.

Among the above ALA's, the most desirable ones are ALA and various esters such as an ALA methyl ester, an ALA ethyl ester, an ALA propyl ester, an ALA butyl ester, and an ALA pentyl ester, and a hydrochloride, phosphate, ester, and sulfate thereof. In particular, suitable examples thereof include an ALA hydrochloride and an ALA phosphate.

The ALA's can be produced by a known method such as chemical synthesis, microorganismic production, or enzymatic production. Further, the above ALA's may form a hydrate or a solvate, and ALA's may be used alone or in combination of two or more thereof as appropriate.

In a case of preparing the above ALA's as an aqueous solution, attention should be paid so that the aqueous solution does not become alkaline in order to prevent degradation of the ALA's. In a case of becoming alkaline, the degradation can be prevented by removing oxygen.

The pharmaceutical composition or cancer therapeutic agent containing the conjugate of the embodiment as an active ingredient can be used in vitamin C therapy using ascorbic acid or a derivative thereof or a salt thereof (hereinafter, also simply referred to as "ascorbic acids", and details of the ascorbic acids will be described later). Hereinafter, the principle of vitamin C therapy using ascorbic acid will be described.

In a case where a pharmacological concentration of vitamin C (ascorbic acid) is injected intravenously, it is known that hydrogen peroxide ($H_2O_2$) is generated in the extracellular region inside the tumor, and this hydrogen peroxide permeates into the tumor cells to induce an antitumor effect (vitamin C therapy) [Q. Chen, M. G. Espey, M. C. Krishna, J. B. Mitchell, C. P. Corpe, G. R. Buettner, E. Shacter, M. Levine, Pharmacologic ascorbic acid concentrations selectively kill cancer cells: action as a pro-drug to deliver hydrogen peroxide to tissues. Proc. Natl. Acad. Sci. U.S.A. 102, 13604-13609 (2005)., Q. Chen, M. G. Espey, A. Y. Sun, J. H. Lee, M. C. Krishna, E. Shacter, P. L. Choyke, C. Pooput, K. L. Kirk, G. R. Buettner, M. Levine, Ascorbate in pharmacologic concentrations selectively generates ascorbate radical and hydrogen peroxide in extracellular fluid in vivo. Proc. Natl. Acad. Sci. U.S.A. 104, 8749-8754 (2007)., Q. Chen, M. G. Espey, A. Y. Sun, C. Pooput, K. L. Kirk, M. C. Krishna, D. S. Khosh, J. Drisko, M. Levine, Pharmacologic doses of ascorbate act as a prooxidant and decrease growth of aggressive tumor xenografts in mice. Proceedings of the National Academy of Sciences of the United States of America 105, 11105-11109 (2008).].

On the other hand, according to recent studies [M. Mojic, J. Bogdanovic Pristov, D. Maksimovic-Ivanic, D. R. Jones, M. Stanic, S. Mijatovic, 1. Spasojevic, Extracellular iron diminishes anticancer effects of vitamin C: an in vitro study. Sci. Rep. 4, 5955 (2014).], it has been reported that excess iron ions in the extracellular region in the tumor convert hydrogen peroxide into hydroxyl radicals by the Fenton reaction and that the hydroxyl radicals have low intracellular permeability and thus the cell-killing effect is reduced. As a result, in a case where the excess iron ions in the tumor can be inactivated, it is expected that the antitumor effect of vitamin C can be improved.

In the present specification, ascorbic acid or a derivative thereof or a salt thereof is included in the concept of "ascorbic acids", are is also referred to as vitamin C. Further, although naturally occurring ascorbic acid is L-ascorbic acid, any one of L-ascorbic acid or D-ascorbic acid obtained by chemical synthesis can be suitably used.

Examples of the salt of ascorbic acid include the kinds of salts exemplified as the above-described salts of ALA's.

The pharmaceutical composition or cancer therapeutic agent containing the conjugate of the embodiment as an active ingredient may be provided alone as one that is used in vitamin C therapy or may be provided as a dosage form, for example, a mixed drug or combination preparation with the ascorbic acids.

As one embodiment, a method is provided including administering the ascorbic acids and the conjugate of the embodiment to a subject in need of treatment.

As one embodiment, a cancer treatment method is provided including administering the ascorbic acids and the conjugate of the embodiment to a subject in need of treatment.

As one embodiment, a pharmaceutical composition or cancer therapeutic agent is provided containing the conjugate of the embodiment as an active ingredient for administration to a subject to which the ascorbic acids are administered.

As one embodiment, a pharmaceutical composition or cancer therapeutic agent is provided containing the ascorbic acids as an active ingredient, for administration to a subject to which the conjugate of the embodiment is administered.

As one embodiment, the conjugate of the embodiment for vitamin C therapy for cancer is provided.

As one embodiment, the ascorbic acids and the conjugate of the embodiment for vitamin C therapy for cancer are provided.

As one embodiment, the use of the conjugate of the embodiment for vitamin C therapy for cancer is provided.

As one embodiment, the use of the ascorbic acids and the conjugate of the embodiment for vitamin C therapy for cancer is provided.

As one embodiment, a pharmaceutical composition or cancer therapeutic agent is provided containing the conjugate of the embodiment as active ingredients, for use in vitamin C therapy for cancer.

As one embodiment, a pharmaceutical composition or cancer therapeutic agent is provided containing the ascorbic acids and the conjugate of the embodiment as active ingredients, for use in vitamin C therapy for cancer.

As one embodiment, a kit is provided including a pharmaceutical composition or cancer therapeutic agent containing the conjugate of the embodiment as an active ingredient, and a pharmaceutical composition or cancer therapeutic agent containing the ascorbic acids as an active ingredient, for use in vitamin C therapy for cancer.

As one embodiment, the use of the conjugate of the embodiment in the production of a medicament for use in vitamin C therapy for cancer is provided.

As one embodiment, the use of the ascorbic acids and the conjugate of the embodiment in the production of a medicament for use in vitamin C therapy for cancer is provided.

Examples of the above-described subject include a cancer patient.

The above-described vitamin C therapy includes administering ascorbic acids to a subject and preferably including intravenously injecting thereto. A patient having a tumor is included in the concept of the subject.

The concentration of ascorbic acids in the tumor in the vitamin C therapy is not particularly limited as long as it has an antitumor effect; however, as an example, it may be 1 mM or more, 2 mM or more, or 3 mM or more. The upper limit value of the concentration of ascorbic acids in the tumor in the vitamin C therapy is not particularly limited; however, as an example, it may be 20 mM or less, 15 mM or less, or 10 mM or less. As an example of the above numerical range of the concentration of ascorbic acids in the tumor, for example, it may be 1 mM or more and 20 mM or less, may be 2 mM or more and 15 mM or less, and may be 3 mM or more and 10 mM or less.

The administration of the pharmaceutical composition or cancer therapeutic agent of the embodiment to a subject or the administration thereof to a patient can be carried out by, for example, intraarterial injection, intravenous injection, or subcutaneous injection, and also can be carried out intranasally, transbronchially, intramuscularly, transcutaneously, orally by a method known to those skilled in the art. The dose varies depending on the body weight and the age of the patient, the administration method, and the like; however, those skilled in the art can appropriately select an appropriate dose. The dose and the administration method vary depending on the body weight and the age of the patient, the symptoms, and the like; however, they can be appropriately selected by those skilled in the art.

The dosage form of the pharmaceutical composition or cancer therapeutic agent of the embodiment may be appropriately determined according to the administration route and is not limited; however, examples thereof include an injection agent, a drip infusion agent, a tablet, a capsule, a fine grain agent, a powdered drug, a liquid drug, an aqueous agent dissolved in syrup or the like, a patch, and a suppository.

The dosage form of the pharmaceutical composition or cancer therapeutic agent containing the conjugate of the embodiment as an active ingredient is preferably an oral agent, an injection agent, or a drip infusion agent.

The dosage form of the pharmaceutical composition or cancer therapeutic agent containing the ALA's as an active ingredient is preferably an oral agent, an injection agent, or a drip infusion agent.

The dosage form of the pharmaceutical composition or cancer therapeutic agent containing the ascorbic acids as an active ingredient is preferably an injection agent or a drip infusion agent, and more preferably an injection agent or drip infusion agent for intravenous injection.

Other optional components such as another medicinal component, a nutritional supplement, and a carrier can be added to the pharmaceutical composition or the cancer therapeutic agent, as necessary. As the optional components the following can be added: pharmaceutically acceptable conventional carriers such as crystalline cellulose, gelatin, lactose, starch, magnesium stearate, talc, vegetable and animal fats, oil and fat, gum, a polyalkylene glycol; and various blending components for preparation, such as a binder, stabilizer, a solvent, a dispersion medium, a bulking agent, an excipient, a diluent, a pH buffer agent, a disintegrating agent, a solubilization agent, a dissolution auxiliary agent, and an isotonic agent.

Examples of the formulation of the pharmaceutical composition or cancer therapeutic agent of the embodiment include a tablet, a capsule, an elixir, and an oral agent used as a microcapsule drug, which are optionally coated with sugar.

Alternatively, examples thereof include aseptic solutions with water or another pharmaceutically acceptable liquid and those that are used parenterally in the form of an injection agent of a suspension preparation. Further, examples thereof include those formulated by combining pharmacologically acceptable carriers or media, specifically, sterile water, a physiological saline solution, vegetable oil, an emulsifier, a suspending agent, a surfactant, a stabilizer, a flavoring agent, an excipient, a vehicle, a preservative, and a binder, and mixing them in the unit dosage form required for generally accepted pharmaceutical practice.

As additives that can be mixed with a tablet or a capsule, for example, the following can be used: binders such as gelatin, cornstarch, gum tragacanth, gum arabic; excipients such as crystalline cellulose; swelling such as cornstarch, gelatin, and alginic acid; lubricants such as magnesium stearate; sweetening agents such as sucrose, lactose, saccharin; and flavoring agents such as peppermint, Akamono (Japanese azalea) oil, and cherry. In a case where the preparation unit form is a capsule, the above-described material can further contain a liquid carrier such as fat or oil. The sterile composition for injection can be prescribed according to ordinary pharmaceutical practice using a vehicle such as distilled water for injection.

Examples of the aqueous solution for injection include a physiological saline solution, an isotonic solution containing glucose and other adjuvants, for example, D-sorbitol, D-mannose. D-mannitol, and sodium chloride, and may be used in combination with a suitable dissolution auxiliary agent such as alcohol, specifically, ethanol or polyalcohol such as propylene glycol or polyethylene glycol; and a nonionic surfactant such as polysorbate 80 (TM) or HCO-50.

Examples of the oily liquid include sesame oil and soybean oil and may be used in combination with benzyl benzoate or benzyl alcohol, as a dissolution auxiliary agent. In addition, it may also be blended with a buffer such as a phosphate buffer or a sodium acetate buffer, a soothing agent such as procaine hydrochloride, a stabilizer such as benzyl alcohol or phenol, and an antioxidant. In general, an appropriate ampoule is filled with the prepared injection solution.

The dose of the conjugate to be administered with the pharmaceutical composition or cancer therapeutic agent can be administered, in terms of DFO, in a range of 0.1 mg to 1,000 mg, preferably in a range of 0.1 mg to 200 mg, more preferably in a range of 0.5 mg to 50 mg, and still more preferably in a range of 1 mg to 20 mg per 1 kg of the body weight of the subject, depending on the height, weight, age, and symptoms of the subject.

The dose of ALA's to be administered with the pharmaceutical composition or cancer therapeutic agent can be administered, in terms of ALA (that is, in terms of mass in a case where $R^{21}$ and $R^{22}$ in Formula (II) are a hydrogen atom), in a range of 1 mg to 1,000 mg, preferably in a range of 5 mg to 100 mg, more preferably in a range of 10 mg to 30 mg, and still more preferably in a range of 15 mg to 25 mg per 1 kg of the body weight of the subject, depending on the height, weight, age, and symptoms of the subject.

The dose of ascorbic acids to be administered with the pharmaceutical composition or cancer therapeutic agent may be, in terms of ascorbic acid, 5 mg or more and may be 20 mg or more, and for example, may be 5 mg to 1,000 mg and may be 20 mg to 1,000 mg per 1 kg of the body weight of the subject, depending on the height, weight, age, and symptoms of the subject. In a case of examining the dose of ascorbic acids at a higher concentration, the dose of ascorbic acids may be, in terms of ascorbic acid, 50 mg to 1,000 mg, may be 250 mg to 1000 mg, may be 400 mg to 1,000 mg, and may be 500 mg to 800 mg per 1 kg of the body weight of the subject.

Regarding the number of administrations and the frequency of administration in a case where the ALA's or ascorbic acids and the conjugate of the embodiment are administered to a subject, those skilled in the art can appropriately determine the appropriate number of administrations and the frequency of administration by considering the administration state (the administration interval, the number of administrations, and the administration period) of each of the ALA's or ascorbic acids and the conjugate, which are to be used in combination. In one embodiment of the present invention, the pharmaceutical composition or cancer therapeutic agent containing the conjugate of the embodiment as an active ingredient may be administered before, during, or after the administration of the ALA's or ascorbic acids.

The effective amount of each of the pharmaceutical composition or cancer therapeutic agent containing the conjugate of the embodiment as an active ingredient and the ALA's or ascorbic acids can be administered to a subject, at the same time or at different times, continuously or at intervals. The pharmaceutical composition or cancer therapeutic agent containing the conjugate of the embodiment as an active ingredient and the ALA's or ascorbic acids may be each administered to a tumor patient in the same administration cycle or may be administered in different administration cycles.

In one embodiment of the present invention, the administration of the ALA's or ascorbic acids to a subject is started before the administration of the pharmaceutical composition or cancer therapeutic agent containing the conjugate of the embodiment as an active ingredient is started. For example, the ALA's or ascorbic acids may be administered one or more times or may be administered daily from one week before the start of administration to the day of administration of the pharmaceutical composition or cancer therapeutic agent containing the conjugate of the embodiment as an active ingredient. The timing of the start of administration of the pharmaceutical composition or cancer therapeutic agent containing the conjugate of the embodiment as an active ingredient is not particularly limited; however, the timing of the administration of the pharmaceutical composition or cancer therapeutic agent containing the conjugate of the embodiment as an active ingredient is preferably within one week, more preferably within three days, and still more preferably within one day from the start of administration of the ALA's or ascorbic acids.

In another embodiment of the present invention, the administration of the ALA's or ascorbic acids to a subject is started on the same day as the day of administration of the pharmaceutical composition or cancer therapeutic agent containing the conjugate of the embodiment as an active ingredient is started. For example, the ALA's or ascorbic acids can be administered from the start day of administration of the pharmaceutical composition or cancer therapeutic agent containing the conjugate of the embodiment as an active ingredient. In a case where the ALA's or ascorbic acids and the pharmaceutical composition or cancer therapeutic agent containing the conjugate of the embodiment as an active ingredient are administered at the same time, they may be prepared as a single preparation and administered, or may be administered simultaneously through separate routes of administration.

In another embodiment of the present invention, the administration of the ALA's or ascorbic acids to a subject is started on the same day as the day of administration of the pharmaceutical composition or cancer therapeutic agent containing the conjugate of the embodiment as an active ingredient is started. For example, the pharmaceutical composition or cancer therapeutic agent containing the conjugate of the embodiment as an active ingredient may be administered one or more times or may be administered daily from one week before the start of administration to the day of administration of the ALA's or ascorbic acids. The timing of the start of administration of the ALA's or ascorbic acids is not particularly limited; however, the timing of the administration of the ALA's or ascorbic acids is preferably within one week, more preferably within three days, and still more preferably within one day from the start of administration of the pharmaceutical composition or cancer therapeutic agent containing the conjugate of the embodiment as an active ingredient.

The terms used in the present specification are used to describe the specific embodiment and are not intended to limit the invention, except those particularly defined.

In addition, it is intended that the term "include" or "contain" in the present specification indicates the described matter (the member, the step, the element, the number, or the like) is present unless a different understanding is clearly required in its context, and does not exclude that another matter (a member, a step, an element, a number, or the like) is present.

EXAMPLES

Next, the present invention will be described in more detail by showing Examples, but the present invention is not limited to Examples below.

1. Synthesis of PEG$_{10k}$-Poly[Aspartic Acid (Deferoxamine)$_m$]$_n$ 1.1. Overview A synthesis method for an iron chelating agent PEG$_{10k}$-Poly[Aspartic acid (Deferoxamine)$_m$]$_n$ (hereinafter, abbreviated as PEG-P[Asp(DFO)$_m$]$_n$) produced in Example is described. n represents the polymerization degree of Asp, and m represents the number of DFO's introduced.

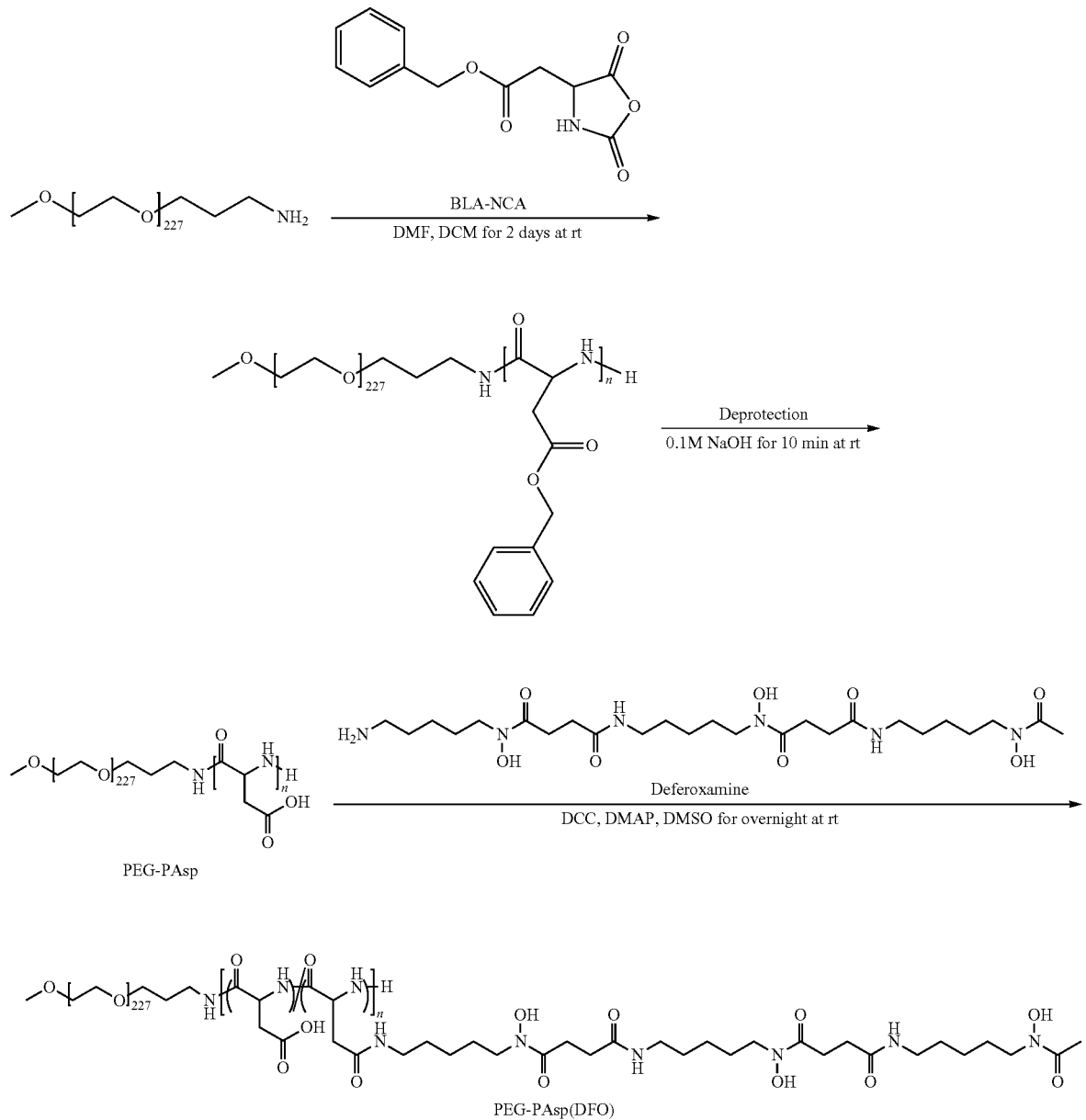

PEG-PBLA$_n$ was synthesized by N-carboxyanhydride (NCA) polymerization using PEG$_{10k}$-NH$_2$ as an initiator and BLA-NCA as a monomer. The carboxy group of the side chain was deprotected under basic conditions to obtain PEG-PAsp$_n$. Then, the amino group of deferoxamine was conjugated to the carboxy group of PEG-PAsp$_n$ to obtain PEG-P[Asp(DFO)$_m$]$_n$.

1.2. Reagent

Regarding reagents and solvents not otherwise described, commercially available products were used as they were.

α-Methoxy-ω-amino-poly(ethylene glycol) (PEG-NH$_2$) [Mw: 10K]: NOF Co., Inc.
Benzene: Nacalai Tesque Inc.
β-benzyl L-aspartate N-carboxyanhydride (BLA-NCA): Chuo Kaseihin Co., Inc.
Dichloromethane (DCM): Wako Pure Chemical Industries Co., Ltd.
Distilled in an argon atmosphere and used.
(b.p.: 40° C.)
N,N-dimethylformamide (DMF): Wako Pure Chemical Industries Co., Ltd.
Distilled in an argon atmosphere and used.
(b.p.: 135° C.)
Hexane: Kanto Chemical Co., Inc.
Ethyl acetate: Kanto Chemical Co., Inc.
5 mol/L HCl: Nacalai Tesque Inc.
5 mol/L NaOH: Wako Pure Chemical Industries Co., Ltd.
Dimethyl sulfoxide (DMSO): Nacalai Tesque Inc.
Deferoxamine mesylate (DFO): Sigma Aldrich Co., llc.
N,N'-dicyclohexylcarbodiimide (DCC): Wako Pure Chemical Industries Co., Ltd.
N,N-dimethyl-4-aminopyridine (DMAP): Wako Pure Chemical Industries Co., Ltd. Sodium chloride (NaCl): Nacalai Tesque Inc.
Sodium dihydrogen phosphate (NaH$_2$PO$_3$): Wako Pure Chemical Industries Co., Ltd.

1.3. Measuring Apparatus

Nuclear magnetic resonance (NMR): BRUKER AVANCE 111400 (400 MHz, BRUKER BioSpin)
Spinning: off
Number of times of integration: 24 times
Temperature: 25° C.
Gel permeation chromatography (GPC): Jasco International Co., Ltd.
Column: TSK-gel superAW3000 (Tosoh Corporation)
Superdex 200 Increase 10/300 GL (GE Healthcare)
Detector: R1-2031

<1.4. Synthesis Method>

Figure 2:
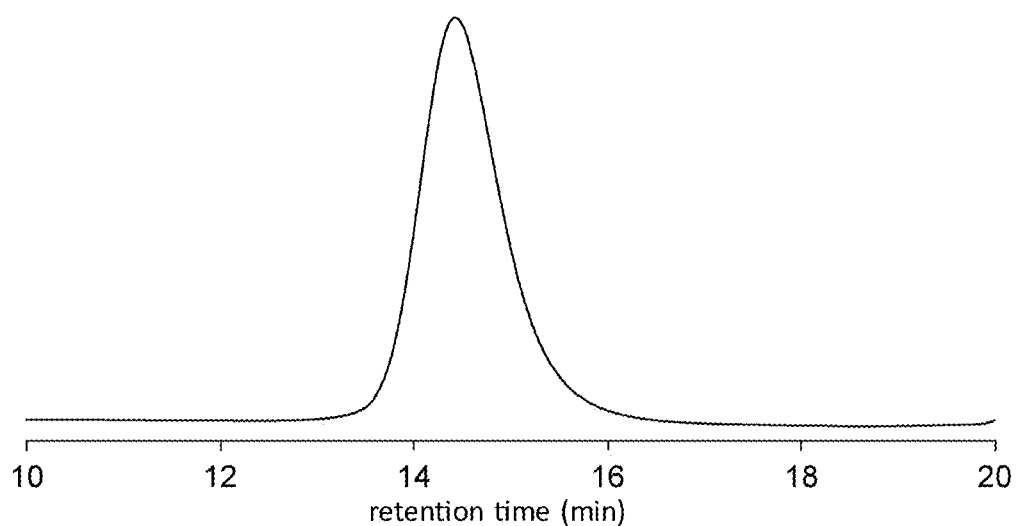
FIG. 2 is a GPC curve of PEG-PBLA$_{35}$.
Figure 3:
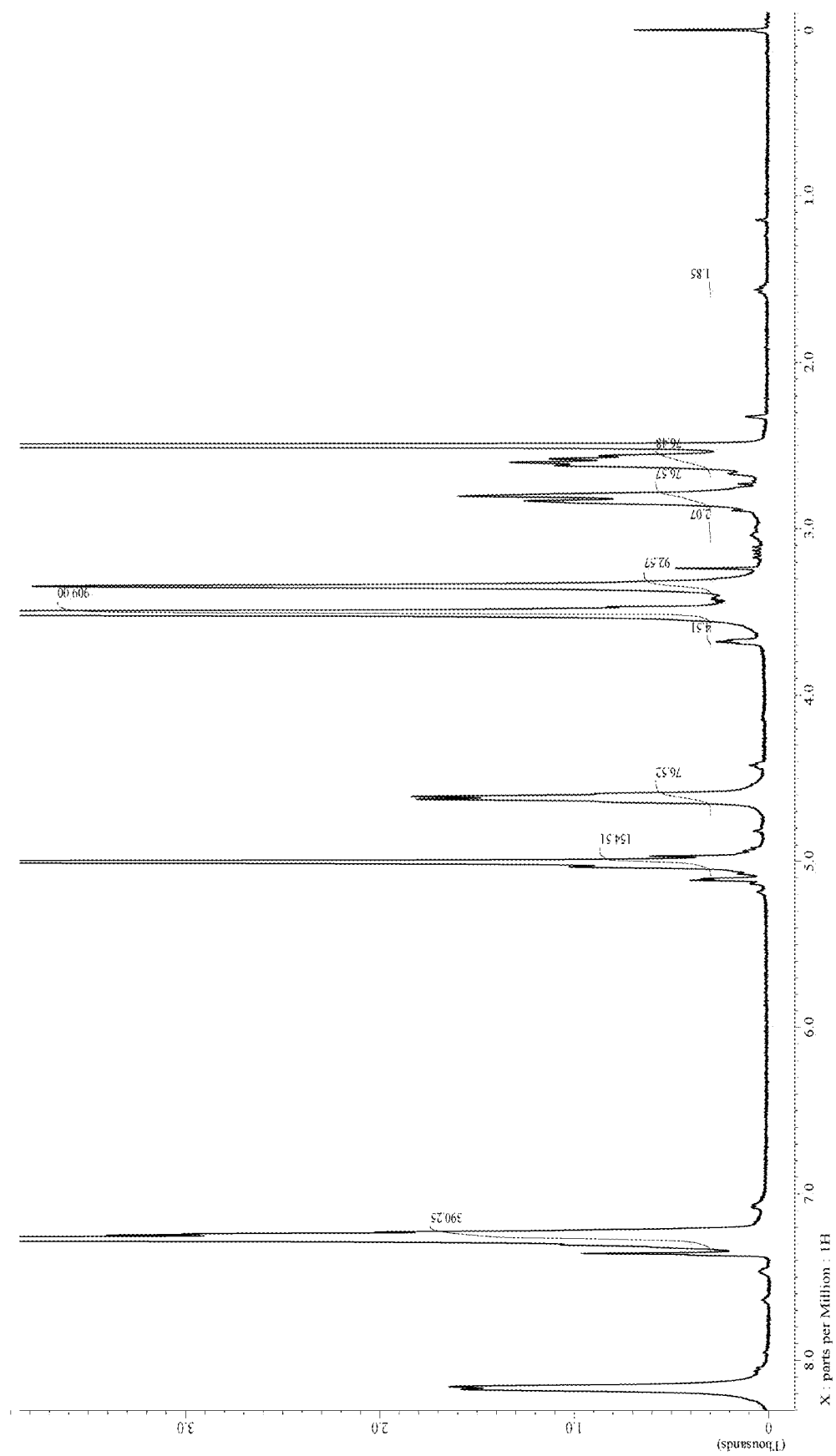
FIG. 3 is a $^1$H NMR spectrum of PEG-PBLA$_{78}$ prepared in Example.
Figure 4:
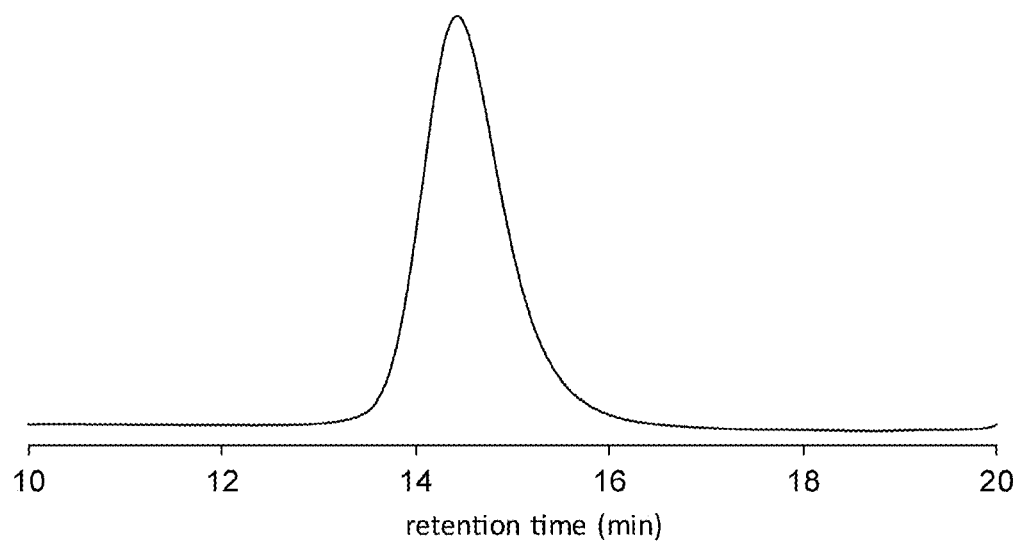
FIG. 4 is a GPC curve of PEG-PBLA$_{78}$.

Synthesis of PEG-PBLA$_n$ 1.00 g (0.100 nmmol) of PEG-NH$_2$ was weighed and placed in a 300 mL two-necked eggplant flask, dissolved in 10.0 mL of benzene, and then freeze-dried. 1.20 g (4.81 mmol) of BLA-NCA (n=35) and 2.40 g (9.62 mmol) of BLA-NCA (n=78) were weighed and placed in a 100 mL two-necked eggplant flask under an argon atmosphere. 1.36 mL of DMF and 13.6 mL of DCM were added to PEG-NH$_2$. In addition, 1.63 mL and 3.26 ml of DMF were respectively added to BLA-NCA (n=35) and BLA-NCA (n=78), and 16.3 mL and 32.6 ml of DCM were respectively added to BLA-NCA (n=35) and BLA-NCA (n=78), and the resultant mixture was dissolved. The BLA-NCA solution was added to the PEG-NH$_2$ solution and stirred at room temperature for 48 hours under an argon atmosphere. The reaction solution was added dropwise to both of 600 mL (n=35) and 750 mL (n=78) of a mixed solvent of hexane and ethyl acetate (hexane:ethyl acetate=3:2) and purified by reprecipitation. Then, the precipitate was dried under reduced pressure to obtain white solids of PEG-PBLA$_n$ in yield amounts of 1.71 g (n=35) and 2.54 g (n=78) and yield rates of 97% (n=35) and 98% (n=78). $^1$H-NMR spectra are shown in FIG. 1 and FIG. 3, and GPC curves (acquired under the following conditions, column: TSK-gel superAW3000, eluent: NMP (50 mM LiBr), flow rate: 0.30 mL/min, measurement temperature: 40° C.) are shown FIG. 2 and FIG. 4.

$^1$H NMR spectrum of PEG-PBLA$_{35}$
$^1$H NMR (400 MHz, DMSO-d6): δ 2.53-2.69, 2.76-2.92 (br, —CH$_2$—C=O—O—), 3.42-3.67 (br, —CH$_2$—CH$_2$—O—), 4.95-5.13 (br, —O—CH$_2$-Ph), 7.20-7.39 (br, Ph).

$^1$H NMR spectrum of PEG-PBLA$_{78}$
$^1$H NMR (400 MHz, DMSO-d6): Attribution is the same as that of the above $^1$H NMR spectrum of PEG-PBLA$_{35}$.

[Deprotection of PEG-PBLA$_n$]

Figure 5:
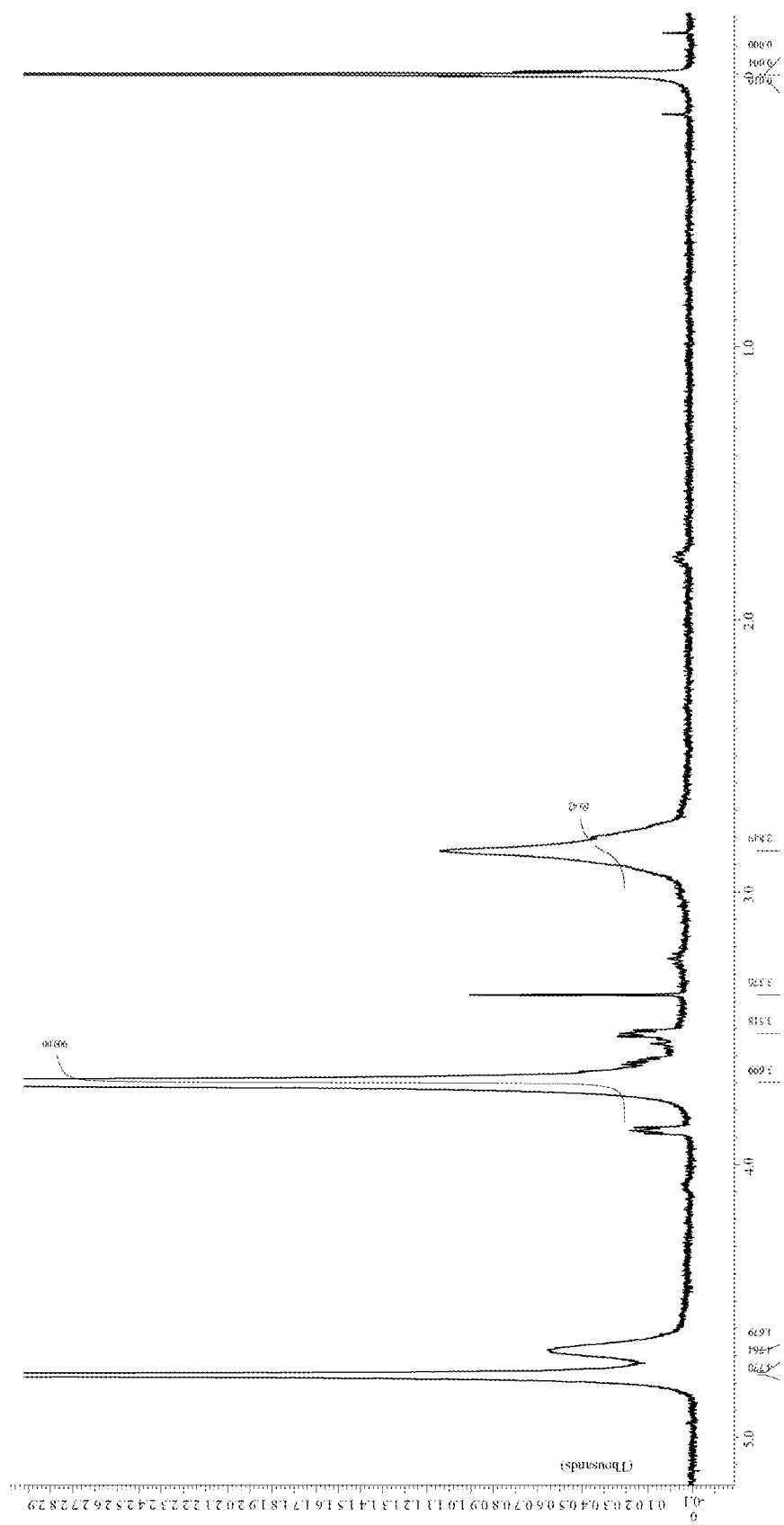
FIG. 5 is a $^1$H NMR spectrum of PEG-PAsp$_{35}$ prepared in Example.
Figure 6:
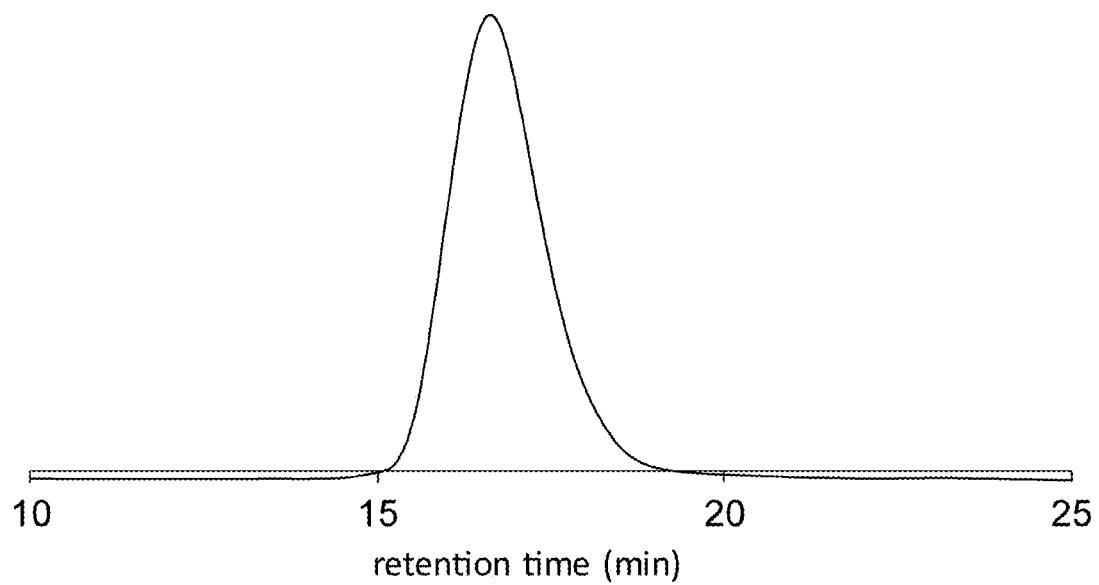
FIG. 6 is a GPC curve of PEG-PAsp$_{35}$.
Figure 7:
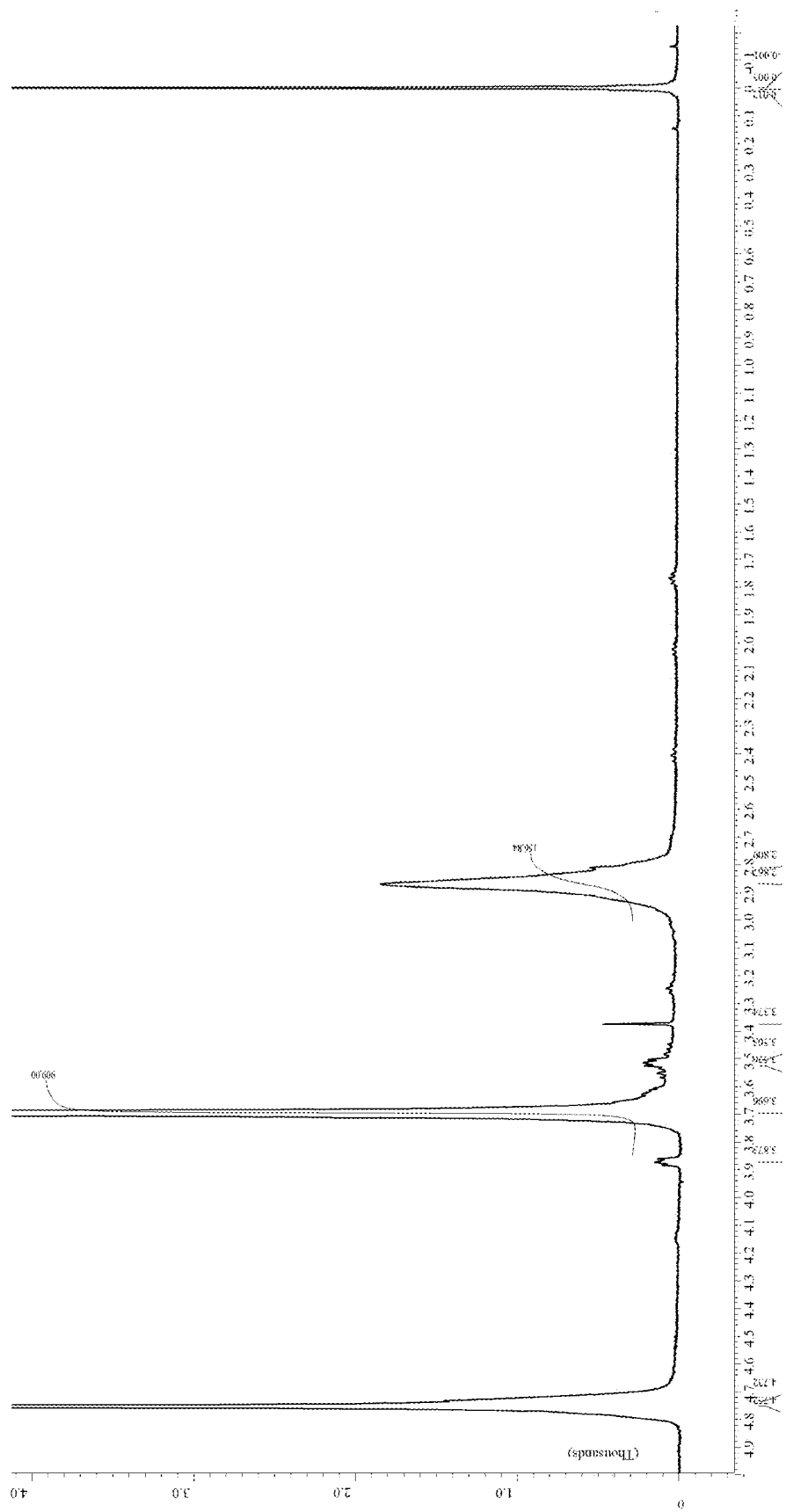
FIG. 7 is a $^1$H NMR spectrum of PEG-PAsp$_{78}$ prepared in Example.
Figure 8:
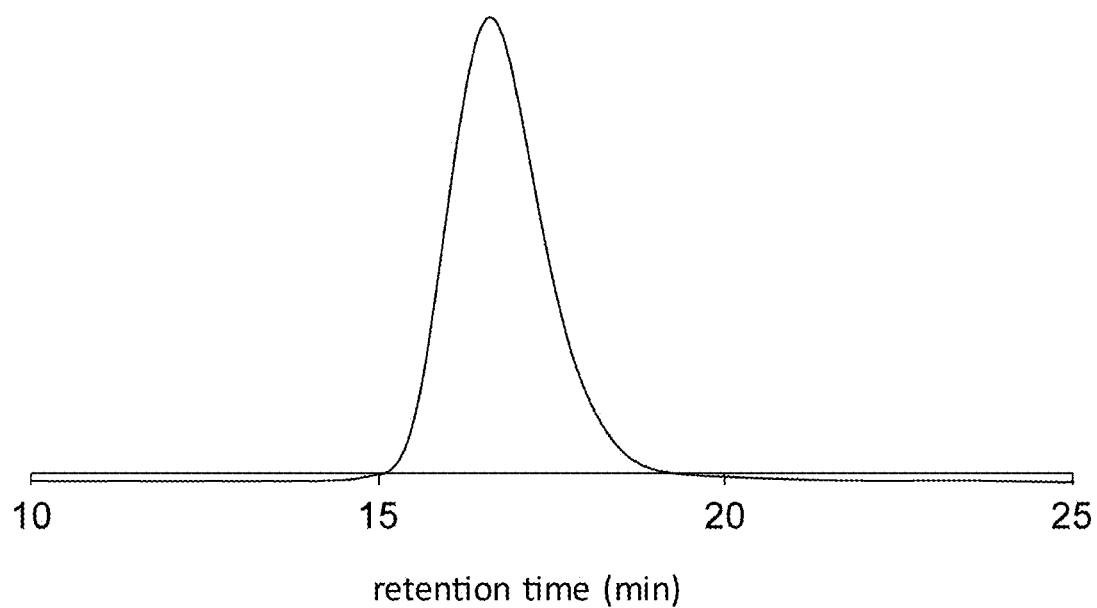
FIG. 8 is a GPC curve of PEG-PAsp$_{78}$.

Each of 500 mg (0.0284 mmol) of PEG-PBLA$_{35}$ and 500 mg (0.0194 mmol) of PEG-PBLA$_{78}$ was weighed and placed in a 50 mL eggplant flask, and 5 mL of 0.1 M NaOH was added thereto and stirred overnight at room temperature. The reaction solution was placed in a dialysis membrane (MWCO=6-8 kDa) and dialyzed twice with 2 L of 0.01 M HCl and subsequently twice with 2 L of pure water. The solution was freeze-dried to obtain white solids of PEG-PAsp$_n$ in yield amounts of 367 mg (n=35) and 331 mg (n=78) and yield rates of 92% (n=35) and 90% (n=78). $^1$H-NMR spectra are shown in FIG. 5 and FIG. 7, and GPC curves (acquired under the following conditions, column: Superdex 200 increase 10/300 GL, eluent: 10 mM NaH$_2$PO$_4$, 140 mM NaCl (pH 7.4), flow rate: 0.75 mL/min, measurement temperature: room temperature) are shown in FIG. 6 and FIG. 8.

$^1$H NMR spectrum of PEG-PAsp$_{35}$
$^1$H NMR (400 MHz, D$_2$O): δ 2.73-2.97 (br, —CH$_2$—COOH), 3.62-3.82 (br, —CH$_2$—CH$_2$—O—).

$^1$H NMR spectrum of PEG-PAsp$_{78}$
$^1$H NMR (400 MHz, D$_2$O): Attribution is the same as that of the above $^1$H NMR spectrum of PEG-PAsp$_{35}$.

[Conjugation of DFO to PEG-PAsp$_n$]

Figure 9:
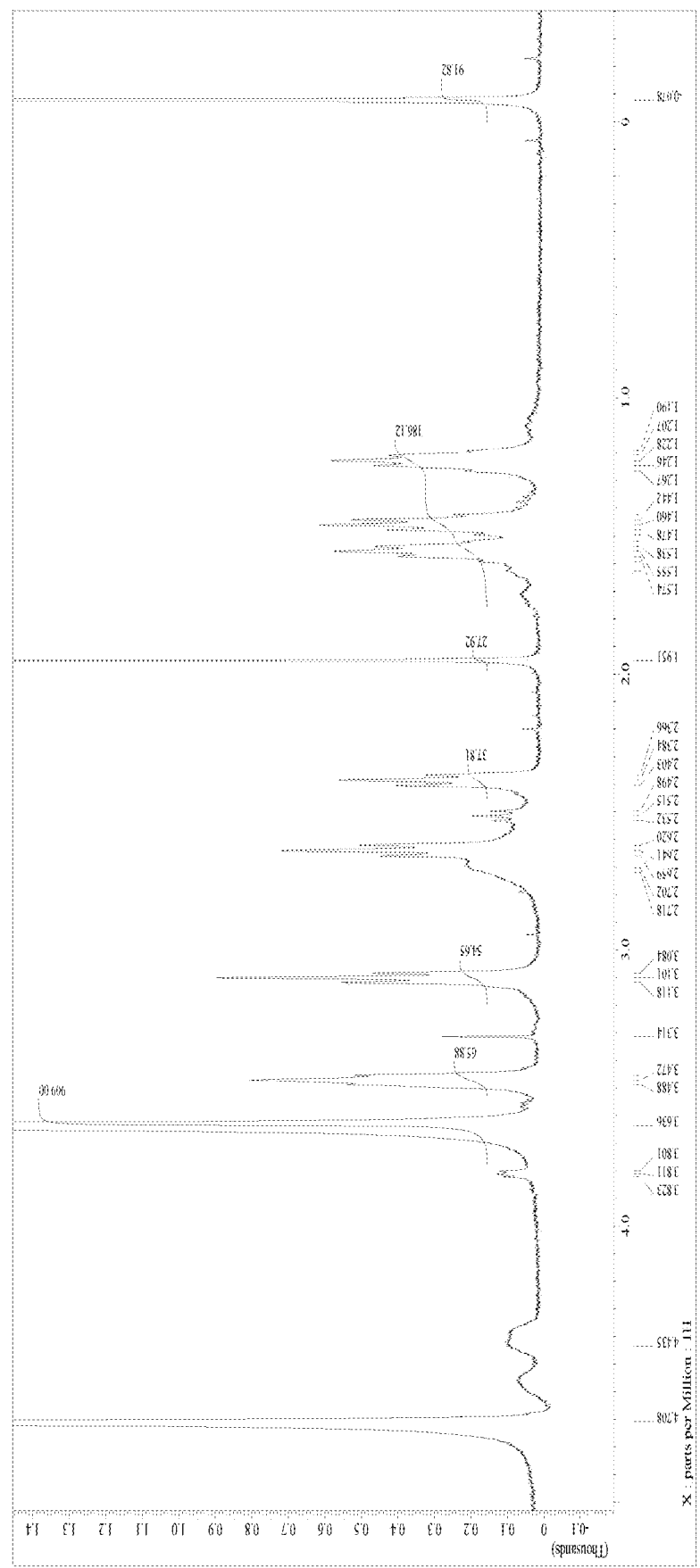
FIG. 9 is a $^1$H NMR spectrum of PEG-P[Asp(DFO)$_{10}$]$_{35}$ prepared in Example.
Figure 10:
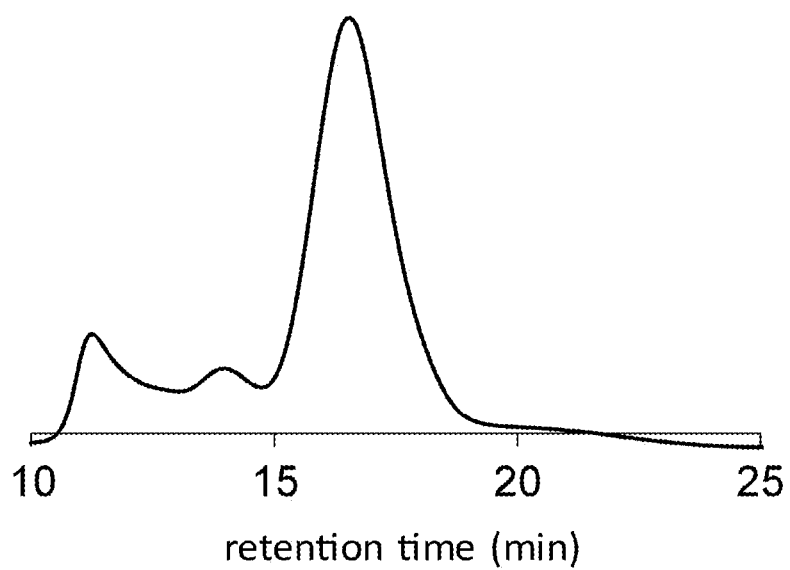
FIG. 10 is a GPC curve of PEG-P[Asp(DFO)$_{10}$]$_{35}$.
Figure 11:
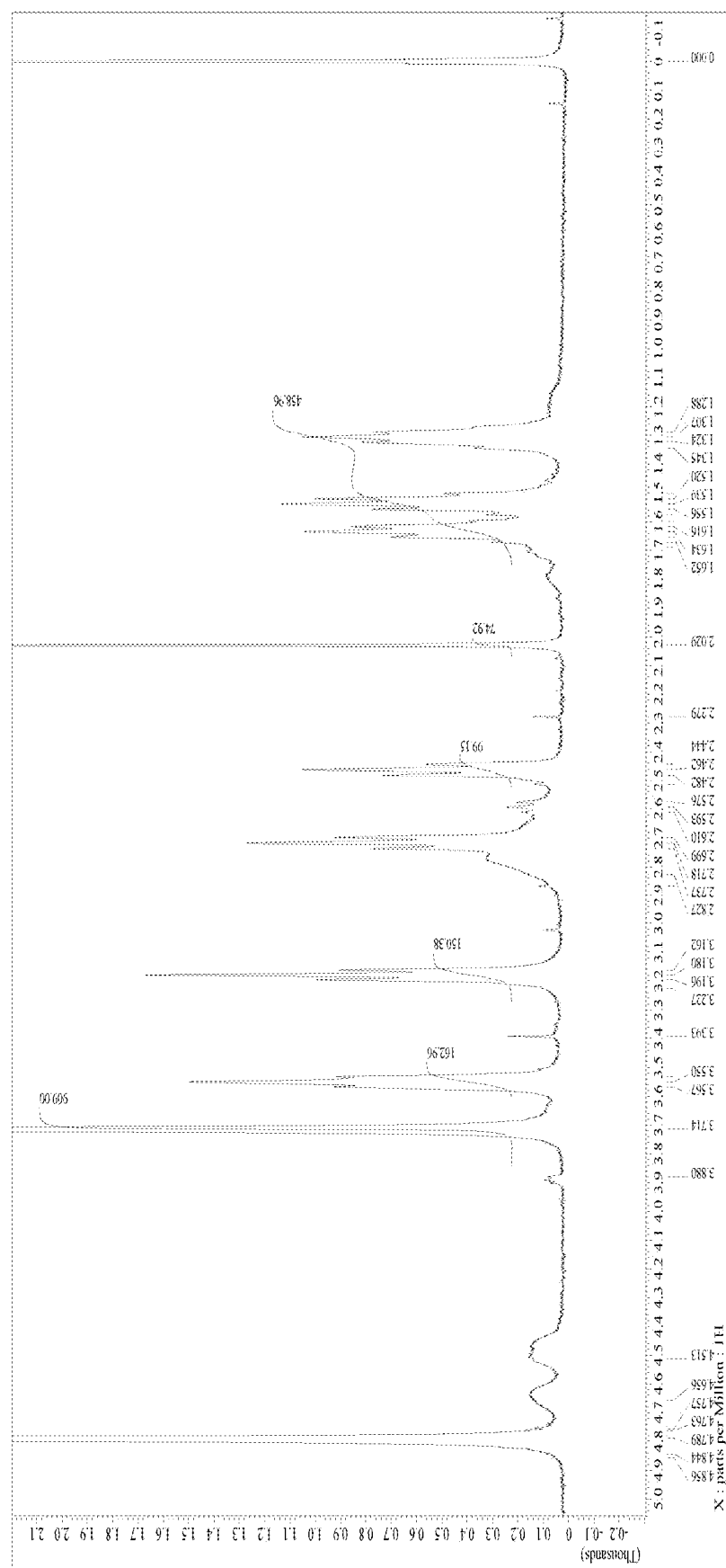
FIG. 11 is a $^1$H NMR spectrum of PEG-P[Asp(DFO)$_{26}$]$_{78}$ prepared in Example.
Figure 12:
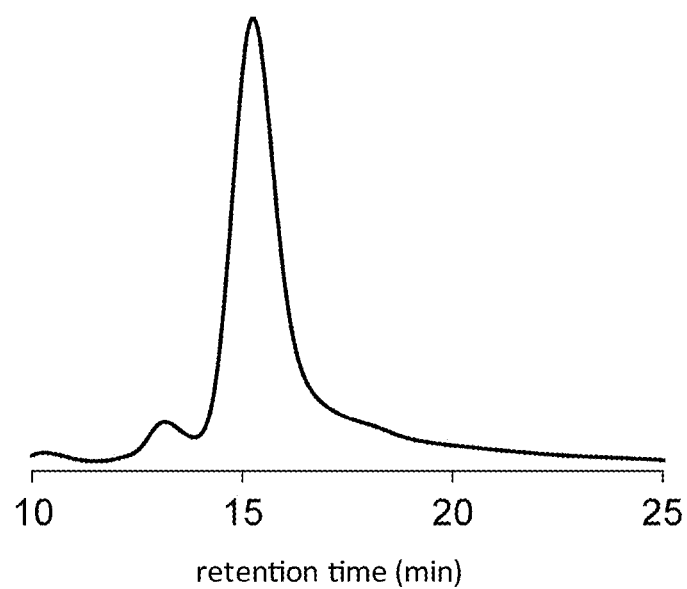
FIG. 12 is a GPC curve of PEG-P[Asp(DFO)$_{26}$]$_{78}$.

Each of 100 mg (7.14 μmol) of PEG-Asp$_{35}$ and 100 mg (5.26 μmol) of PEG-Asp$_{78}$ was weighed and placed in a 50 mL eggplant flask and dissolved in 30 mL of DMSO. 256 mg (1.24 mmol) of DCC (n=35) and 407 mg (1.91 mmol) of DCC (n=78), 30.3 mg (0.248 mmol) of DMAP (n=35) and 48.1 mg (0.394 mmol) of DMAP (n=78), 163 mg (0.248 mmol) of DFO (n=35) and 259 mg (0.394 mmol) of DFO (n=78) were added thereto and stirred overnight at room temperature. The reaction solution was placed in a dialysis membrane (MWCO=3.5 kD), dialyzed three times with 300 mL of acetone, and then dialyzed twice with 2 L of 0.01 M NaOH and subsequently twice with 2 L of pure water. The obtained solution was filtered through a 0.45 μm filter and then freeze-dried to obtain white solids of PEG-P[Asp (DFO)$_m$]$_n$ in yield amounts of 120 mg (n=35) and 139 g (n=78) and yield rates of 87% (n=35) and 80% (n=78). $^1$H-NMR spectra are shown in FIG. 9 and FIG. 11, and GPC curves are shown in FIG. 10 and FIG. 12.

$^1$H NMR spectrum of PEG-P[Asp(DFO)$_{10}$]$_{35}$
$^1$H NMR (400 MHz, D$_2$O, NaOD): δ 1.13-1.96 (br, —CH$_2$—CH$_2$—CH$_2$—), 1.98-2.09 (br, —C=O—CH$_3$), 2.43-2.55 (br, —CH$_2$—C=O—NH—), 3.08-3.33 (br, —C=O—NH—CH$_2$—), 3.52-3.62 (br, —CH$_2$—NOH—), 3.66-3.90 (br, —CH$_2$—CH$_2$—O—).

$^1$H NMR spectrum of PEG-P[Asp(DFO)$_{26}$]$_{78}$ $^1$H NMR (400 MHz, D$_2$O, NaOD): Attribution is the same as that of the above $^1$H NMR spectrum of PEG-P[Asp (DFO)$_{10}$]$_{35}$.

1.5. Analysis

[PEG-PBLA$_n$]

From the ratio between integrated values of a peak derived from the initiator [3.42-3.67 ppm (—CH$_2$—CH$_2$—O—)] and a peak derived from BLA-NCA [2.53-2.69, 2.76-2.92 ppm —CH$_2$—C=O—O—), 4.95-5.13 (—O—CH$_2$-Ph), 7.20-7.39 ppm (Ph)] in the $^1$H NMR spectrum, it was determined that the polymerization degree (DP) of PBLA=35 (n=35) and DP of PBLA=77 (n=78), the number average molecular weight (Mn)=17,600 (PEG:PBLA=10,000:7,600) (n=35) and Mn=25,800 (PEG:PBLA=10,000:15,800) (n=78). In addition, from the GPC curve, it was determined that the molecular weight dispersity of the obtained polymer was Mw/Mn=1.12 (n=35) and Mw/Mn=1.11 (n=78), whereby it was confirmed that the polymer has a narrow molecular weight distribution.

[PEG-PAsp$_n$]

From the ratio between integrated values of a peak derived from the initiator [3.62-3.82 ppm (—CH$_2$—CH$_2$—O—)] and a peak derived from the β-hydrogen of aspartic acid (2.73-2.97 ppm) in the $^1$H NMR spectrum, it was determined that the polymerization degree (DP) of Asp=35 (n=35) and DP of Asp=78 (n=78), the number average molecular weight (Mn)=14,000 (PEG:PAsp=10,000:4,000) (n=35) and Mn=19,000 (PEG:PBLA=10,000:9,000) (n=78). In addition, from the GPC curve, it was confirmed that the obtained polymer has a narrow molecular weight distribution having a single peak.

[PEG-P[Asp(DFO)$_m$]$_n$

From the ratio between integrated values of a peak derived from the initiator [3.66-3.90 ppm (—CH$_2$—CH$_2$—O—)] and a peak from DFO [1.13-1.96 ppm (—CH$_2$—CH$_2$—CH$_2$—), 1.98-2.09 ppm (—C=O—CH$_3$), 2.43-2.55 ppm (—CH$_2$—C=O—NH—), 3.08-3.33 ppm (—C=O—NH—CH$_2$—), 3.52-3.62 ppm (—CH$_2$—NOH—)] in the $^1$H NMR spectrum, it was determined that the number of DFO's introduced was 10 (n=35) and 26 (n=78), and the number average molecular weights were Mn=19,300 (n=35) and Mn=32,900 (n=78). In addition, from the GPC curve, it was confirmed that the obtained polymer has a narrow molecular weight distribution having a single peak.

In addition, PEG-P[Asp(DFO)$_{36}$]$_{76}$ (Mn=45,000) was further obtained in the same manner as in the above synthesis method.

Analysis was carried out by $^1$H NMR (400 MHz, D$_2$O, NaOD), and attribution was confirmed to be the same as that of the above $^1$H NMR spectrum of PEG-P[Asp(DFO)$_{10}$]$_{35}$.

2. Evaluation of Iron Chelating Ability of PEG-P [Asp(DFO)$_m$]$_n$

2.1. Overview

Figure 13:
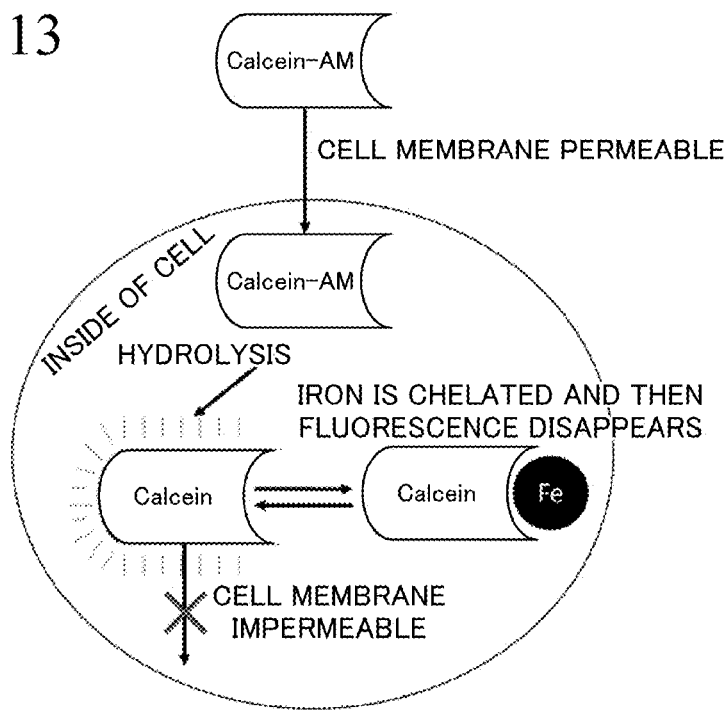
FIG. 13 is a schematic diagram showing the principle of the Calcein-AM method.

A DFO/Fe (III) complex has a characteristic absorption peak near 420 nm. Based on the above, the iron chelating ability of PEG-P[Asp(DFO)$_m$]$_n$ was evaluated by absorption spectrum measurement. In addition, the iron chelating ability of PEG-P[Asp(DFO)$_m$]$_n$ in the biological environment was evaluated by the calcein-AM method, which has been established as a method of indirectly quantifying the amount of iron ions in a cell. FIG. 13 briefly shows the principle of the calcein-AM method.

[Principle of Calcein-AM Method]

Calcein-AM is a cell-membrane-permeable compound that does not show fluorescence by itself, and is hydrolyzed by intracellular esterase to become calcein. This calcein is a compound that exhibits strong yellow-green fluorescence and is retained inside the cell since it is membrane-impermeable. In addition, since calcein has an iron chelating ability and the fluorescence thereof disappears in a case where calcein forms a complex with iron, the intracellular iron ion concentration can be indirectly measured by measuring the fluorescence of calcein.

2.2. Reagent

Regarding reagents and solvents not otherwise described, commercially available products were used as they were.

Deferoxamine mesylate (DFO): Sigma Aldrich Co., llc.
PEG-P[Asp(DFO)$_{10}$]$_{35}$ (Mn=19,300)
PEG-P[Asp(DFO)$_{26}$]$_{78}$ (Mn=32,900)
FeCl$_3$·6H$_2$O: Wako Pure Chemical Industries Co., Ltd.
D-PBS (−): Wako Pure Chemical Industries Co., Ltd.
Roswell Park Memorial Institute medium (RPMI): Sigma Aldrich Co., llc.
Fetal bovine serum (FBS): Biosera Inc.
Trypsin-EDTA solution: Sigma life science Co., Ltd.
Penicillin/streptomycin: Sigma life science Co., Ltd.
Calcein-AM: Dojindo Molecular Technologies Inc.
CT26 cell (mouse colon carcinoma cell line): American Type Culture Collection. DLD-1 cell (human colon adenocarcinoma cell line): American Type Culture Collection

2.3. Measuring Apparatus

NanoDrop One: Thermo Fisher Scientific Inc.
Countess: Thermo Fischer Scientific Inc.
LSM710: Carl Zeiss Co., Ltd.
Guava (registered trade name) easyCyte Flow Cytometry (FCM): Merck Millipore

2.4. Evaluation by Absorption Spectrum Measurement

[Preparation of DFO Solution, PEG-P[Asp(DFO)$_{10}$]$_{35}$ Solution, PEG-P[Asp(DFO)$_{26}$]$_{78}$, and FeCl$_3$ Solution]

Figure 14:
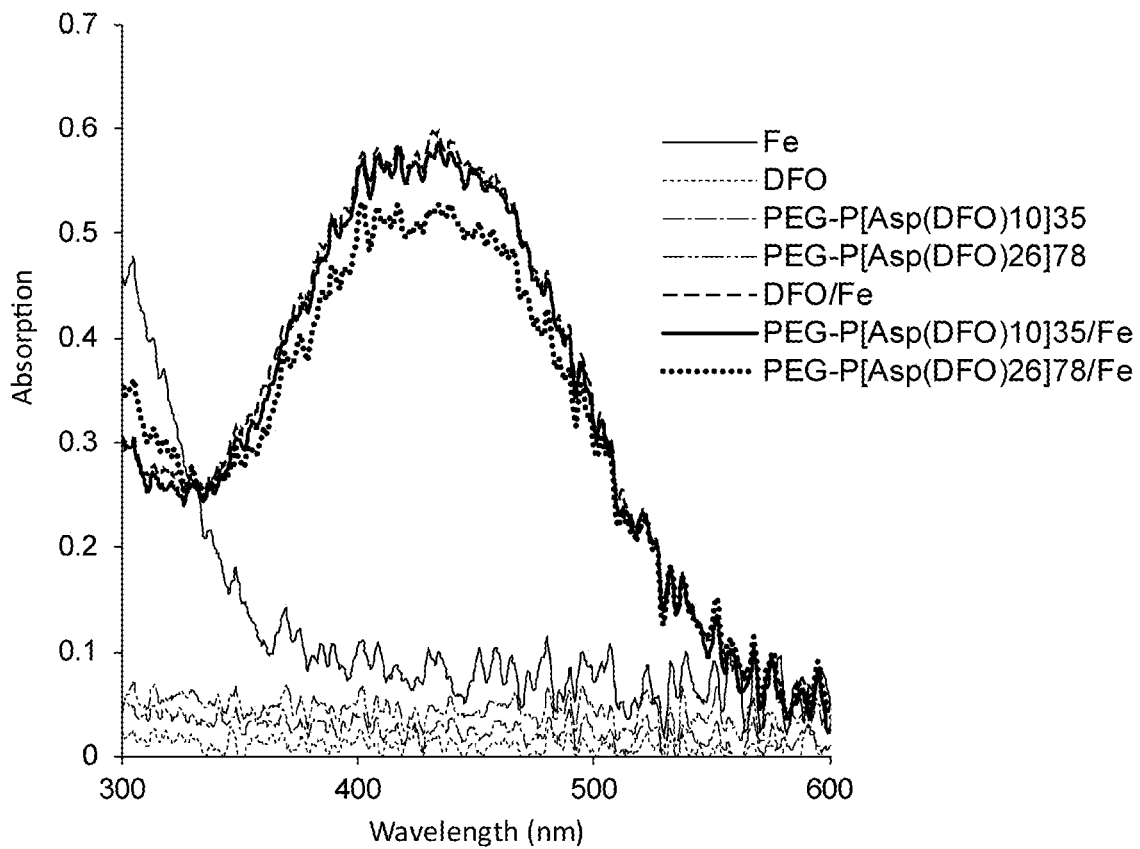
FIG. 14 is a UV-Vis spectrum of DFO/Fe and PEG-P[Asp(DFO)$_m$]$_n$/Fe (n=35, 78).

DFO/D-PBS solution: 0.625 mM
PEG-P[Asp(DFO)$_{10}$]$_{35}$/D-PBS solution: 0.0635 mM (DFO concentration=0.625 mM)
PEG-P[Asp(DFO)$_{26}$]$_{78}$/D-PBS solution: 0.0245 mM (DFO concentration=0.625 mM)
FeCl$_3$/D-PBS solution: 2.50 mM 200 μL of a FeCl$_3$ solution was added to 800 μL of each of a DFO solution, a PEG-P[Asp(DFO)$_{10}$]$_{35}$ solution, and a PEG-P[Asp(DFO)$_{26}$]$_{78}$ solution. After diluting 2-fold with D-PBS, the resultant mixture was sufficiently stirred, and the absorption spectrum was measured with Nanodrop. The results are shown in FIG. 14.

PEG-P[Asp(DFO)$_{10}$]$_{35}$/Fe and PEG-P[Asp(DFO)$_{26}$]$_{78}$/Fe also showed characteristic absorption peaks of DFO/Fe, and thus it was confirmed that they had an excellent iron chelating ability.

2.5. Evaluation by Calcein-AM Method

[Preparation of DFO Solution, PEG-P[Asp(DFO)$_{10}$]$_{35}$ Solution, and PEG-P[Asp(DFO)$_{26}$]$_{78}$ Solution]
  DFO/D-PBS solution: 2.00 mM
  PEG-P[Asp(DFO)$_{10}$]$_{35}$/D-PBS solution: 0.203 mM (DFO concentration=2.00 mM)
  PEG-P[Asp(DFO)$_{26}$]$_{78}$/D-PBS solution: 0.0714 mM (DFO concentration=2.00 mM)

Figure 15A:
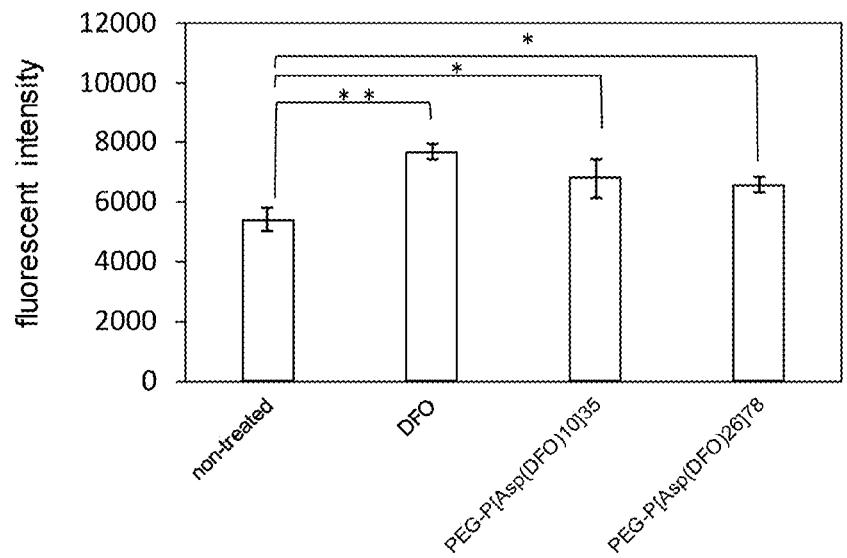
FIG. 15A is a graph showing the fluorescence intensity of the calcein fluorescence acquired by flow cytometry.
Figure 15B:
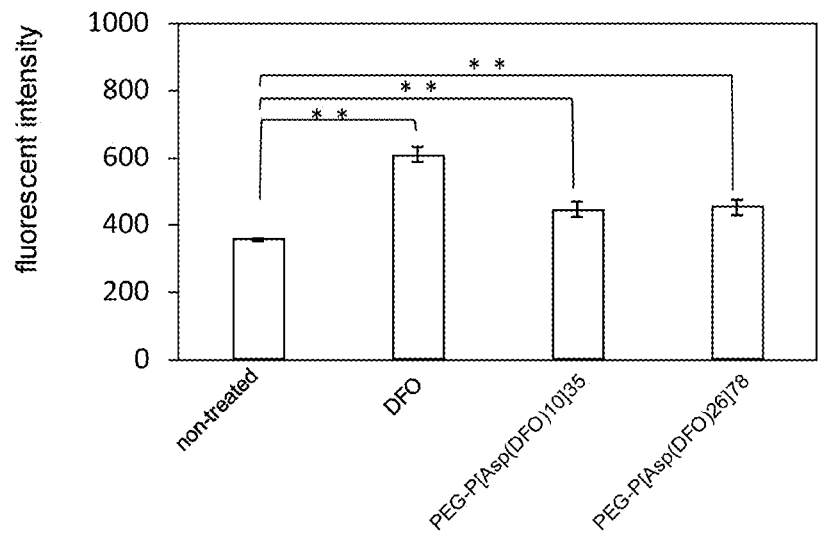
FIG. 15B is a graph showing the fluorescence intensity of the calcein fluorescence acquired by flow cytometry.

DLD-1 cells or CT26 cells were seeded on a 24-well plate at $5.0\times10^4$ cells/well and pre-cultured at 37° C. under 5% $CO_2$ for 24 hours. The prepared solution described above was diluted 10-fold with RPMI, and then 500 μL was added to each well followed by incubating for 24 hours. After washing with 500 μL of D-PBS, a 0.100 μM calcein-AM solution was added, and in a dark place, DLD-1 cells were incubated for 30 min and CT26 cells were incubated for 15 min. After washing twice with 500 μL of D-PBS, 150 μL of Trypsin EDTA was added, and DLD-1 cells were incubated for 10 min and CT26 cells were incubated for 3 min. After confirming that the cells had been peeled off under an optical microscope, 300 of D-PBS containing 10% FBS was added thereto, and the cells were sufficiently suspended. The suspension was filtered through a cell strainer and the calcein fluorescence was measured by FCM. The obtained results are shown in FIG. 15. FIG. 15A shows the measurement results of DLD-1 cells, and FIG. 15B shows the measurement results of CT26 cells. The results are shown as the value of mean±S.D. (n=3), and a statistically significant difference was evaluated by the t-test (*$p<0.05$, **$p<0.01$).

Since PEG-P[Asp(DFO)$_{10}$]$_{35}$ and PEG-P[Asp(DFO)$_{26}$]$_{78}$ increased the fluorescence intensity of calcein, it was shown that the intracellular iron ion concentration was decreased, and it was confirmed that PEG-P[Asp(DFO)$_{10}$]$_{35}$ and PEG-P[Asp(DFO)$_{26}$]$_{78}$ have an iron chelating ability in an ecological environment as well.

3. Evaluation in Cultured Cell

3.1. Overview

The intracellular distribution of PEG-P[Asp(DFO)$_m$]$_n$ (Cy5-PEG-P[Asp(DFO)$_m$]$_n$) labeled with a fluorescent dye (Cy5) was observed under a confocal microscope. Next, the cellular uptake amounts of DFO and PEG-P[Asp(DFO)$_m$]$_n$ were compared. Subsequently, to investigate the mechanism of cancer cell proliferation suppression of PEG P[Asp(DFO)$_m$]$_n$, the effect thereof on the cell cycle was evaluated. Finally, the cancer cell proliferation suppressive action was evaluated by CCK-8 assay.

3.2. Reagent and Cell Line

Regarding reagents not otherwise described, commercially available products were used as they were.
  PEG-P[Asp(DFO)$_{10}$]$_{35}$ (Mn=19,300)
  PEG-P[Asp(DFO)$_{26}$]$_{78}$ (Mn=32,900)
  Cy5-NHS: Thermo Fisher Scientific Inc.
  Used as 10 mg/mL Cy5-NHS/DMSO.
  Dimethyl sulfoxide (DMSO): Nacalai Tesque Inc.
  GaCl$_3$: Tokyo Chemical Industry Co., Ltd.
  5 mol/L NaOH: Wako Pure Chemical Industries Co., Ltd.
  HNO$_3$: Wako Pure Chemical Industries Co., Ltd.
  Roswell Park Memorial Institute medium (RPMI): Sigma Aldrich Co., llc.
  D-PBS (–): Wako Pure Chemical Industries Co., Ltd.
  Fetal bovine serum (FBS): Biosera Inc.
  Trypsin-EDTA solution: Sigma life science Co., Ltd.
  Penicillin/streptomycin: Sigma life science Co., Ltd.
  LysoTracker (registered trade name) red DND-99: Thermo Fisher Scientific Inc.
  Hoechst 33342: Thermo Fisher Scientific Inc.
  RNase A: Macherey nagel Inc.
  Propidium iodide: Dojindo Molecular Technologies Inc.
  Cell Counting Kit-8: Dojindo Molecular Technologies Inc.
  CT26 cell (mouse colon carcinoma cell line): American Type Culture Collection DLD-1 cell (human colon adenocarcinoma cell line): American Type Culture Collection

3.3. Measuring Apparatus

Countess: Thermo Fischer Scientific Inc.
  LSM710: Carl Zeiss Co., Ltd.
  Guava (registered trade name) easyCyte Flow Cytometry (FCM): Merck Millipore
  Agilent 7900 ICP-MS: Agilent Technology Co., Ltd.

3.4. Observation of Intracellular Distribution of PEG-P[Asp(DFO)$_m$]$_n$ Under a Confocal Microscope A fluorescent dye (Cy5) was introduced into PEG-P[Asp(DFO)$_m$]$_n$, and the intracellular distribution of (Cy5-PEG-P[Asp(DFO)$_m$]$_n$) was observed using a confocal microscope.

[Synthesis of Cy5-PEG-P[Asp(DFO)$_{10}$]$_{35}$]

Cy5-NHS was bonded to the amino group at the terminal of PEG-P[Asp(DFO)$_m$]$_n$. 20.0 mg (0.99 woe of PEG-P[Asp(DFO)$_{10}$]$_{35}$ was weighed and placed in a 6 mL vial and dissolved in 2.00 mL of pure water. Next, one equivalent of Cy5-NHS (107 μL of a 10.0 mg/nil, Cy5-NHS/DMSO solution) to PEG-P[Asp(DFO)$_{10}$]$_{35}$ was dissolved in 0.200 mL of pure water, and then added to a PEG-P[Asp(DFO)$_{10}$]$_{35}$ solution and stirred overnight at room temperature. The reaction solution was placed in an ultrafiltration membrane (MWCO=10 kD) and subjected to ultrafiltration five times. Then, after further purifying using a PD-10 column, the polymer solution was freeze-dried to obtain 18.0 mg of a blue solid of Cy5-PEG-P[Asp(DFO)$_{10}$]$_{35}$.

[Observation with Confocal Microscope]

Figure 16:
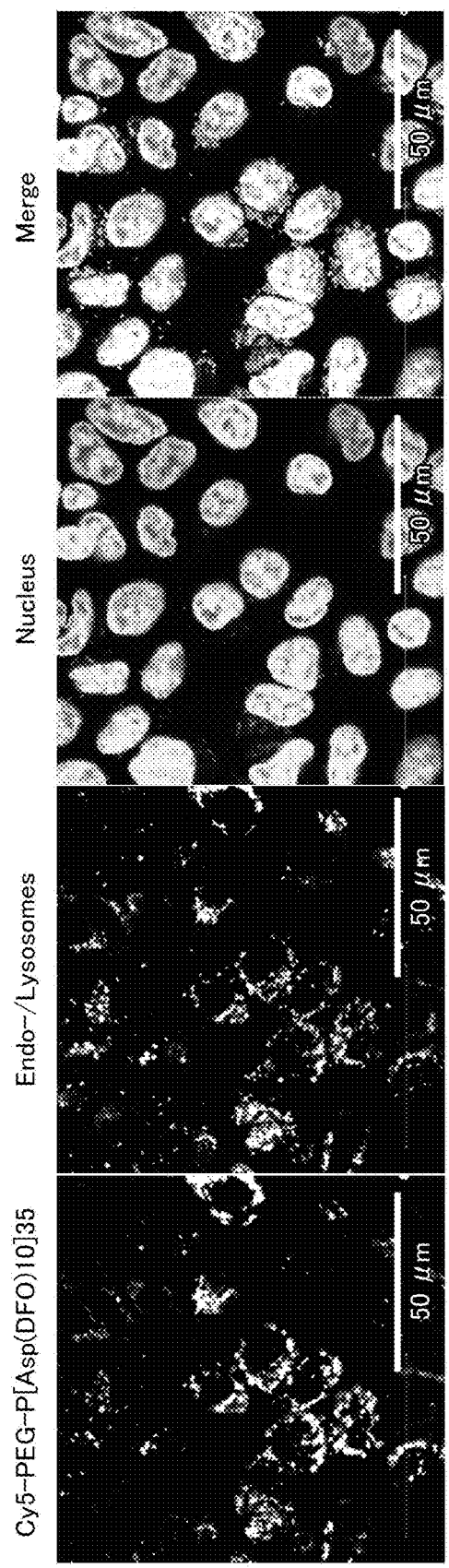
FIG. 16 is a confocal microscope observation image showing a state of DLD-1 cells after the addition of Cy5-PEG-PAsp(DFO) and the subsequent incubation for 24 hours.

DLD-1 cells were seeded on 35 mm² glass base dishes at $5.0\times10^4$ cells/dish and pre-cultured at 37° C. under 5% $CO_2$ for 24 hours. A 23.3 μM Cy5-PEG-P[Asp(DFO)$_{10}$]$_{35}$/D-PBS solution (DFO concentration=200 μM) was diluted 10-fold with RPMI, and then 1 mL was added to each dish followed by incubating for 24 hours. After washing with 1 mL of D-PBS, 1 mL of a 100 nM LysoTracker (registered trade name) red DND-99/(D-PBS: RPM 1=1:9) solution was added thereto followed by incubating for 30 min. After washing with 1 mL of D-PBS, 1 mL of a 5.0 μg/mL Hoechst/D-PBS solution was added thereto followed by incubating for 5 min. After washing twice with 1 mL of D-PBS, 2 mL of RPMI was added thereto and observed with CLSM. The obtained results are shown in FIG. 16.

Since the iron chelating agent used in present Example was localized in endosomes/lysosomes, it was suggested that it is taken up by cells by endocytosis.

<3.5. Evaluation of Cellular Uptake Amount of PEG-P[Asp(DFO)$_m$]$_n$>

To compare the cellular uptake amount of DFO and PEG-P[Asp(DFO)$_m$]$_n$, a DFO/Ga (III) complex and a PEG- P[Asp(DFO)$_{10}$]$_{35}$/Ga (III) complex were added to cells, and then the intracellular Ga content was measured with ICP-MS.

[Preparation of DFO/Ga Solution and PEG-P[Asp(DFO)$_{10}$]$_{35}$/Ga Solution]

DFO/Ga solution 1 mL of a 19.9 mM GaCl$_3$/D-PBS solution was added to 9 mL, of a 2.22 mM DFO/D-PBS solution, and the resultant solution was stirred overnight. The pH was adjusted to 7.4 with NaOH, and then the solution was filtered through a filter. Finally, 90 mL of the RPMI medium was added (DFO concentration=200 µM) thereto.

PEG-P[Asp(DFO)$_{10}$]$_{35}$/Ga solution 1 mL of a 19.9 mM GaCl$_3$/D-PBS solution was added to 9 mL of a 0.226 mM PEG-P[Asp(DFO)$_{10}$]$_{35}$/D-PBS solution (DFO concentration=2.22 mM), and the resultant solution was stirred overnight. The reaction solution was placed in an ultrafiltration membrane (MWCO=10 kD) and subjected to ultrafiltration five times. 10 mL of D-PBS was added to the purified solution, and the resultant solution was filtered through a filter. Finally, 90 mL of the RPMI medium was added (DFO concentration=200 µM) thereto.

[Measurement of Intracellular Ga Content]

Figure 17A:
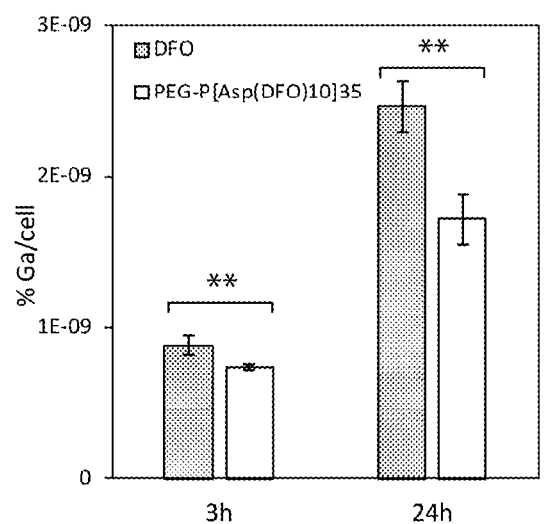
FIG. 17A is a graph showing cellular uptake amounts of DFO and PEG-P[Asp(DFO)$_{10}$]$_{35}$.
Figure 17B:
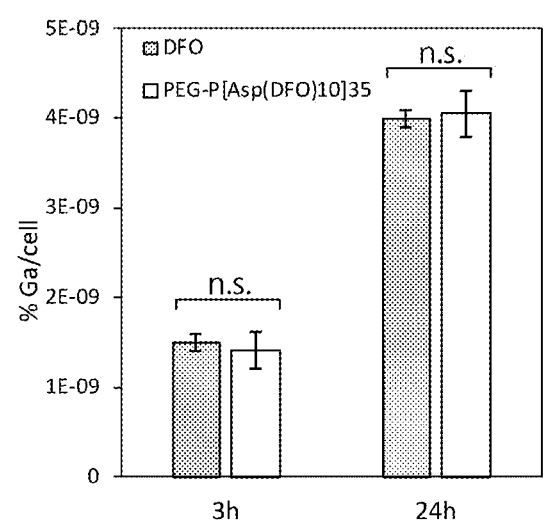
FIG. 17B is a graph showing cellular uptake amounts of DFO and PEG-P[Asp(DFO)$_{10}$]$_{35}$.

DLD-1 cells or CT-26 cells were seeded in a 75 mm$^2$ flask at 5.0×10$^6$ cells/flask and pre-cultured at 37° C. under 5% CO$_2$ for 24 hours. 10 mL of the prepared solution described above was added to each flask followed by incubating for 3 or 24 hours. After washing twice with 5 mL of D-PBS, 2.5 mL, of Trypsin EDTA was added, and DLD-1 cells were incubated for 10 min and CT26 cells were incubated for 5 min. After confirming that the cells had peeled off under an optical microscope, 2.5 mL of the RPMI medium was added and suspended. After the centrifugation at 1,200 rpm for 3 min, the supernatant was removed. 5 mL of the RPMI medium was added to the cells, the cells were sufficiently suspended, and then the number of cells was measured. Centrifugation was performed again under the same conditions to remove the supernatant. Then, 200 µL of HNO$_3$ was added to the pellet, followed by incubation at 90° C. for 1 hour. After filling up to 2 mL with pure water and filtration with a hydrophobic filter, the cellular Ga content was measured by ICP-MS. The obtained results are shown in FIG. 17. FIG. 17A shows the measurement results of DLD-1 cells, and FIG. 17B shows the measurement results of CT26 cells. The results are shown as the value of mean±S.D. (n=3), and a statistically significant difference was evaluated by the t-test (**p<0.01).

There was no significant difference in uptake amount between PEG-P[Asp(DFO)$_{10}$]$_{35}$, which is a polymer, and DFO, which is a low-molecular-weight compound. It was suggested that PEG-P[Asp(DFO)$_{10}$]$_{35}$ was efficiently taken up into cells by endocytosis.

<3.6. Cell Cycle Arrest by PEG-P[Asp(DFO)$_m$]$_n$>

The cell cycle was analyzed by propidium iodide (PI) staining to investigate the mechanism of cancer cell proliferation suppression of DFO and PEG-P[Asp(DFO)$_m$]$_n$.

[Preparation of DFO Solution and PEG-P[Asp(DFO)$_{10}$]$_{35}$ Solution]

DFO/D-PBS solution: 45.0 µM

PEG-P[Asp(DFO)$_{10}$]$_{35}$/D-PBS solution: 61.0 µM (DFO concentration=600 µM)

Figure 18A:
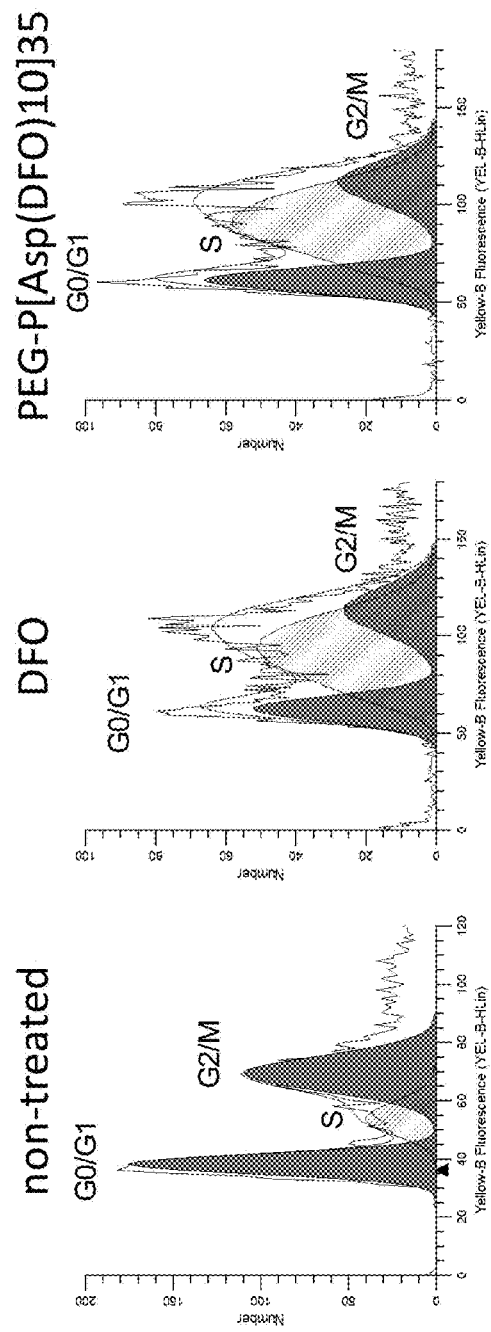
FIG. 18A shows graphs showing results of cell cycle analysis of DLD-1 cells after the addition of DFO and PEG-P[Asp(DFO)$_{10}$]$_{35}$ and the subsequent incubation.
Figure 18B:
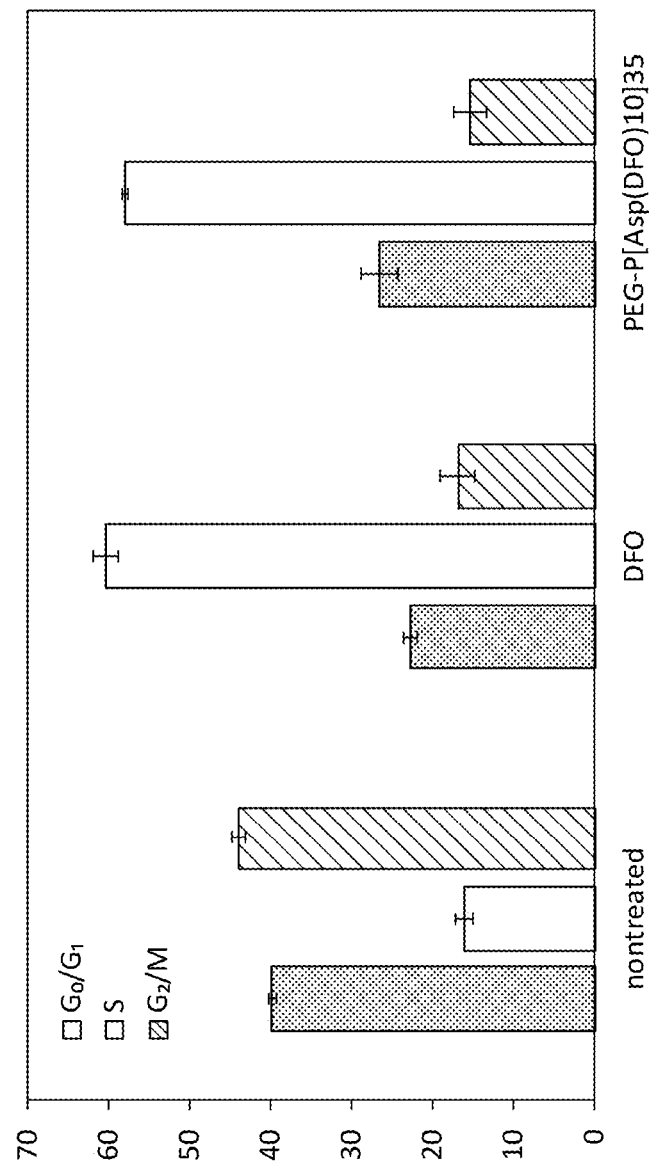
FIG. 18B shows graphs showing results of cell cycle analysis of DLD-1 cells after the addition of DFO and PEG-P[Asp(DFO)$_{10}$]$_{35}$ and the subsequent incubation.

DLD-1 cells were seeded on a 6-well plate at 2.0×10$^5$ cells/well and pre-cultured at 37° C. under 5% CO$_2$ for 24 hours. The prepared solution described above was diluted 10-fold with RPMI, and then 3 mL was added to each well followed by incubating for 72 hours. After washing with 3 mL of D-PBS, 700 µL of a Trypsin-EDTA solution was added thereto followed by incubating for 10 min. After confirming that the cells had been peeled off under an optical microscope, 700 µL of D-PBS containing 10% FBS was added thereto, and the cells were sufficiently suspended. The suspension was centrifuged at 1,200 rpm for 3 min to remove the supernatant. 500 µL of D-PBS was added to the cell pellet, which was subsequently suspended. The suspension was dropwise added to 4.5 mL of 70% ethanol and fixed in a −20° C. freezer overnight. 500 mL of D-PBS containing 10.0 µg/mL propidium iodide and 100 µg/mL RNase was added thereto followed by incubating for 30 min in a dark place. Finally, the suspension was filtered through a cell strainer, and the fluorescence of propidium iodide was measured using FCM. The measured data were analyzed by ModFit LT. The obtained results are shown in FIG. 18. FIG. 18A is a graph showing the distribution of fluorescence acquired by FCM, and FIG. 18B shows the results of converting it into the distribution of cell cycle. The results are shown as the value of mean±S.D. (n=3).

DFO and PEG-P[Asp(DFO)$_{10}$]$_{35}$ induced cell cycle arrest in the S phase.

<3.7. Cell Proliferation Suppressive Action of PEG-P[Asp(DFO)$_m$]$_n$>

The cancer cell proliferation suppressive action of PEG-P[Asp(DFO)$_m$]$_n$ was evaluated by CCK-8 assay.

[Preparation of DFO Solution, PEG-P[Asp(DFO)$_{10}$]$_{35}$ Solution, and PEG-P[Asp(DFO)$_{26}$]$_{78}$ Solution]

DFO/D-PBS solution: 3.00 mM

PEG-P[Asp(DFO)$_{10}$]$_{35}$/D-PBS solution: 0.305 mM (DFO concentration=3.00 mM)

PEG-P[Asp(DFO)$_{26}$]$_{78}$/D-PBS solution: 0.118 mM (DFO concentration=3.00 mM)

Figure 19:
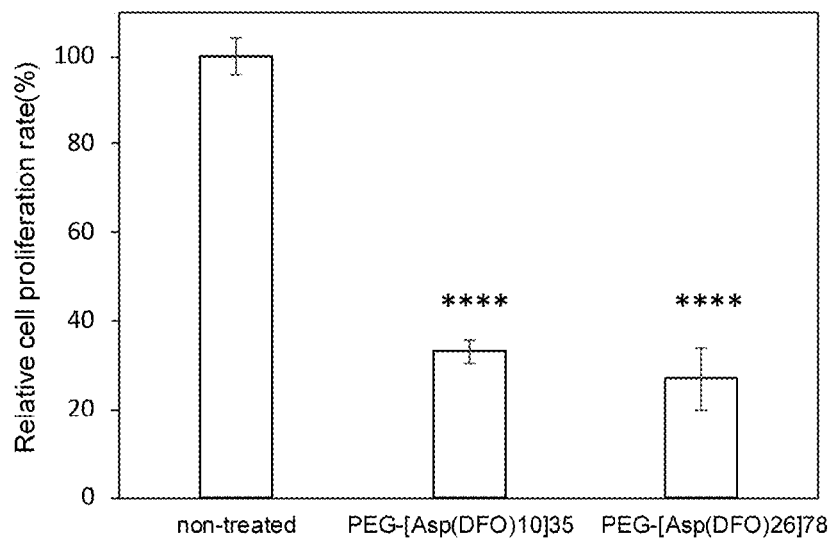
FIG. 19 is a graph showing that cell proliferation is suppressed in DLD-1 cells after the addition of PEG-P[Asp(DFO)$_m$]$_n$ (n=35, 78) and the subsequent incubation.

DLD-1 cells were seeded on a 96-well plate at 1.0×10$^3$ cells/well and pre-cultured at 37° C. under 5% CO$_2$ for 24 hours. 10 µL of the prepared solution described above was added to each well followed by incubating for 72 hours. 10 µL of CCK-8 solution was added to each well, and after incubating for 2 hours, the absorbance at 450 nm was measured. The obtained results are shown in FIG. 19. The results are shown as the value of mean±S.D. (n=5), and a statistically significant difference was evaluated by the t-test (****p<0.0001).

DFO, PEG-P[Asp(DFO)$_{10}$]$_{35}$, and PEG-P[Asp(DFO)$_{26}$]$_{78}$ significantly suppressed the proliferation of DLD-1 cells.

4. Effect on Subcutaneous Tumor Mouse Model (Blood Retention, Tumor Accumulation, and Antitumor Effect)

4.1. Overview

The pharmacokinetics of DFO and PPEG-P[Asp(DFO)$_m$]$_n$ in a subcutaneous CT26 (mouse colon cancer cell) tumor mouse model were evaluated. The antitumor effects of DFO and PEG-P[Asp(DFO)$_m$]$_n$ in DLD-1 (human colorectal cancer cells) and the subcutaneous CT26 tumor mouse model were evaluated.

4.2. Reagent, Cell, and Animal

Deferoxamine mesylate (DFO): Sigma Aldrich Co., llc.
PEG-P[Asp(DFO)$_{10}$]$_{35}$ (Mn=19,300)
PEG-P[Asp(DFO)$_{26}$]$_{78}$ (Mn=32,900)
D-PBS (−): Nacalai Tesque Inc.
GaCl$_3$: Tokyo Chemical Industry Co., Ltd.
5 mol/L NaOH: Wako Pure Chemical Industries Co., Ltd.
HNO$_3$: Wako Pure Chemical Industries Co., Ltd.

CT-26 cell (mouse colon carcinoma cell line): American Type Culture Collection. DLD-1 cell (human colon adenocarcinoma cell line): American Type Culture Collection BALB/c nude mice: Charles River Japan Inc.
BALB/c mice: Charles River Japan Inc.

4.3. Apparatus/Equipment

Countess: Thermo Fischer Scientific Inc.
Agilent 7900 ICP-MS: Agilent Technology Co., Ltd.

4.4. Pharmacokinetics of DFO and PEG-PAsp(DFO)

To evaluate the blood retention and the tumor accumulation of DFO and PEG-P[Asp(DFO)$_m$]$_n$), a DFO/Ga (III) complex and a PEG-P[Asp(DFO)$_m$]$_n$/Ga (III) complex were intravenously injected into the subcutaneous CT26 tumor mouse model, and the Ga contents in the blood and the tumor after a predetermined period of time were measured by ICP-MS.

[Preparation of DFO/Ga Solution, PEG-P[Asp(DFO)$_{10}$]$_{35}$/Ga Solution, and PEG-P[Asp(DFO)$_{26}$]$_{78}$/Ga Solution]

DFO/Ga solution

300 µL of a 26.8 mM GaCl$_3$/D-PBS solution was added to 2.70 mL of a 16.9 mM DFO/D-PBS solution, and the resultant solution was stirred overnight. The pH was adjusted to 7.4 with NaOH, and then the solution was filtered through a filter.
(DFO concentration=15.2 mM)

PEG-P[Asp(DFO)$_{10}$]$_{35}$/Ga solution

300 µL of 26.8 mM GaCl$_3$/D-PBS solution was added to 2.70 mL of a 1.71 mM PEG-P[Asp(DFO)$_{10}$]$_{35}$/D-PBS solution (DFO concentration=16.9 mM), and the resultant solution was stirred overnight. The reaction solution was placed in an ultrafiltration membrane (MWCO=10 kD) and subjected to ultrafiltration five times. 3 mL of D-PBS was added to the purified solution, and the resultant solution was filtered through a filter.
(DFO concentration=15.2 mM)

PEG-P[Asp(DFO)$_{26}$]$_{78}$/Ga solution

300 µL of 26.8 mM GaCl$_3$/D-PBS solution was added to 2.70 mL of a 0.662 mM PEG-P[Asp(DFO)$_{26}$]$_{78}$/D-PBS solution (DFO concentration=16.9 mM), and the resultant solution was stirred overnight. The reaction solution was placed in an ultrafiltration membrane (MWCO=10 kD) and subjected to ultrafiltration five times. 3 mL of D-PBS was added to the purified solution, and the resultant solution was filtered through a filter.
(DFO concentration=15.2 mM)

[Preparation of Subcutaneous CT26 Tumor Mouse Model]

100 µl of a CT26 cell suspension (1.0×10$^6$ cells/ml) was subcutaneously injected into a BALB/c mouse.

[Evaluation of Pharmacokinetics]

Figure 20:
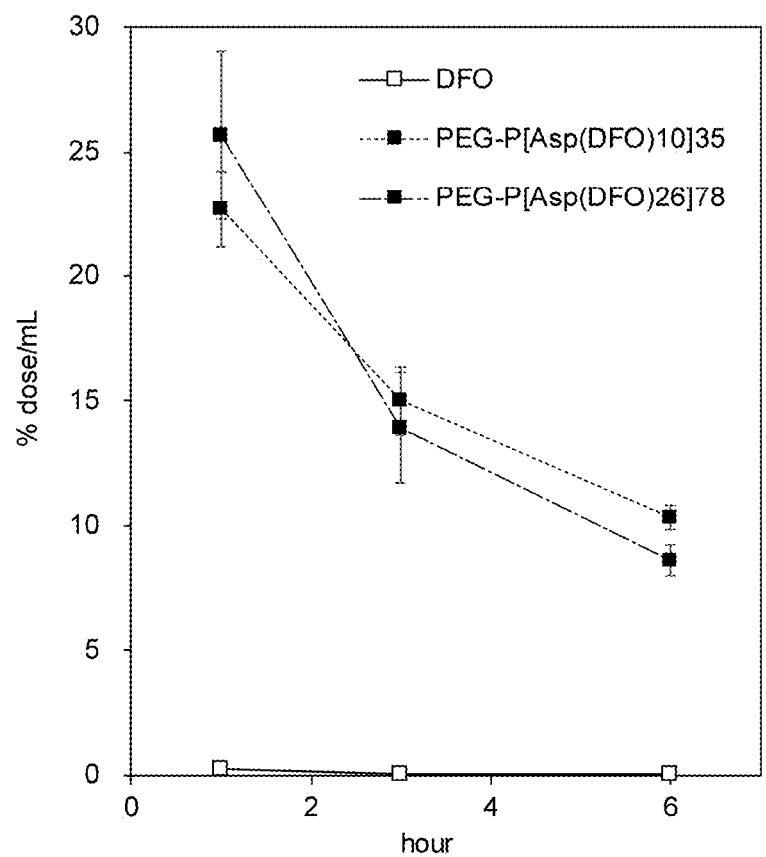
FIG. 20 is a graph showing the results of comparing blood retention between DFO and PEG-P[Asp(DFO)$_m$]$_n$ (n=35, 78) in a subcutaneous CT26 tumor mouse model.
Figure 21:
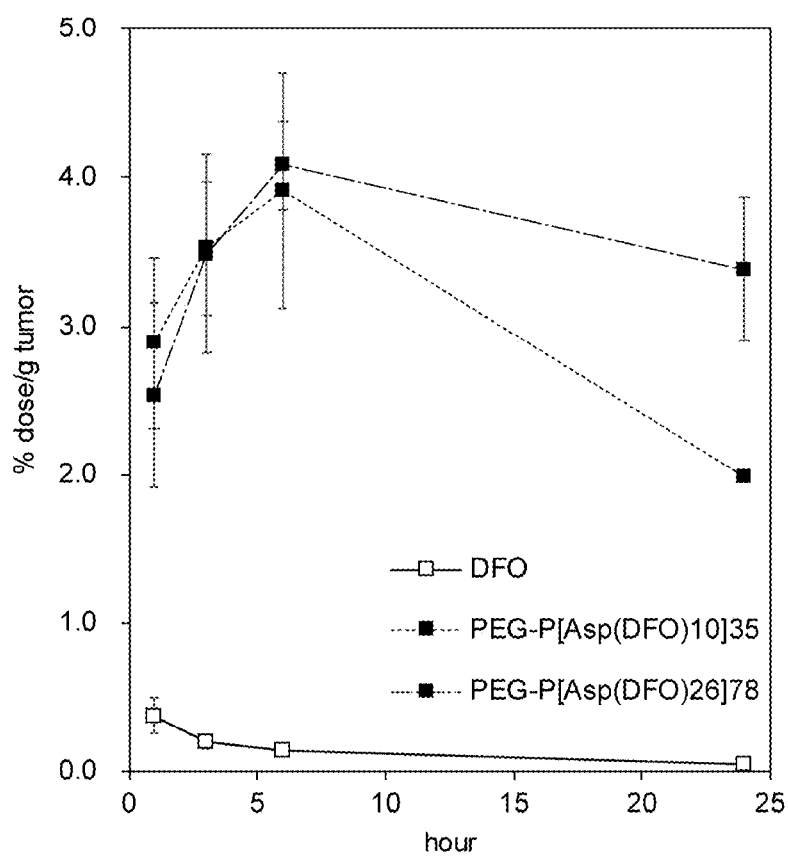
FIG. 21 is a graph showing the results of comparing tumor accumulation between DFO and PEG-P[Asp(DFO)$_m$]$_n$ (n=35, 78) in a subcutaneous CT26 tumor mouse model.

100 µl of the prepared solution described above was intravenously administered (DFO: 1.52 µcool/mouse) to the tail vein of a model mouse of which the tumor size reached about 200 mm$^3$. Dissection was carried out at 1, 3, 6, and 24 hours after the administration of the specimen, and blood and various organs were collected in 10 mL Falcon tubes. 1 mL, of HNO$_3$ was added thereto followed by incubating at 50° C. for 15 min, 70° C. for 15 min, and 90° C. for 1 hour. After filling up to 10 mL with pure water and filtration with a hydrophobic filter, the gallium contents of the blood and the various organs were measured by ICP-MS. The results are shown in FIG. 20 and FIG. 21. The results are shown as the value of mean±S.D. (n=3).

The in-blood concentration of DFO 1 hour after the administration was 0.25% dose/mL, which indicated the rapid disappearance from the blood, whereas the in-blood concentrations of PEG-P[Asp(DFO)$_{10}$]$_{35}$ and PEG-P[Asp(DFO)$_{26}$]$_{78}$ were respectively 10% dose/mL and 8.6% dose/mL 6 hours after the administration. Furthermore, PEG-P[Asp(DFO)$_{10}$]$_{35}$ and PEG-P[Asp(DFO)$_{26}$]$_{78}$ were accumulated in the tumor due to the EPR effect, and the in-tumor concentrations thereof were respectively 3.9% dose/g and 4.1% dose/g 6 hours after the administration. In addition, the respective in-tumor concentrations of 2.0% dose/g and 3.4% dose/g were maintained 24 hours after the administration. From these results, it was shown that PEG-P[Asp(DFO)$_{10}$]$_{35}$ and PEG-P[Asp(DFO)$_{26}$]$_{78}$ contributed to the tumor accumulation and the retention of DFO in addition to the improvement of blood retention thereof.

4.5. Antitumor Effect

DFO and PEG-P[Asp(DFO)$_m$]$_n$ were intravenously injected into subcutaneous DLD-1 and CT26 tumor mouse models to evaluate their antitumor effect.

[Preparation of DFO Solution, PEG-P[Asp(DFO)$_{10}$]$_{35}$ Solution, and PEG-P[Asp(DFO)$_{26}$]$_{78}$ Solution]

DFO/D-PBS solution: 15.2 mM
PEG-P[Asp(DFO)$_{10}$]$_{35}$/D-PBS solution: 1.54 mM (DFO concentration=15.2 mM)
PEG-P[Asp(DFO)$_{26}$]$_{78}$/D-PBS solution: 0.596 nM (DFO concentration=15.2 mM)

[Preparation of Subcutaneous DLD-1 and CT26 Tumor Mouse Models]

100 µl of a DLD-1 cell suspension (1.0×10$^7$ cells/ml) and a CT26 cell suspension (1.0×10$^6$ cells/ml) were each subcutaneously injected into a BALB/c mouse and a BALB/c nude mouse.

[Evaluation of Antitumor Effect]

100 µl of the prepared solution described above was intravenously administered (DFO: 1.52 µmol/mouse) to the tail vein of a mouse of which the tumor size reached about 50 to 100 mm$^3$. The control group was subjected to intravenous injection into the tail vein with an amount of PBS equal to that of the treatment group. The administration schedule is described below.

Figure 22:
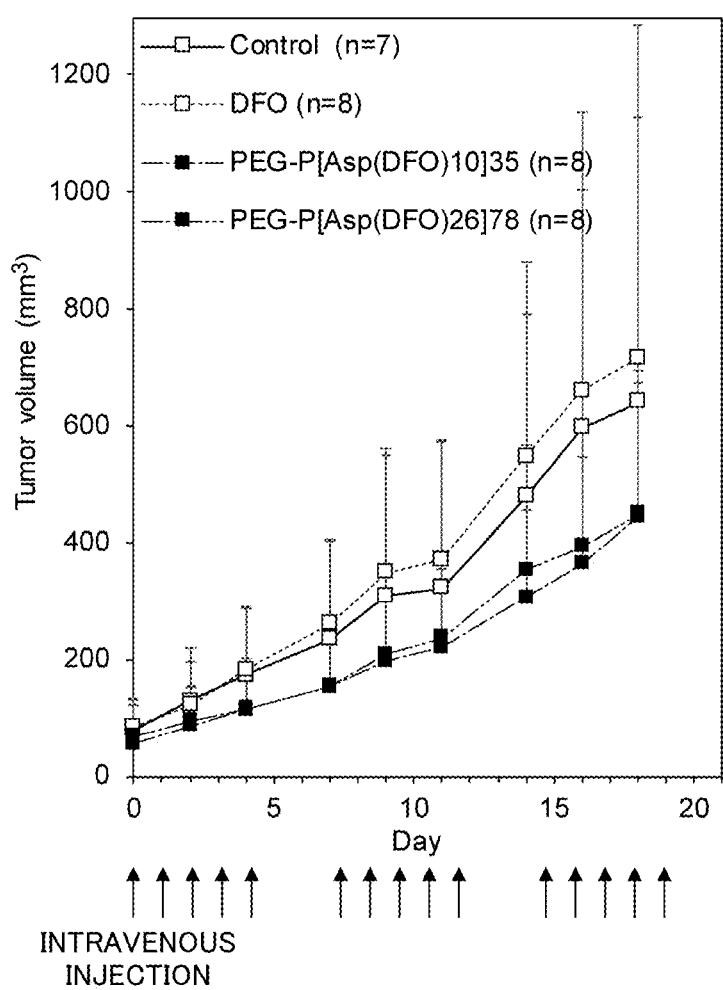
FIG. 22 is a graph showing the temporal change of tumor size due to the administration of DFO or PEG-P[Asp(DFO)$_m$]$_n$/(n=35, 78) in a subcutaneous DLD-1 tumor mouse model.
Figure 23:
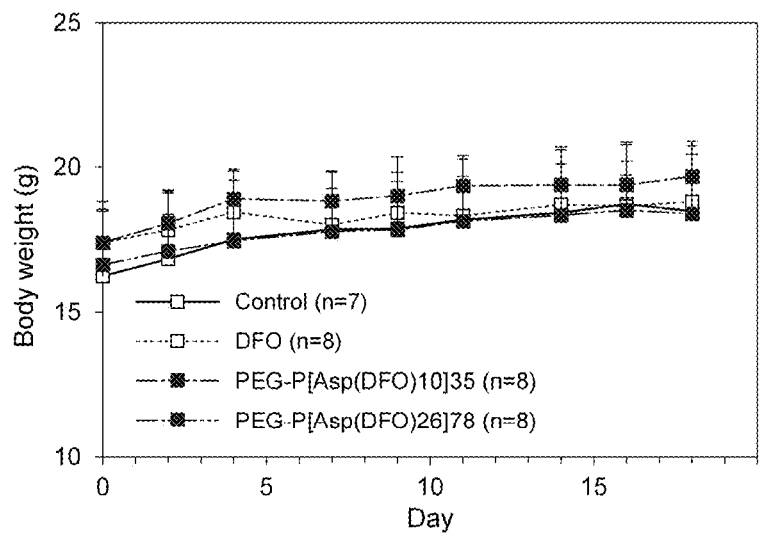
FIG. 23 is a graph showing the temporal change of body weight due to the administration of DFO or PEG-P[Asp(DFO)$_m$]$_n$ (n=35, 78) in a subcutaneous DLD-1 tumor mouse model.
Figure 24:
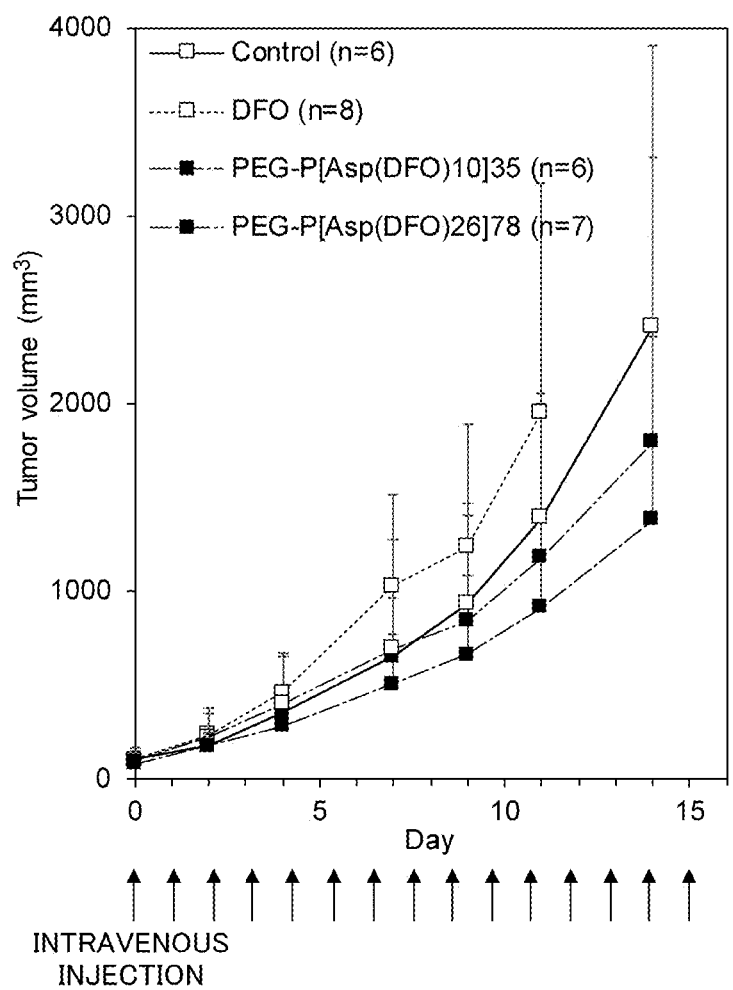
FIG. 24 is a graph showing the temporal change of tumor size due to the administration of DFO or PEG-P[Asp(DFO)$_m$]$_n$ (n=35, 78) in a subcutaneous CT26 tumor mouse model.
Figure 25:
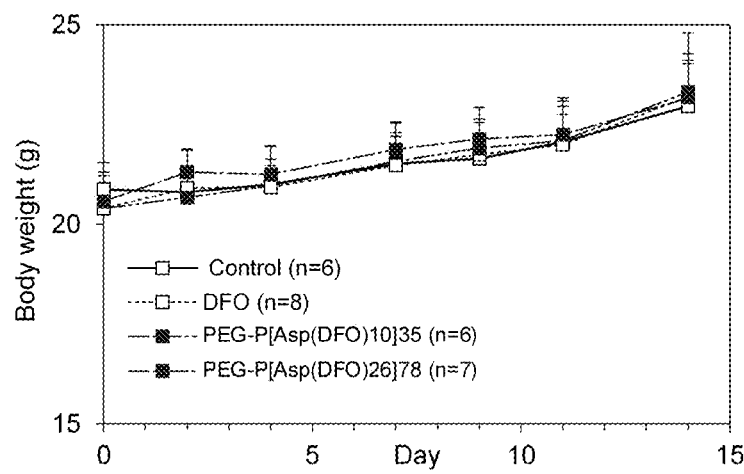
FIG. 25 is a graph showing the temporal change of body weight due to the administration of DFO or PEG-P[Asp(DFO)$_m$]$_n$ (n=35.78) in a subcutaneous CT26 tumor mouse model.

Subcutaneous DLD-1 tumor mouse model: once-daily administration, five times a week, 15 times in total Subcutaneous CT26 tumor mouse model: daily administration of once-daily administration, 14 times in total Tumor size and body weight were measured every day or every two days during the administration period. The measured tumor size was substituted into an elliptical volume approximation expression (ab$^2$×½, a: long side, b: short side) and the calculated value was used as the tumor volume. The temporal change of tumor size is shown in FIG. 22 and FIG. 24, and the temporal change of body weight is shown in FIG. 23 and FIG. 25. FIG. 22 and FIG. 23 are the measurement results of the subcutaneous DLD-1 tumor mouse model, and FIG. 24 and FIG. 25 are the measurement results of the subcutaneous CT26 tumor mouse model. The results are shown as the value of mean±S.D.

In the subcutaneous DLD-1 and CT26 tumor mouse models, PEG-P[Asp(DFO)$_{10}$]s and PEG-P[Asp(DFO)$_{26}$]$_{78}$ have been shown to provide excellent antitumor effects as compared with DFO. This is conceived to be because PEG-P[Asp(DFO)$_{10}$]$_{35}$ and PEG-P[Asp(DFO)$_{26}$]$_{78}$ achieved tumor accumulation. In addition, since no weight loss was confirmed during the treatment period, it is conceived that no serious side effects were exhibited.

5. Evaluation in Cultured Cell

5.1. Overview

From the absorption spectrum measurement and the calcein-AM method, it was confirmed that PEG-P[Asp(DFO)$_m$]$_n$ has an iron chelating ability. Based on the above result, the free iron in the cytoplasm was detected with FerroOrange in order to investigate whether the free iron in the cytoplasm would be decreased in cells treated with PEG-P[Asp(DFO)$_m$]$_n$. In addition, cell cycle arrest in the S phase was clarified as a mechanism of cell proliferation suppression by PEG-P[Asp(DFO)$_m$]$_n$, which was conceived to be due to DNA synthesis inhibition, and thus the DNA synthesis inhibition was evaluated by BrdU staining. Further, in order to investigate whether PEG-P[Asp(DFO)$_m$]$_n$ would induce apoptosis, apoptotic cells were detected by PI staining and Annexin V staining.

5.2. Reagent and Cell Line

Regarding reagents not otherwise described, commercially available products were used as they were.
DFO: Sigma Aldrich Co., llc.
PEG-P[Asp(DFO)$_{10}$]$_{35}$ (Mn=19,300)
Roswell Park Memorial Institute medium (RPMI): Sigma Aldrich Co., llc.
D-PBS (−): Nacalai Tesque Inc.
Fetal bovine serum (FBS): Biosera Inc.
Trypsin-EDTA solution: Sigma life science Co., Ltd.
Penicillin/streptomycin: Sigma life science Co., Ltd.
FerroOrange: Goryo Chemical, Inc.
BrdU: Sigma Aldrich Co., 11c.
5 M HCl: Nacalai Tesque Inc.
Sodium borate: Nacalai Tesque Inc.
Paraformaldehyde (PFA): Nacalai Tesque Inc.
TritonX-100: Tokyo Chemical Industry Co., Ltd.
Bovine serum albumin (BSA): Nacalai Tesque Inc.
FITC-Anti-BrdU antibody: Thermo Fisher Scientific, Inc.
Hoechst 33342: Thermo Fisher Scientific Inc.
Tween20: Sigma life science Co., Ltd.
Apoptosis Kit (Annexin V-FITC kit): Medical & Biological Laboratories Co., Ltd
DLD-1 cell (human colon adenocarcinoma cell line): American Type Culture Collection

5.3. Measuring Apparatus

Countess: Thermo Fischer Scientific Inc.
LSM710: Carl Zeiss Co., Ltd.
Guava (registered trade name) easyCyte Flow Cytometry (FCM): Merck Millipore
Spark (registered trade name): Tecan Japan Co., Ltd.
<5.4. Evaluation of Iron Chelating Ability of PEG-P[Asp(DFO)$_m$]$_n$>
To investigate whether DFO and PEG-P[Asp(DFO)$_m$]$_n$ would decrease free iron in the cytoplasm, the free iron in the cytoplasm of cells treated with DFO and PEG-P[Asp(DFO)$_m$]$_n$ was detected with FerroOrange.
[Preparation of DFO Solution and PEG-P[Asp(DFO)$_{10}$]$_{35}$ Solution]
DFO/D-PBS solution: 2.00 mM
PEG-P[Asp(DFO)$_{10}$]$_{35}$/D-PBS solution: 2001.1M (DFO concentration=2.00 mM)

Figure 27A:
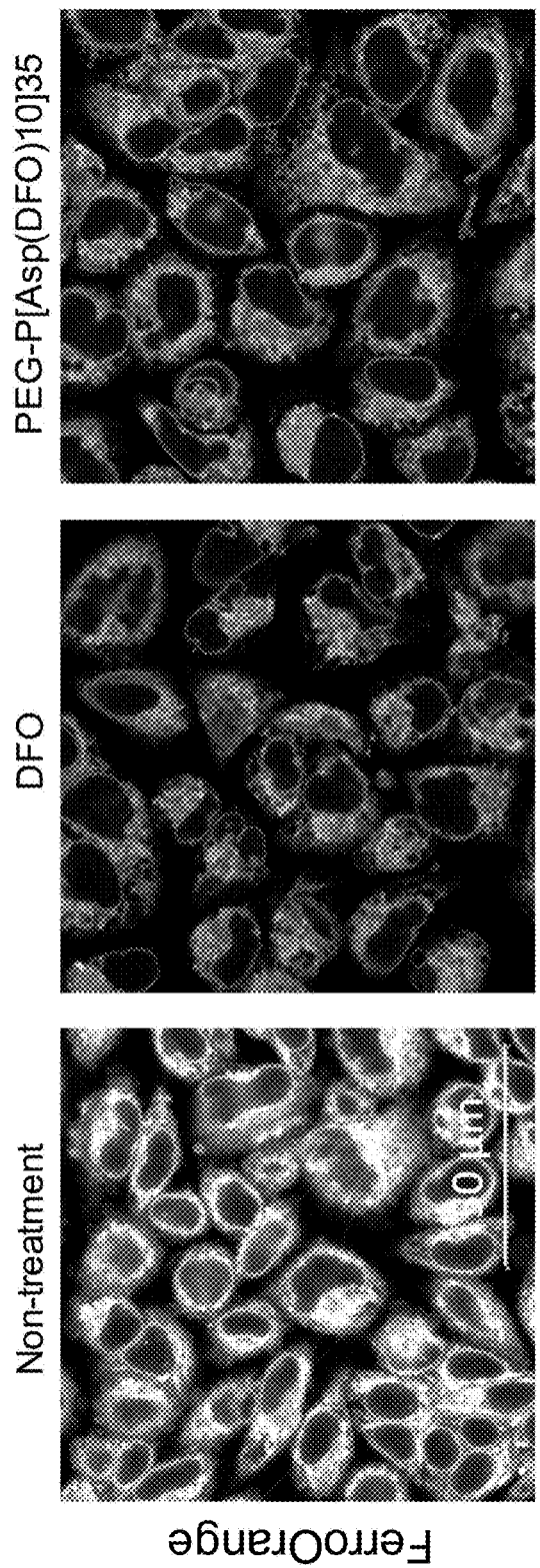
FIG. 27A is a confocal microscope observation image showing a state of DLD-1 cells after the addition of DFO or PEG-P[Asp(DFO)$_{10}$]$_{35}$, and FerroOrange and the subsequent incubation.
Figure 28A:
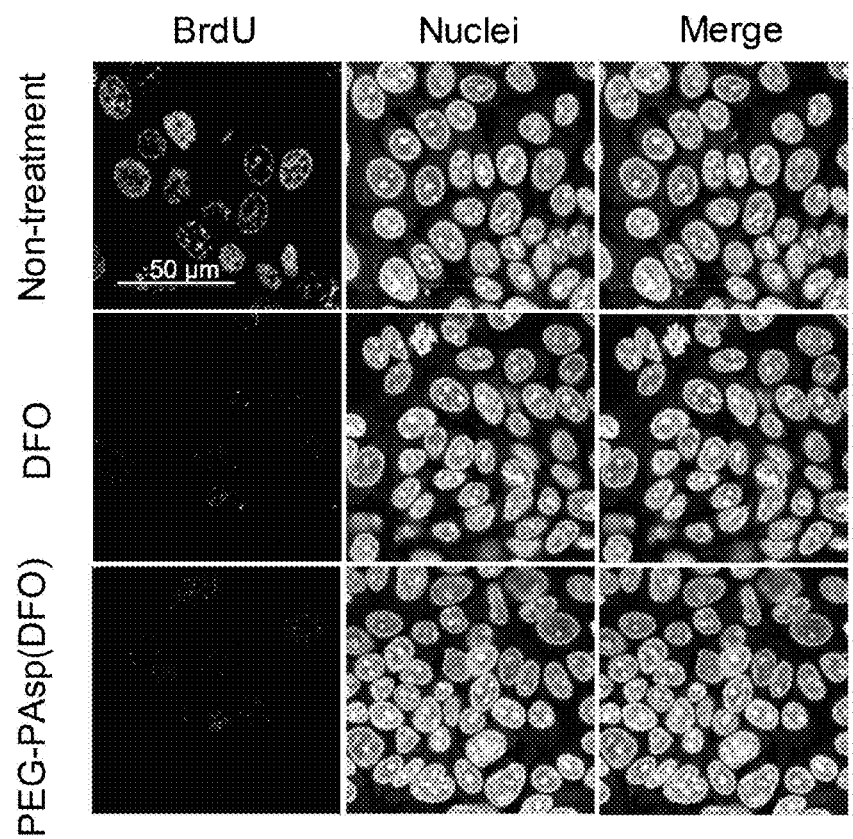
FIG. 28A is a confocal microscope observation image showing a state of DLD-1 cells after the addition of DFO or PEG-P[Asp(DFO)$_{10}$]$_{35}$, and an FITC-anti-BrdU antibody, and the subsequent incubation.
Figure 28B:
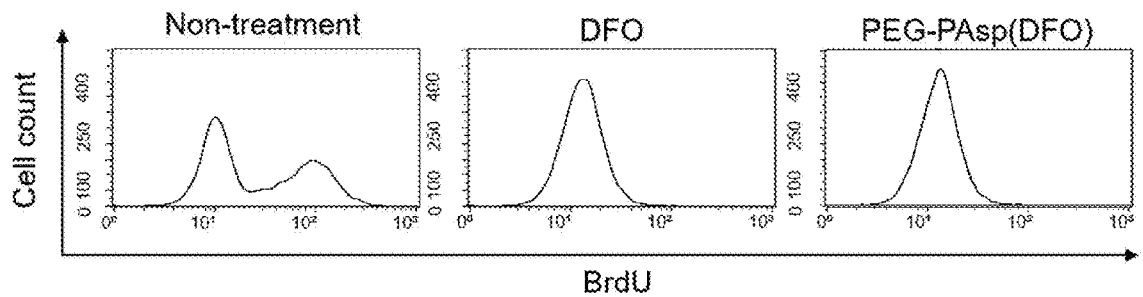
FIG. 28B shows graphs showing results of cell cycle analysis of DLD-1 cells after the addition of DFO or PEG-P[Asp(DFO)$_{10}$]$_{35}$ and the subsequent incubation.

[Observation with Confocal Microscope]
DLD-1 cells were seeded on 35 mm$^2$ glass base dishes at 3.0×10$^5$ cells/well and pre-cultured at 37° C. under 5% CO$_2$ for 24 hours. After removing the solution, 2 mL of the prepared solution described above, diluted 10-fold with RPMI, was added to each dish followed by incubating for 24 hours. After washing with 2 mL of serum-free RPMI, 1 mL of serum-free RPMI containing 111M FerroOrange was added thereto followed by incubating in a dark place for 30 min. Thereafter, the fluorescence of FerroOrange was observed by CLSM. The results obtained are shown in FIG. 27A.
[Measurement with Plate Reader]
DLD-1 cells were seeded on a 96-well plate at 1.0×10$^4$ cells/well and pre-cultured at 37° C. under 5% CO$_2$ for 24 hours. After removing the solution, 100 μL of the prepared solution described above, diluted 10-fold with RPMI, was added to each well followed by incubating for 24 hours. After washing with 100 μL of serum-free RPMI, 100 μL of serum-free RPMI containing 1 μM FerroOrange was added thereto followed by incubating in a dark place for 30 min. Then, the fluorescence intensity of FerroOrange was measured with a plate reader. The obtained results are shown in FIG. 27B. The results are shown as the value of mean±S.D. (n=5). The statistical significance was evaluated by Tukey's multiple comparison test (****p<0.0001).
DFO and PEG-P[Asp(DFO)$_{10}$]$_{35}$ markedly decreased free iron in the cytoplasm.
<5.5. DNA Synthesis Inhibition by PEG-P[Asp(DFO)$_m$]$_n$>
To investigate the mechanism of cell cycle arrest in the S phase by DFO and PEG-P[Asp(DFO)$_m$]$_n$, DNA synthesis inhibition was evaluated by BrdU staining.
[Preparation of DFO Solution and PEG-P[Asp(DFO)$_{10}$]$_{35}$ Solution]
DFO/D-PBS solution: 450 μM
PEG-P[Asp(DFO)$_{10}$]$_{35}$/D-PBS solution: 60.011M (DFO concentration=600 μM)
[Observation with Confocal Microscope]
DLD-1 cells were seeded on 35 mm$^2$ glass base dishes at 1.0×10$^5$ cells/well and pre-cultured at 37° C. under 5% CO$_2$ for 24 hours. After removing the solution, 3 mL of the prepared solution described above, diluted 10-fold with RPMI, was added to each well followed by incubating for 72 hours. Then, 330 μL of a 10 mM BrdU/D-PBS solution was added thereto followed by incubating for 1 hour. After removing the solution, 1 mL of 1.0 M HCl solution was added thereto followed by incubating for 10 min. After removing the solution, 1 mL of a 0.1 M sodium tetraborate buffer (pH 8.5) was added thereto followed by incubating for 30 min. After washing with 2 mL of D-PBS, 1 mL, of a 4% PFA/D-PBS solution was added thereto followed by incubating for 10 min. After removing the solution, 1 mL of a 0.2% TritonX-100/D-PBS solution was added thereto followed by incubating for 5 min. After washing with 2 mL of D-PBS, 2 mL of a 5% BSA/D-PBS solution was added thereto followed by incubating for 1 hour. After removing the solution, an FITC-anti-BrdU antibody/1% BSA solution was added thereto followed by incubating for 30 min in a dark place. After washing with 2 mL of D-PBS, 1 mL of a 5.0 μg/mL Hoechst/D-PBS solution was added thereto followed by incubating for 5 min in a dark place. After washing with 2 mL of D-PBS, observation was performed with CLSM. The results obtained are shown in FIG. 28A.
[Measurement with Flow Cytometer]
DLD-1 cells were seeded on a 6-well plate at 2.0×10$^5$ cells/well and pre-cultured at 37° C. under 5% CO$_2$ for 24 hours. After removing the solution, 3 mL of the prepared solution described above, diluted 10-fold with RPMI, was added to each well followed by incubating for 72 hours. Then, 330 µL of a 10 mM BrdU/D-PBS solution was added thereto followed by incubating for 1 hour. After washing with 3 mL of D-PBS, 700 NL of a Trypsin-EDTA solution was added thereto followed by incubating for 10 min. After confirming that the cells had peeled off under an optical microscope, 700 µL of RPMI was added and suspended sufficiently. The suspension was centrifuged at 1,200 rpm for 3 min to remove the supernatant. 500 µL of D-PBS was added to the cell pellet, which was subsequently suspended. The number of cells was measured, and the cells in each sample were made to the same number. The suspension was dropwise added to 4.5 mL, of 70% ethanol and fixed in a −20° C. freezer overnight. The suspension was centrifuged at 1,200 rpm for 3 min to remove the supernatant. 500 µL of a 2.0 M HCl/0.5% Triton X-100 solution was added followed by incubating for 30 min. The suspension was centrifuged at 1,200 rpm for 3 min to remove the supernatant. 500 µL of a 0.1 M sodium tetraborate buffer (pH 8.5) was added followed by incubating for 2 min. The suspension was centrifuged at 1,200 rpm for 3 min to remove the supernatant. After washing with 1 mL of a 1% BSA/0.5% Tween20/D-PBS solution, 95 µL of a 1% BSA/0.5% Tween20/D-PBS solution was added. 5 µL of an FITC-anti-BrdU antibody was added followed by incubating for 1 hour. After washing with 1 mL of a 1% BSA/0.5% Tween20/D-PBS solution, 500 µL of a 1% BSA/0.5% Tween20/D-PBS solution was added. Finally, the suspension was filtered through a cell strainer, and the fluorescence of BrdU was measured using FCM. The obtained results are shown in FIG. 28B.

DFO and PEG-P[Asp(DFO)$_{10}$]$_{35}$ were shown to induce DNA synthesis inhibition since BrdU uptake was significantly suppressed, and it was conceived that this result caused the cell cycle to be arrested in the S phase.

<5.6. Evaluation of Apoptosis Induction by PEG-P[Asp (DFO)$_m$]$_n$>

In order to investigate whether DFO and PEG-P[Asp (DFO)$_m$]$_n$ would induce apoptosis, apoptotic cells were detected by PI staining and Annexin V staining.

[Preparation of DFO Solution and PEG-P[Asp(DFO)$_{10}$]$_{35}$ Solution]

DFO/D-PBS solution: 1.00 mM

PEG-P[Asp(DFO)$_{10}$]$_{35}$/D-PBS solution: 100 µM (DFO concentration=1.00 mM)

Figure 29A:
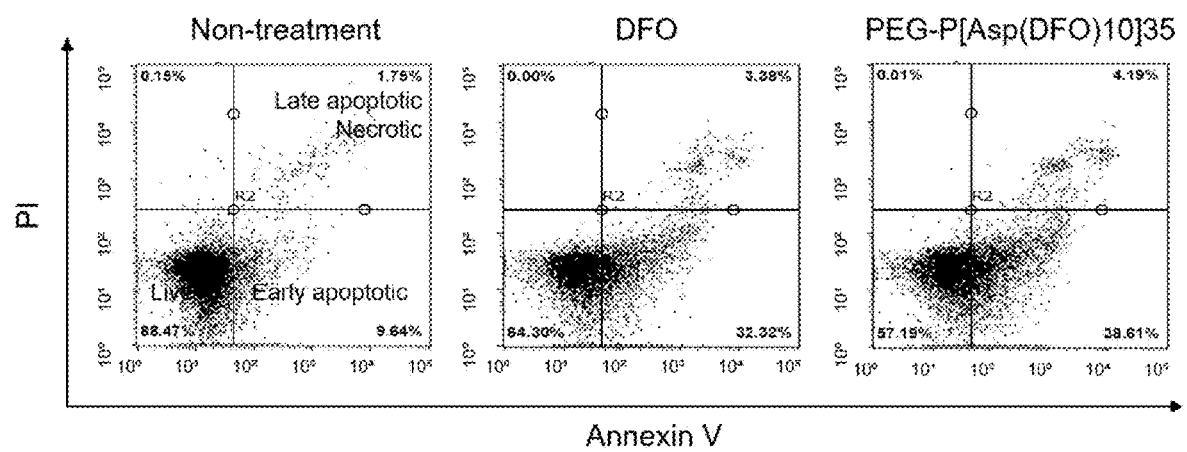
FIG. 29A shows graphs showing results of an FCM analysis of a state of apoptosis induction in DLD-1 cells after the addition of DFO or PEG-P[Asp(DFO)$_{10}$]$_{35}$ and the subsequent incubation.
Figure 29B:
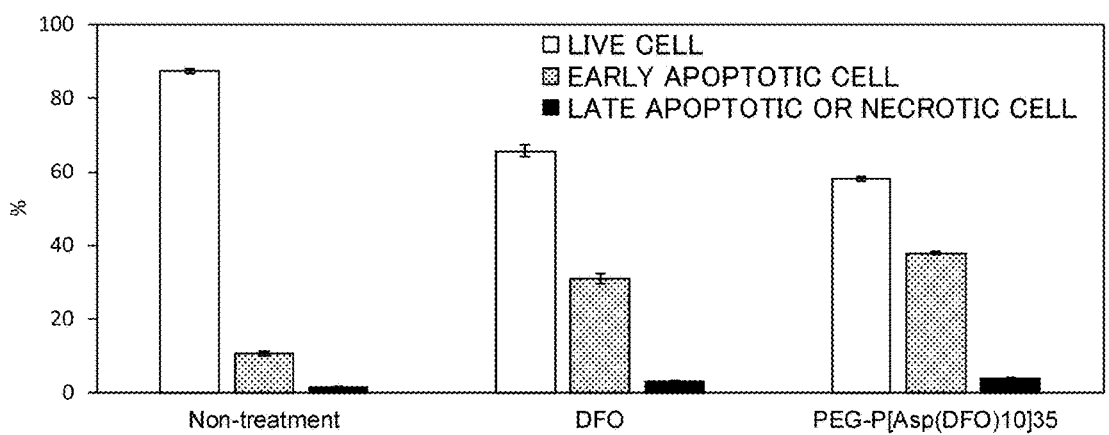
FIG. 29B is a graph showing results obtained by converting the number of DLD-1 cells after the addition of DFO or PEG-P[Asp(DFO)10]35 and the subsequent incubation, into the number of live cells, early apoptosis cells, or late apoptotic/necrotic cells.

DLD-1 cells were seeded on a 6-well plate at 1.0×10$^5$ cells/well and pre-cultured at 37° C. under 5% CO$_2$ for 24 hours. After removing the solution, 3 mL of the prepared solution described above, diluted 10-fold with RPMI, was added to each well followed by incubating for 24 hours. After washing with 3 mL of D-PBS, 700 µL of a Trypsin-EDTA solution was added thereto followed by incubating for 10 min. After confirming that the cells had peeled off under an optical microscope, 700 µL of RPMI was added and suspended sufficiently. The suspension was centrifuged at 1,200 rpm for 3 min to remove the supernatant. 500 µL of RPMI was added, the number of cells was measured, and the cells in each sample were made to the same number. The suspension was centrifuged at 1,200 rpm for 3 min to remove the supernatant. 85 µL of a binding buffer included in Apoptosis Kit, 10 µL of an annexin V solution, and 5 µL of a PI solution were added followed by incubating in a dark place for 15 min. After adding 400 µL of the binding buffer, the suspension was filtered through a cell strainer, and the fluorescence of PI and Annexin V was measured using FCM. The obtained results are shown in FIG. 29. FIG. 29A is a graph showing the distribution of fluorescence acquired by FCM, and FIG. 29B shows results obtained by converting it into the number of live cells, early apoptosis cells, or late apoptotic/necrotic cells. The results are shown as the value of mean±S.D. (n=3). The statistical significance was evaluated by Tukey's multiple comparison test (**** p<0.0001).

DFO and PEG-P[Asp(DFO)$_{10}$]$_{35}$ significantly increased the proportion of apoptotic and necrotic cells.

6. Effect on Protoporphyrin IX Accumulativeness in a Tumor of a Subcutaneous Tumor Model Mouse 6.1. Overview The protoporphyrin IX accumulativeness in a tumor was evaluated when 5-aminolevulinic acid hydrochloride together with DFO or PEG-P[Asp(DFO)m]n were administered to a subcutaneous CT26 (mouse colon cancer cell) tumor mouse model.

6.2. Reagent, Cell, and Animal

Deferoxamine mesylate (DFO): Sigma Aldrich Co., lie.
PEG-P[Asp(DFO)$_{10}$]$_{35}$ (Mn=19,300)
5-Aminolevulinic acid hydrochloride: COSMO OIL Co., Ltd.
D-PBS (−): Nacalai Tesque Inc.
PBS (−): Wako Pure Chemical Industries Co., Ltd.
N,N-Dimethylformamide (DMF): Wako Pure Chemical Industries Co., Ltd.
Protoporphyrin IX: Frontier Scientific, Inc.
CT-26 cell (mouse colon carcinoma cell line): American Type Culture Collection
BALB/c mice: Charles River Japan Inc.

6.3. Apparatus/Equipment

Infinite M200 PRO: Tecan Group Ltd.

6.4. Evaluation of Protoporphyrin IX Accumulativeness in Tumor

[Preparation of DFO Solution and PEG-P[Asp(DFO)$_{10}$]$_{35}$ Solution]

DFO/D-PBS solution: 15.2 mM
PEG-P[Asp(DFO)$_{10}$]$_{35}$/D-PBS solution: 1.54 mM (DFO concentration=15.2 mM)

[Preparation of 5-Aminolevulinic Acid Hydrochloride Solution]

5-Aminolevulinic acid hydrochloride was dissolved in a physiological saline solution to a concentration of 25 mg/mL.

[Preparation of Subcutaneous CT26 Tumor Mouse Model]

100 µl of a CT26 cell suspension (1.0×10$^6$ cells/ml) was subcutaneously injected into a BALE/c mouse.

[Evaluation of Protoporphyrin IX in Tumor]

Figure 30:
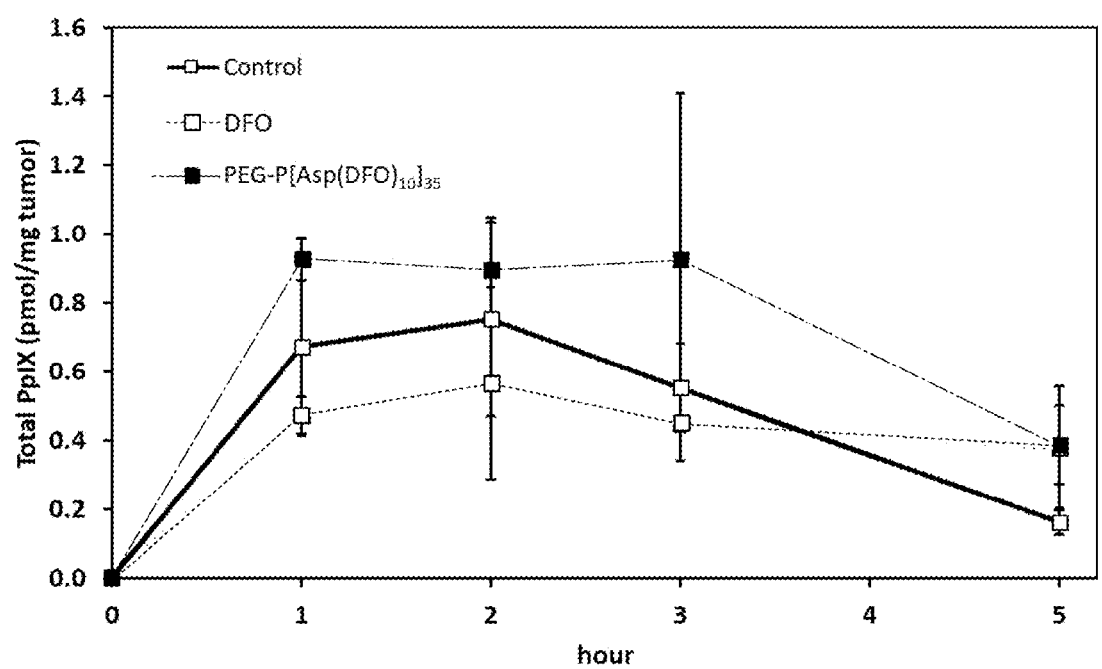
FIG. 30 is a graph showing the temporal change of protoporphyrin IX accumulation in a tumor due to the administration of DFO or PEG-P[Asp(DFO)$_{10}$]$_{35}$/Fe in a subcutaneous CT26 tumor mouse model.

100 µl of a DFO solution or PEG-P[Asp(DFO)$_{10}$]$_{35}$ solution was intravenously injected (DFO: 1.52 µmol/mouse) into the tail vein of the model mouse of which the tumor size reached about 200 mm$^3$. The control group was subjected to intravenous injection into the tail vein with 100 µl of a physiological saline solution as in the DFO-administered group. Immediately thereafter, 100 µl of a 5-aminolevulinic acid hydrochloride solution was orally administered (250 mg/kg body weight, 195.6 mg/kg body weight in terms of ALA). Dissection was carried out at 0, 1, 2, 3, and 5 hours after the administration of the 5-aminolevulinic acid hydrochloride solution, and tumors were collected. Nine times the tumor weight of PBS (−) was added followed by homogenization and ultrasonic disruption. 300 µl of this disruption solution was mixed with 700 µl of DMF and centrifuged. As a result of measuring the fluorescence intensity (excitation wavelength: 405 nm) of the centrifugation supernatant, a fluorescence spectrum having a peak at 635 mu was obtained. The amount of protoporphyrin IX was calculated using the fluorescence intensity at an excitation wavelength of 405 nm and a fluorescence wavelength of 630 nm. FIG. 30 shows the measurement results of protoporphyrin IX in a tumor. The results are shown as the value of mean±S.D. (n=3).

In the subcutaneous CT26 tumor mouse model, PEG-P[Asp(DFO)$_{10}$]$_{35}$ was shown to provide excellent protoporphyrin accumulativeness in a tumor as compared with Control and DFO.

7. Effect on Vitamin C Therapy

7.1. Background

It was examined whether the therapeutic effect of vitamin C therapy would be improved in a case where the iron chelating agent that was used in present Example was used in combination with vitamin C.

7.2. In Vitro Activity Evaluation

Figure 31:
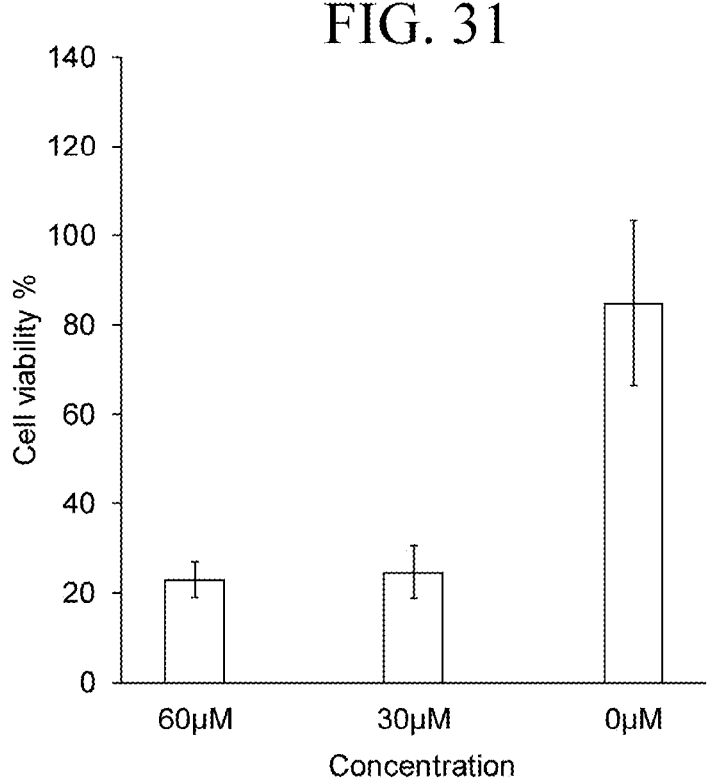
FIG. 31 is a graph showing that when vitamin C and PEG-P[Asp(DFO)$_{36}$]$_{76}$ were added to the culture solution of CT26 cells, the killing or damaging effect on cancer cells was confirmed.

[Experimental Material]
PEG-P[Asp(DFO)$_{36}$]$_{76}$ (Mn=45,000)
L-Ascorbic acid sodium salt (Wako Pure Chemical industries Co., Ltd.)
FeCl$_3$ (Wako Pure Chemical Industries Co., Ltd.)
CT26 cell (ATCC)
RPMI medium (Sigma-Aldrich), used as a cell culture medium by adding 10% FBS+1% penicillin/streptomycin.
Cell Counting Kit-8 (Dojindo Molecular Technologies Inc.)
[Experimental Method]
CT26 cells were cultured in a 96-well plate at 5×10$^3$ cells/well for 24 hours.
The cells were cultured for 2 hours in a medium containing each concentration of PEG-P[Asp(DFO)$_{36}$]$_{76}$, 5 mM L—of an ascorbic acid sodium salt, and 15 µM of Fe$^{3+}$.
After replacing the medium, the cells were cultured for 24 hours.
After removing the medium, 100 µL of a medium containing 10% Cell Counting Kit-8 was added followed by culturing for 1.5 hours.
The absorbance at 450 nm was measured, and the cell viability was calculated.
The obtained results are shown in FIG. 31.
FIG. 31 is a graph showing the effect of PEG-P[Asp(DFO)$_{36}$]$_{36}$ on the vitamin C treatment in vitro. The concentration in the graph indicates the concentration equivalent to DFO in PEG-P[Asp(DFO)$_{36}$]$_{76}$. The results are shown as mean±standard deviation (n=9).
[Result]
In a case where PEG-P[Asp(DFO)$_{36}$]$_{76}$ was added, the cell killing effect of vitamin C significantly improved the cell killing and damaging effect (FIG. 31).

7.3. Evaluation of In Vivo Activity

Figure 32:
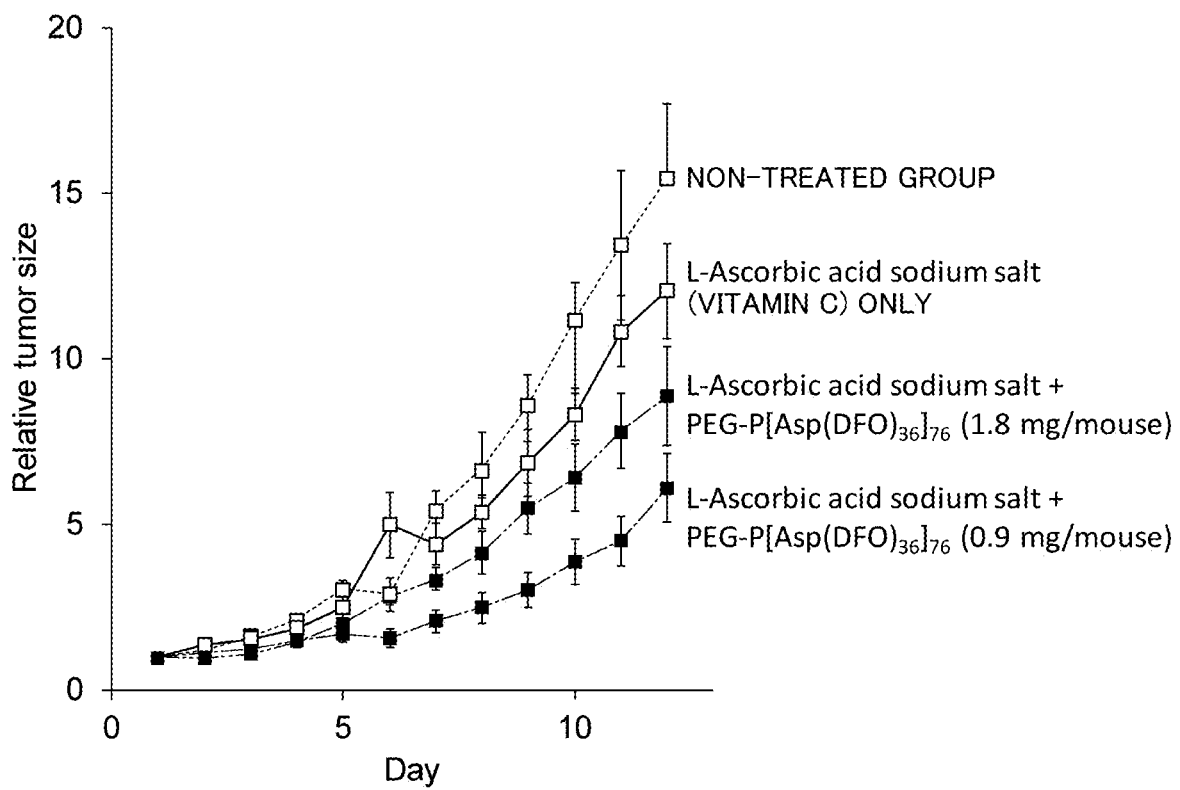
FIG. 32 is a graph showing the temporal change of tumor size due to the administration of vitamin C, or vitamin C and PEG-P[Asp(DFO)$_{36}$]$_{76}$ in a subcutaneous CT26 tumor mouse model.

[Experimental Material]
PEG-P[Asp(DFO)$_{36}$]$_{76}$ (Mn=45,000)
L-Ascorbic acid sodium salt (Wako Pure Chemical Industries Co., Ltd.)
CT26 cell (ATCC)
RPMI medium (Sigma-Aldrich), used as a cell culture medium by adding 10% FBS+1% penicillin/streptomycin.
BALB/c mouse (female, purchased from Japan SLC, Inc.)
[Experimental Method]
CT26 cells were subcutaneously injected into a BALB/c mouse at 3×10$^5$ cells/mouse to create a subcutaneous tumor model.
At the time when the tumor size reached 50 mm$^3$, PEG-P[Asp(DFO)$_{36}$]$_{76}$ was intravenously injected (at the PEG-P[Asp(DFO)$_{36}$]$_{76}$ dose: 0.9 mg/mouse=45 mg/kg body weight or 1.8 mg/mouse=90 mg/kg body weight).
6 hours after the administration of PEG-P[Asp(DFO)$_{36}$]$_{76}$, an L-ascorbic acid sodium salt dissolved in pure water was intravenously injected at 10 mg/mouse=500 mg/kg body weight.
The above injections were performed for 5 consecutive days, and the temporal change in tumor size was investigated.
The obtained results are shown in FIG. 32
FIG. 32 is a graph showing the effect of PEG-P[Asp(DFO)$_{36}$]$_{76}$ on the vitamin C treatment in vivo. The results are shown as mean±standard deviation.
[Result]
PEG-P[Asp(DFO)$_{36}$]$_{76}$ showed a high therapeutic effect in a case of being used in combination with the high-concentration vitamin C. In addition, it was shown that the effect PEG-P[Asp(DFO)$_{36}$]$_{76}$ tends to be higher in a case where the dose thereof is 0.9 mg/mouse among a case of a dose of 0.9 mg/mouse and a case of dose of 1.8 mg/mouse.

8. Summary

To summarize the present Example described above, in the present Example, a delivery system of an iron chelating agent was constructed, where a terminal amino group of DFO, which is not involved in the iron chelation carried out by DFO, was conjugated to a biocompatible polymer having a polyvalent carboxylic acid structure. From the absorption spectrum measurement, it was confirmed that DFO in the side chain of the iron chelating agent used in the present Example has an iron chelating ability equivalent to that of the free DFO. It was confirmed that the chelating ability of the iron chelating agent used in the present Example is maintained in the biological environment as well, that the iron ion is chelated in cultured colon cancer cells, and that the free iron is decreased in the cytoplasm of the cultured colon adenocarcinoma cells. In addition, as a result of investigating the effect on the cell cycle in the above cells, DNA synthesis inhibition was observed by the administration of the iron chelating agent used in the present Example, and it was confirmed that the iron chelating agent used in the present Example causes the cell cycle to be arrested in the S phase and, from the cell proliferation assay, has a proliferation suppressive effect and an apoptosis-inducing effect.

As a result of intravenously injecting DFO and the iron chelating agent used in the present Example into a subcutaneous tumor mouse model and comparing the blood retention thereof, DFO disappeared from the blood at an early stage, whereas the iron chelating agent used in the present Example maintained an extremely high in-blood concentration even 6 hours after the administration. Furthermore, the iron chelating agent used in the present Example accumulated in the tumor, and the accumulated amount increased with time. As a result of examining the antitumor effect using this subcutaneous tumor model, it was shown that a significant therapeutic effect is provided as compared with DFO.

In addition, it was observed that the administration of the iron chelating agent and 5-aminolevulinic acid, used in the present Example, improved the amount of protoporphyrin IX accumulated in a tumor. It was shown that the iron chelating agent used in the present Example is suitable for use in photodynamic diagnosis and/or treatment using 5-aminolevulinic acid.

Further, it was shown that the administration of the iron chelating agent and vitamin C, used in the present Example, exhibits an excellent antitumor effect, and thus the iron chelating agent used in the present Example is suitable for use in vitamin C therapy.

Each of the configurations and the combinations thereof in each embodiment are examples, and additions, omissions, substitutions, and other modifications can be made without departing from the spirit or scope of the present invention. In addition, the present invention is not to be considered as being limited by each Example and is only limited by the claims.

What is claimed is:

1. A mixed drug comprising ascorbic acid and a conjugate in which a deferoxamine-type compound, which is at least one compound selected from the group consisting of deferoxamine or an ion or salt thereof, and a derivative thereof, and a biocompatible polymer are conjugated, wherein the biocompatible polymer contains a first biocompatible polymer chain and a second biocompatible polymer chain that is different from the first biocompatible polymer chain, wherein the second biocompatible polymer chain is a polyamino acid, the first biocompatible polymer chain is polyethylene glycol, and the conjugate includes a structure having Formula (1):

A-L-B (1)

wherein A represents the first biocompatible polymer chain; L represents a linker part; and B represents the second biocompatible polymer chain, and wherein the conjugate includes a structure having Formula (1-2):

(1-2)

wherein l is an integer of 1 to 1,500, B represents the second biocompatible polymer chain and includes a repeating structure represented by formula (b2-1), or a repeating structure represented by formula (b1-1) and a repeating structure represented by formula (b2-1),

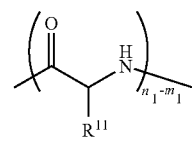

(b1-1)

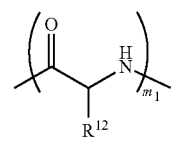

(b2-1)

wherein $R^{11}$ represents an amino acid side chain; $R^{12}$ is a group obtained by conjugating a carboxyl group in an aspartic acid side chain represented by —$CH_2$—COOH or a carboxyl group in a glutamic acid side chain represented by —$CH_2$—$CH_2$—COOH to the deferoxamine-type compound; and $n_1$ represents the total number of (b1-1) and (b2-1) structures, $n_1$ is an integer of 1 to 1,000, $m_1$ is an integer of 1 to 1,000, $m_1 \leq n_1$, when $n_1-m_1$ is 2 or more, a plurality of $R^{11}$'s may be the same as or different from each other, and when $m_1$ is 2 or more, a plurality of $R^{12}$'s may be the same as or different from each other.

2. The mixed drug according to claim 1, wherein the conjugate has a number average molecular weight of 2,000 to 200,000.

3. A method for treating a cancer, the method comprising:
administering a mixed drug comprising ascorbic acid and a conjugate to a subject in need of treatment, wherein the conjugate is a conjugate in which a deferoxamine-type compound, which is at least one compound selected from the group consisting of deferoxamine or an ion or salt thereof, and a derivative thereof, and a biocompatible polymer are conjugated, wherein the biocompatible polymer contains a first biocompatible polymer chain and a second biocompatible polymer chain that is different from the first biocompatible polymer chain, wherein the second biocompatible polymer chain is a polyamino acid, the first biocompatible polymer chain is polyethylene glycol, and the conjugate includes a structure having Formula (1):

A-L-B (1)

wherein A represents the first biocompatible polymer chain; L represents a linker part; and B represents the second biocompatible polymer chain, and wherein the conjugate includes a structure having Formula (1-2):

(1-2)

wherein l is an integer of 1 to 1,500, B represents the second biocompatible polymer chain and includes a repeating structure represented by formula (b2-1), or a repeating structure represented by formula (b1-1) and a repeating structure represented by formula (b2-1),

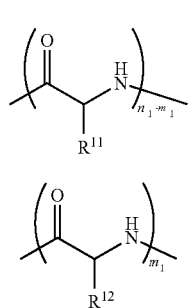

(b1-1)

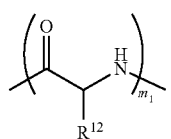

(b2-1)

wherein $R^{11}$ represents an amino acid side chain; $R^{12}$ is a group obtained by conjugating a carboxyl group in an aspartic acid side chain represented by $-CH_2-COOH$ or a carboxyl group in a glutamic acid side chain represented by $-CH_2-CH_2-COOH$ to the deferoxamine-type compound; and $n_1$ represents the total number of (b1-1) and (b2-1) structures, $n_1$ is an integer of 1 to 1,000, $m_1$ is an integer of 1 to 1,000, $m_1 \leq n_1$, when $n_1-m_1$ is 2 or more, a plurality of $R^{11}$'s may be the same as or different from each other, and when $m_1$ is 2 or more, a plurality of $R^{12}$'s may be the same as or different from each other.

* * * * *